(12) United States Patent
Gorden

(10) Patent No.: US 11,739,479 B2
(45) Date of Patent: *Aug. 29, 2023

(54) YANKEE DRYER PROFILER AND CONTROL

(71) Applicant: Michael Gorden, Monroe, OH (US)

(72) Inventor: Michael Gorden, Monroe, OH (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/141,565

(22) Filed: Jan. 5, 2021

(65) Prior Publication Data

US 2021/0172121 A1 Jun. 10, 2021

Related U.S. Application Data

(63) Continuation of application No. 15/860,054, filed on Jan. 2, 2018, now Pat. No. 10,914,037, which is a
(Continued)

(51) Int. Cl.
*D21H 19/14* (2006.01)
*D21H 19/74* (2006.01)
(Continued)

(52) U.S. Cl.
CPC ............... *D21H 19/74* (2013.01); *B31F 1/14* (2013.01); *D21F 5/02* (2013.01); *D21F 5/181* (2013.01);
(Continued)

(58) Field of Classification Search
USPC ........................................................ 162/111
See application file for complete search history.

(56) References Cited

U.S. PATENT DOCUMENTS

| 3,355,083 A | 11/1967 | Wilcox |
| 4,160,048 A | 7/1979 | Jaeger |

(Continued)

FOREIGN PATENT DOCUMENTS

| AU | 742417 B2 | 1/2002 |
| DE | 102010025277 A1 | 12/2011 |

OTHER PUBLICATIONS

Boudreau, New methods for evaluation of tissue creping and the importance of coating, paper and adhesion, Karlstad University Studies, ISSN 1403-8099 (2013), 75 pages.

*Primary Examiner* — Jacob T Minskey
(74) *Attorney, Agent, or Firm* — Dinsmore & Shohl LLP

(57) ABSTRACT

A method for creping paper includes applying an adhesive composition to an outer surface of a creping cylinder (Yankee cylinder) to form an adhesive coating, contacting paper with the adhesive coating, removing the paper and adhesive coating from the creping cylinder, and determining a quality of the adhesive coating. Determining the quality of the adhesive coating may include measuring a degree of cross-linking of the adhesive polymer, a concentration of the adhesive polymer in the adhesive coating, a water content of the adhesive coating, an ash content of the adhesive coating, or combinations thereof. Determining the quality of the adhesive coating may also include determining a thickness of the adhesive coating by measuring light absorbed by the coating and calculating the thickness using Beer's Law. Systems and apparatuses for determining the quality of the adhesive coating and for creping paper are also disclosed.

20 Claims, 22 Drawing Sheets

Related U.S. Application Data continuation-in-part of application No. 14/870,604, filed on Sep. 30, 2015, now abandoned, which is a continuation-in-part of application No. 14/048,593, filed on Oct. 8, 2013, now abandoned.

(60) Provisional application No. 61/711,462, filed on Oct. 9, 2012.

(51) Int. Cl.
| | |
|---|---|
| *D21F 5/02* | (2006.01) |
| *D21F 7/06* | (2006.01) |
| *B31F 1/14* | (2006.01) |
| *D21F 11/08* | (2006.01) |
| *D21H 27/00* | (2006.01) |
| *D21F 11/00* | (2006.01) |
| *D21F 5/18* | (2006.01) |
| *D21F 11/14* | (2006.01) |
| *D21G 9/00* | (2006.01) |
| *G01B 11/24* | (2006.01) |
| *D21H 25/00* | (2006.01) |
| *D21H 21/14* | (2006.01) |
| *G01B 11/06* | (2006.01) |

(52) U.S. Cl.
CPC ............. *D21F 7/06* (2013.01); *D21F 11/006* (2013.01); *D21F 11/08* (2013.01); *D21F 11/14* (2013.01); *D21G 9/0036* (2013.01); *D21H 19/14* (2013.01); *D21H 21/146* (2013.01); *D21H 25/005* (2013.01); *D21H 27/002* (2013.01); *G01B 11/0625* (2013.01); *G01B 11/24* (2013.01)

(56) References Cited

U.S. PATENT DOCUMENTS

| | | | |
|---|---|---|---|
| 5,355,083 | A * | 10/1994 | George ................ G01B 11/06 324/229 |
| 5,731,876 | A | 3/1998 | Venkatesh et al. |
| 5,837,768 | A | 11/1998 | Warchol et al. |
| 5,939,709 | A | 8/1999 | Ghislain et al. |
| 5,944,958 | A * | 8/1999 | Svanqvist ............ D21H 25/005 162/263 |
| 6,171,657 | B1 | 1/2001 | Perdikaris |
| 6,999,175 | B2 | 2/2006 | Ivarsson |
| 7,190,447 | B2 | 3/2007 | Meeks |
| 8,416,399 | B2 | 4/2013 | Straehle et al. |
| 8,691,323 | B2 | 4/2014 | Von Drasek et al. |
| 9,239,231 | B2 | 1/2016 | Li et al. |
| 9,733,063 | B2 | 8/2017 | Proll et al. |
| 2007/0146725 | A1 | 6/2007 | Belov et al. |
| 2007/0208115 | A1 | 9/2007 | Grigoriev et al. |
| 2010/0253942 | A1 | 10/2010 | Mack et al. |
| 2013/0048238 | A1 | 2/2013 | Glover et al. |
| 2013/0063717 | A1 | 3/2013 | Kawasaki et al. |
| 2016/0019686 | A1 | 1/2016 | Toskala et al. |
| 2017/0115112 | A1 | 4/2017 | Srocka et al. |

* cited by examiner

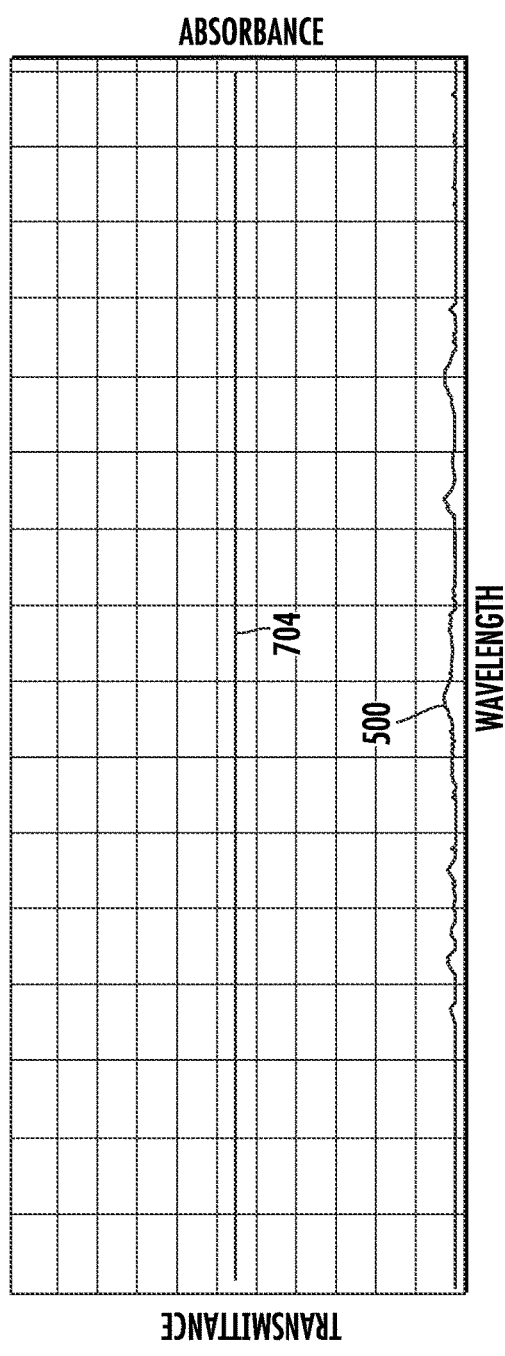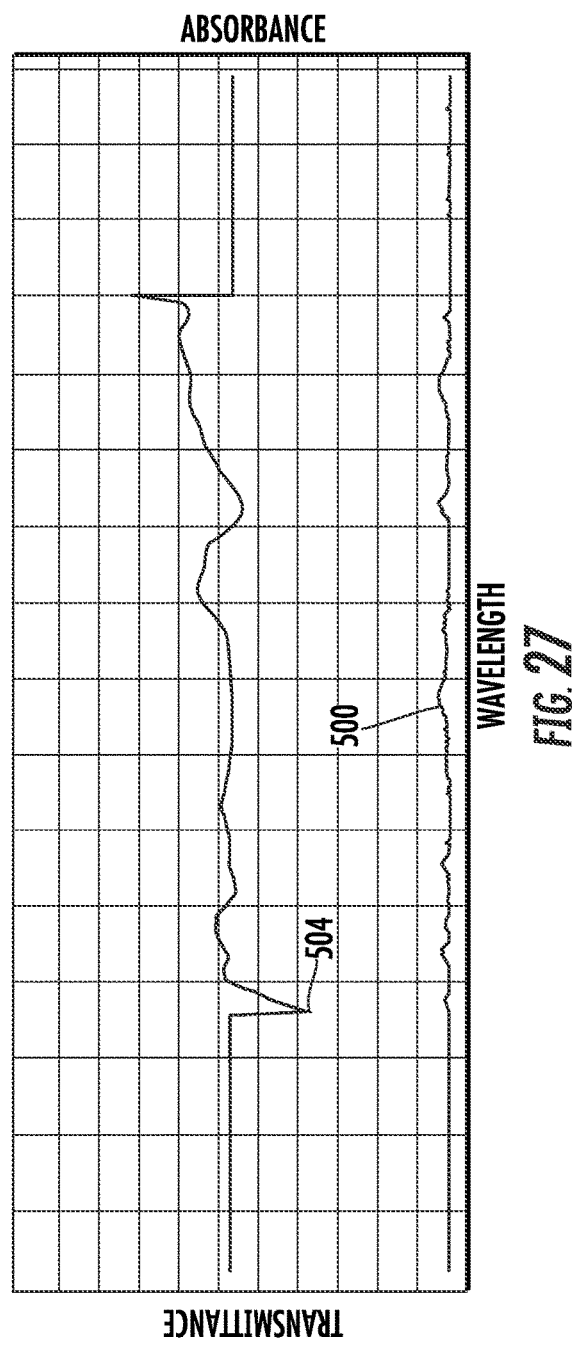

YANKEE DRYER PROFILER AND CONTROL

CROSS REFERENCE TO RELATED APPLICATIONS

This application is a continuation of U.S. patent application Ser. No. 15/860,054, filed Jan. 2, 2018, which is a continuation-in-part of U.S. patent application Ser. No. 14/870,604, filed Sep. 30, 2015, which is a continuation-in-part of U.S. patent application Ser. No. 14/048,593, filed Oct. 8, 2013, which claims the benefit of U.S. Provisional Application Ser. No. 61/711,462, filed Oct. 9, 2012, all of which are incorporated by reference in this disclosure in their entirety.

BACKGROUND

The present disclosure relates to methods and processes of creping paper to produce tissue and towel products and, more specifically, to methods and processes of coating a Yankee dryer during the creping process.

A Yankee dryer is a pressure vessel used in the production of tissue paper. Yankee dryers are primarily used to remove excess moisture from pulp that is about to be converted into paper. However, in paper creping processes, a Yankee dryer may be used as a creping cylinder. The creping cylinder is equipped with a creping blade (in combination with other forms of doctoring blades), and the outer surface of the creping cylinder is sprayed with adhesives to make the paper stick. Creping of the paper is done by scraping/removing the mostly dried paper and adhesive adhered thereto off of the outer surface of the creping cylinder with the creping doctor blade, thereby creping the paper by introducing a crinkle into the paper. The resulting crinkle may be controlled by the strength of the adhesive, the helping action of the release component of the coating, paper pulp characteristics, the geometry of the creping doctor blade, and the speed difference between the creping cylinder and final section of the paper machine.

BRIEF SUMMARY

The quality of the adhesive coating applied to the surface of the creping cylinder can greatly influence the quality of the creped paper produced from the creping process. The quality of the adhesive coating is related to the topography of the adhesive coating (i.e., the thickness and consistency of the adhesive coating), composition of the adhesive coating, ash content, degree of cross-linking of the adhesive polymers in the adhesive coating, rheology of the adhesive coating, temperature, and other properties of the adhesive coating. Each of these aspects of the adhesive coating can contribute to the overall quality of the adhesive coating and ultimately the quality of the creped paper produced from the creping process.

Conventional creping processes have relied on sampling the finished tissue paper downstream of the creping cylinder and sending the samples to a lab for analysis of the quality of the tissue paper, composition of the adhesive, and/or identification of areas of insufficient adhesive application. These conventional methods of assessing the quality of the adhesive coating do not provide direct measurement of the adhesive coating and require time to complete the analytical testing of the final tissue paper samples. Therefore, the conventional methods of assessing the quality of the adhesive coating have not been useful for integrating into real time control systems for controlling the creping process.

Some conventional creping processes have included methods for monitoring the thickness of the adhesive coating applied to the outer surface of the creping cylinder to predict the quality of the downstream creped paper. However, measuring the thickness of the adhesive coating does provide only a partial assessment of the quality of the adhesive coating applied to the outer surface of the creping cylinder. For example, thickness information does not provide insight or information on the composition of the adhesive coating, the degree of cross-linking of the polymers in the adhesive coating, the rheology of the adhesive coating, the ash content, or any other property of the adhesive coating. Therefore, these conventional methods and systems for measuring thickness are incapable of providing a comprehensive assessment of the quality of the adhesive coating.

Additionally, conventional methods and system used to measure the thickness of the adhesive coating on a creping cylinder of a creping process are not capable of providing measurements of the thickness with great enough resolution to fine tune the creping process.

Therefore, there is a continuing need for paper creping methods and processes that include systems and methods for determining a quality of the adhesive coating applied to the creping cylinder. The present disclosure is directed to paper creping methods and processes that include determining a plurality of characteristics of the adhesive coating applied to the outer surface of the creping cylinder and adjusting the properties of the adhesive coating to improve and/or maintain the quality of the creped paper (i.e., tissue paper) produced from the creping process.

In some aspects of the present disclosure, a method for creping paper is disclosed that includes applying an adhesive composition to an outer surface of a creping cylinder to form an adhesive coating on the creping cylinder, the adhesive composition comprising an adhesive polymer and water. The method may further include contacting a continuous paper sheet with the adhesive coating on the creping cylinder, removing or separating the continuous paper sheet and at least a portion of the adhesive coating from the outer surface of the creping cylinder, and determining a quality of the adhesive coating on the creping cylinder. Determining the quality of the adhesive coating on the creping cylinder may include measuring at least one of a degree of cross-linking of the adhesive polymer, a concentration of the adhesive polymer in the adhesive coating, a water content of the adhesive coating, an ash content of the adhesive coating, or combinations of thereof; and determining a thickness of the adhesive coating. In some embodiments, determining the thickness of the adhesive coating may include directing a beam of light through the adhesive coating at an angle, wherein at least a portion of the beam reflects from the surface of the creping cylinder and passes back through the adhesive coating; measuring an initial intensity of the beam; measuring a final intensity of the at least a portion of the beam reflected and passed back through the adhesive coating; determining an absorbance of the beam of light by the adhesive coating from a difference between the initial intensity and the final intensity of the beam; and calculating the thickness of the adhesive coating from the absorbance by the adhesive coating.

In other aspects of the present disclosure, a system for determining the quality of the adhesive coating applied to a creping cylinder may include a plurality of instruments combined to directly analyze the adhesive coating applied to the outer surface of the creping cylinder by optical methods. In some embodiments, the system may include a coating evaluation system that includes a topography instrument operable to measure at least one of a thickness of the adhesive coating, the topography of the adhesive coating, the rheology of the adhesive coating, or combinations of these. The topography instrument may include a light source system operable to direct a beam of light towards the adhesive coating and measure an initial intensity of the beam, an imaging system operable to capture an image of the beam after the beam is reflected from the outer surface of the creping cylinder, and a beam intensity detector system operable to measure the final intensity of the beam after the beam has been passed through the adhesive coating and reflected from the outer surface of the creping cylinder. The coating evaluation system may further include first spectrometer operable to determine at least one of a concentration of an adhesive polymer in the adhesive coating, a degree of cross-linking of the adhesive polymer, the concentration of one or more other constituents of the adhesive coating, or combinations of these. In some embodiments, the first spectrometer may include a UV-VIS-NIR 200 nm through 1000 nm wavelength spectrometer and light source. The coating evaluation system may further include a second spectrometer operable to determine a water content, an ash content, or both. In some embodiments, the second spectrometer may be a NIR 1000 nm through 2500 nm wavelength spectrometer and light source. The coating evaluation system may further include a temperature sensor such as an IR temperature detecting spectrometer.

In still other aspects, creping blade sensing system may include a plurality of sensing blocks mounted to a creping blade holder of the creping blade to directly analyze the creping process. In some embodiments, the creping blade sensing system may include multiple sensor blocks mounted along the creping blade. In some embodiments, the multiple sensor blocks may be mounted every few inches along the creping blade. Each sensor block may be operable to measure vibration, pressure, and temperature at multiple points along the creping blade.

In still other aspects of the present disclosure, a creped-paper inspection system may include a roll-up moisture detecting spectrometer to directly analyze the final moisture content in the finished product. The creped-paper inspection system may also include a moisture detecting spectrometer over the final roll-up station to determine the final moisture content of the tissue product produced by the creping process.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 26 graphically depicts an absorbance spectrum (y-axis) for uncoated stainless steel having an Ra of 16 over a wavelength range of from 200 nm to 1000 nm (x-axis) under ultraviolet long-wave spectrum, according to one or more embodiments shown and described herein;

FIG. 27 graphically depicts an absorbance spectrum (y-axis) for stainless steel having an Ra of 16 and coated with 0.8 mils of an adhesive composition over a wavelength range of from 200 nm to 1000 nm (x-axis) under ultraviolet long-wave spectrum, according to one or more embodiments shown and described herein;

DETAILED DESCRIPTION

The present disclosure includes systems and methods for determining the quality of an adhesive coating applied to the creping cylinder of a paper-creping process, and methods of creping paper that include determining the quality of the adhesive coating applied to the creping cylinder. For example, in some embodiments disclosed herein, a method for creping paper may include applying an adhesive composition to an outer surface of a creping cylinder to form an adhesive coating on the creping cylinder, the adhesive composition comprising an adhesive polymer and water, contacting a continuous paper sheet with the adhesive coating on the creping cylinder, removing or separating the continuous paper sheet and at least a portion of the adhesive coating from the outer surface of the creping cylinder, and determining a quality of the adhesive coating on the creping cylinder. In some embodiments, the method of determining the quality of the adhesive coating on the creping cylinder may include measuring at least one of a degree of cross-linking of the adhesive polymer, a concentration of the adhesive polymer in the adhesive coating, a water content of the adhesive coating, an ash content of the adhesive coating, or combinations thereof. The method of determining the quality of the adhesive coating on the creping cylinder may also include determining a thickness of the adhesive coating by directing a beam of light through the adhesive coating at an angle, at least a portion of the beam reflecting from the surface of the creping cylinder and passes back through the adhesive coating. Determining the thickness of the adhesive coating may further include measuring an initial intensity of the beam, measuring a final intensity of the at least a portion of the beam reflected and passed back through the adhesive coating, determining an absorbance of the beam of light by the adhesive coating from a difference between the initial intensity and the final intensity of the beam, and calculating the thickness of the adhesive coating from the absorbance by the adhesive coating. In some embodiments, the quality of the adhesive coating may be used to adjust one or more parameters of the paper creping process, such as the composition of the adhesive composition applied to the creping cylinder or application of the adhesive composition to the creping cylinder. The present disclosure also includes systems and apparatuses operable to determine the quality of the adhesive coating.

Figure 1:
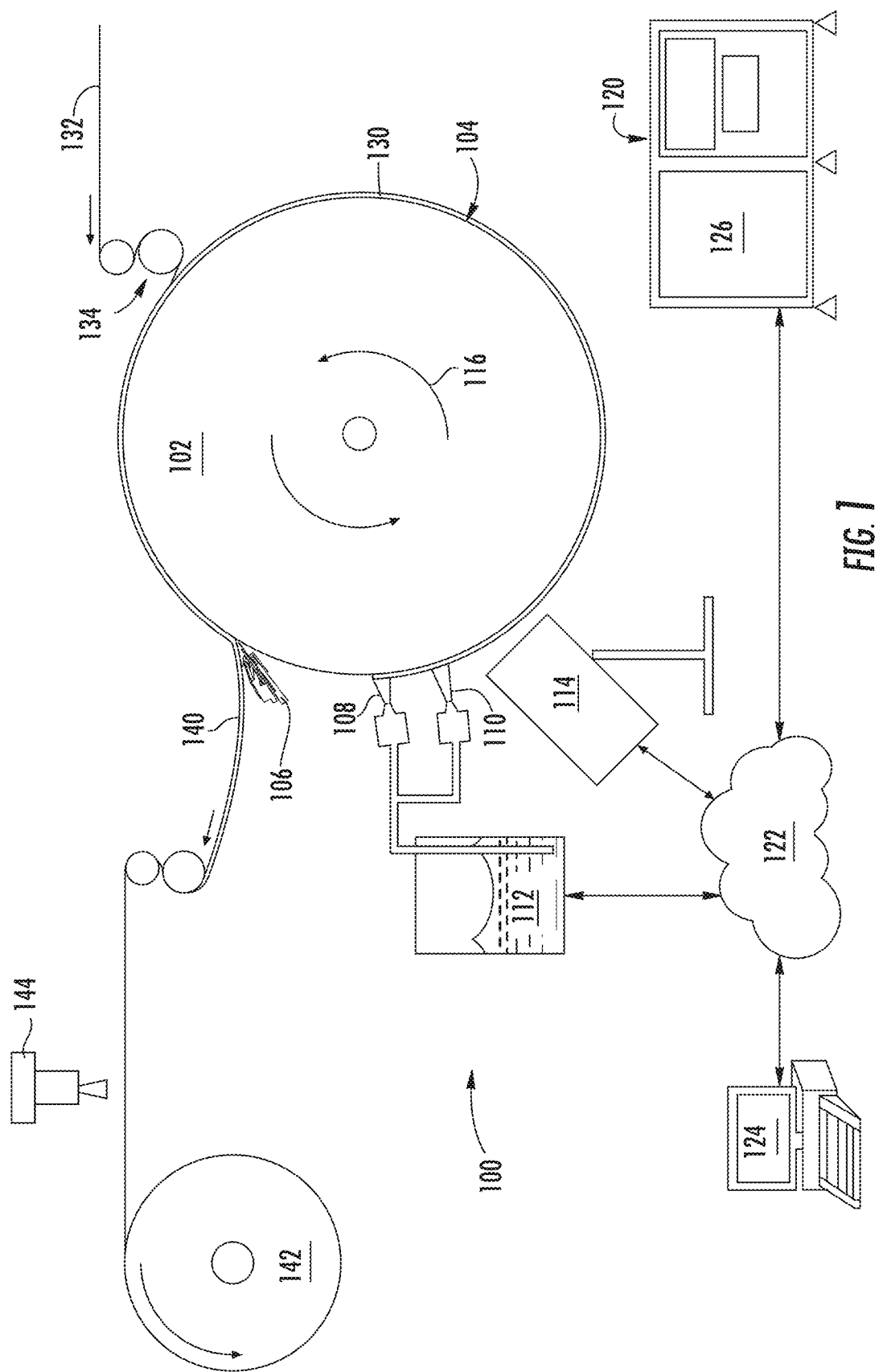
FIG. 1 schematically depicts a creping process, according to one or more embodiments shown and described herein.

Referring now to FIG. 1, a creping process according to embodiments of the present disclosure is illustrated, the creping process is generally referred to by reference number 100. The creping process 100 includes a creping cylinder 102 having an outer surface 104. The creping cylinder 102 is rotatable about an axis. The creping cylinder 102 may be driven at a rotational speed that causes the outer surface 104 of the creping cylinder 102 to travel at a linear speed. In some embodiments, the linear speed of the outer surface 104 may be up to 70 miles per hour, or even greater than 70 miles per hour. In some embodiments, the creping cylinder 102 may be heated, such as by introducing steam to the interior of the creping cylinder 102. In some embodiments, the creping cylinder 102 may include a quadrature encoder (not shown) operable to track the rotational position of the creping cylinder 102 to a resolution of 0.15 degrees or 0.212 inches of rotation relative to the movement of the outer surface 104 of the creping cylinder 102.

In general, the creping process 100 further includes a creping blade 106, a coating system 108, an optional repair wand 110, an adhesive system 112, a coating inspection system 114, and a take-up roll 142. Additionally, the creping process 100 may include a main control system 120 and an operator control station 124, both of which may be communicatively coupled to one or more of the creping blade 106, coating system 108, repair wand 110, adhesive system 112, coating inspection system 114, or other component of the creping process 100.

Figure 2:
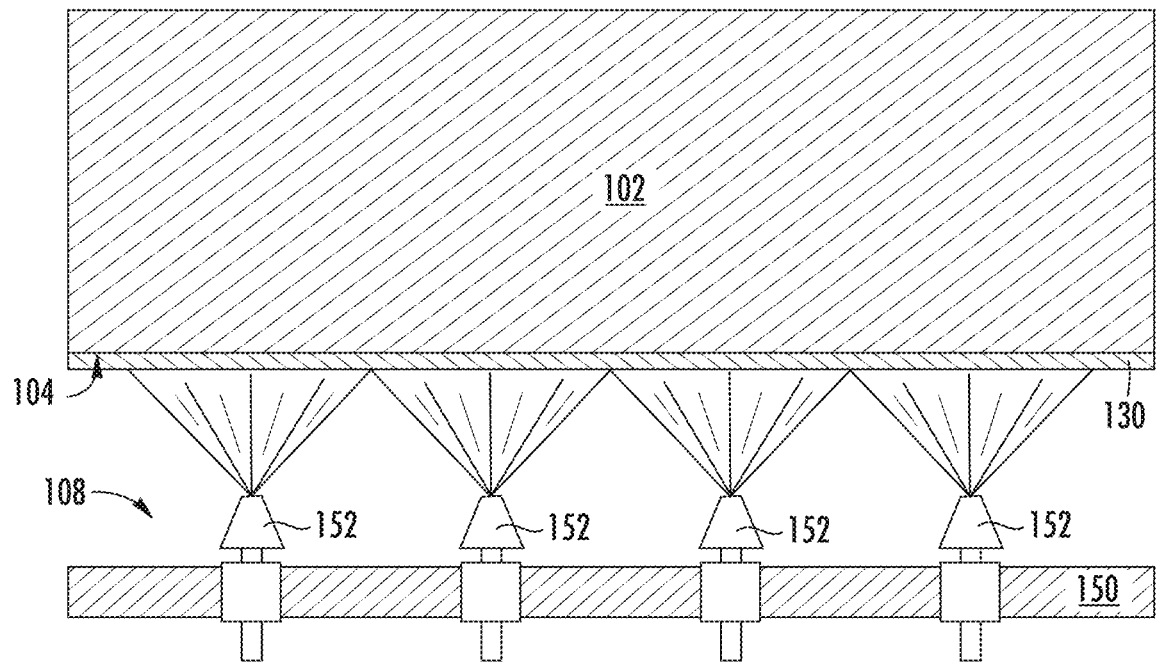
FIG. 2 schematically depicts a coating system (i.e., Yankee dryer coating system (Coating Application Manifold/Spraying System)) of the creping process of FIG. 1, according to one or more embodiments shown and described herein.

The creping blade 106 is positioned proximate to the outer surface 104 of the creping cylinder 102 and is operable to scrape the paper and a portion of the at least partially dried adhesive off of the outer surface 104 of the creping cylinder 102. The coating system 108 is positioned downstream of the creping blade 106 in the direction of rotation 116 of the creping cylinder 102. The coating system 108 may be fluidly coupled to the adhesive system 112 and is operable to apply an adhesive composition to the outer surface 104 of the creping cylinder 102 to form the adhesive coating 130 on the outer surface 104 of the creping cylinder 102. Referring to FIG. 2, in some embodiments, the coating system 108 may include a manifold 150 that includes a plurality of nozzles 152 spaced horizontally across the width of the creping cylinder 102. The nozzles 152 may be operable to deliver a spray of the adhesive composition from the adhesive system 112 (FIG. 1) onto the outer surface 104 of the creping cylinder 102, thereby producing the adhesive coating 130 thereon. The coating system 108 may also include a flow meter (not shown) and a pressure gauge (not shown). In some embodiments, the flow meter and the pressure gauge may be fluidly coupled to the manifold 150. In some embodiments, the flow meter may be a master pulsed-type flow meter. The flow meter and pressure gauge for the manifold 150 may be operable to provide feedback to the control system 120 and may reflect the current amount of adhesive coating being applied. In some embodiments, the flow meter and/or the pressure gauge may provide feedback to the control system 120 on changes to the adhesive coating addition rates in order to control the coating component mix ratios.

Figure 3:
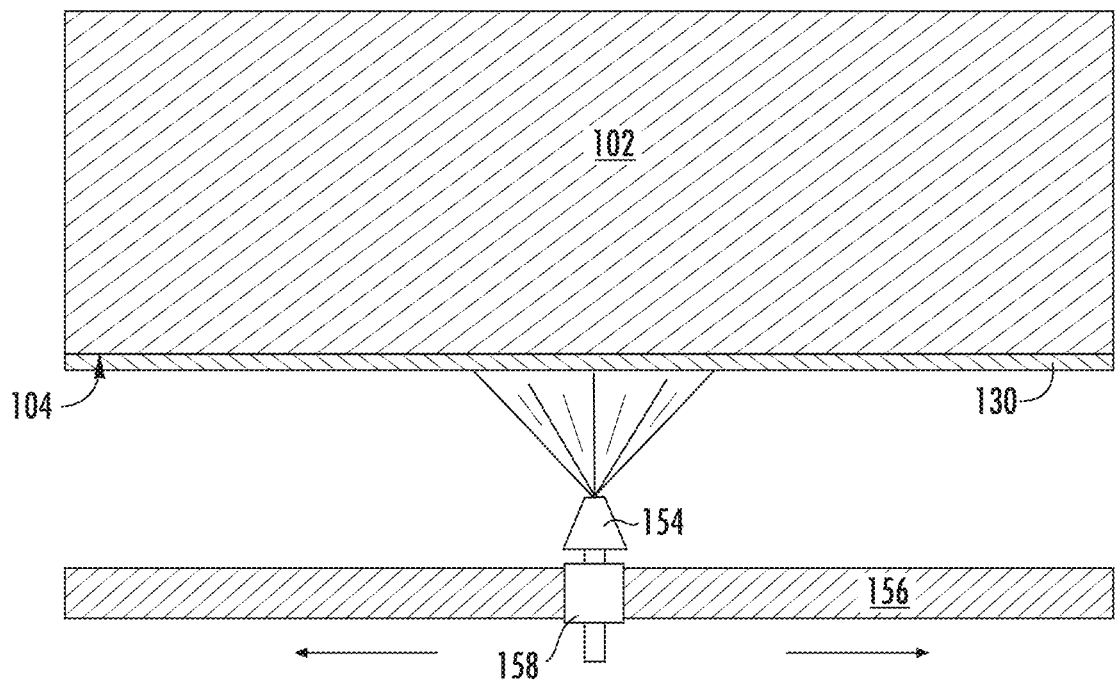
FIG. 3 schematically depicts a repair wand of the creping process of FIG. 1 for correcting defects in an adhesive coating applied to a creping cylinder of the creping process, according to one or more embodiments shown and described herein.

Referring to FIG. 3, the optional repair wand 110 may include a repair nozzle 154 and a positioning rail 156. The positioning rail 156 may be oriented generally parallel to the outer surface 104 of the creping cylinder 102, and the repair nozzle 154 may be positioned and oriented towards the outer surface 104 of the creping cylinder 102. The nozzle 154 may be movably coupled to the positioning rail 156 by a positioner 158. The positioner 158 may be operable to translate the nozzle 154 along the positioning rail 156. The repair wand 110 may be operable to deliver a spray of the adhesive composition from the adhesive system 112 to a portion of the outer surface 104 of the creping cylinder 102. Referring back to FIG. 1, in some embodiments, the repair wand 110 may be disposed downstream of the coating system 108 in the direction of rotation 116 of the creping cylinder 102.

Referring again to FIG. 1, the creping blade 106 is positioned downstream (i.e., in the direction of rotation 116) of the coating system 108. The creping blade 106 is positioned with a blade edge oriented proximate to the outer surface 104 of the creping cylinder 102. In operation of the creping process 100, the coating system 108 sprays the adhesive coating 130 onto the outer surface 104 of the creping cylinder 102. Downstream of the coating system 108, a web of paper 132 is contacted with the adhesive coating 130 on the creping cylinder 102 through passage of the paper 132 between the creping cylinder 102 and a nip roller 134 positioned proximate to the outer surface 104 of the creping cylinder 102. The paper 132 in contact with the adhesive coating 130 travels with the outer surface 104 of the rotating creping cylinder 102 to the creping blade 106. Between the nip roller 134 and the creping blade 106, heat from the creping cylinder 102 may remove moisture from the paper 132 and/or the adhesive coating 130, thereby reducing the moisture content of the paper 132 and/or adhesive coating 130. In some embodiments, the heat from the creping cylinder 102 may at least partially cure or harden the adhesive coating 130 in contact with the paper 132 before the paper 132 reaches the creping blade 106.

The creping blade 106 continuously scrapes the paper 132 and at least a portion of the adhesive coating 130 from the outer surface 104 of the creping cylinder 102 to produce the creped paper 140. The creped paper 140 may be wound on a take-up roll 142 downstream of the creping process 100 or transported to one or more than one downstream processes. In some embodiments, the creping process may include a creped paper inspection station 144 downstream of the creping blade 106. The creped paper inspection station 144 may include one or a plurality of instruments for measuring one or a plurality of properties of the creped paper 140. For example, in some embodiments, the creped paper inspection station 144 may include an infrared moisture spectrometer configured to determine a moisture content of the creped paper 140 and/or an infrared temperature sensor to measure a temperature of the creped paper 140.

Figure 4:
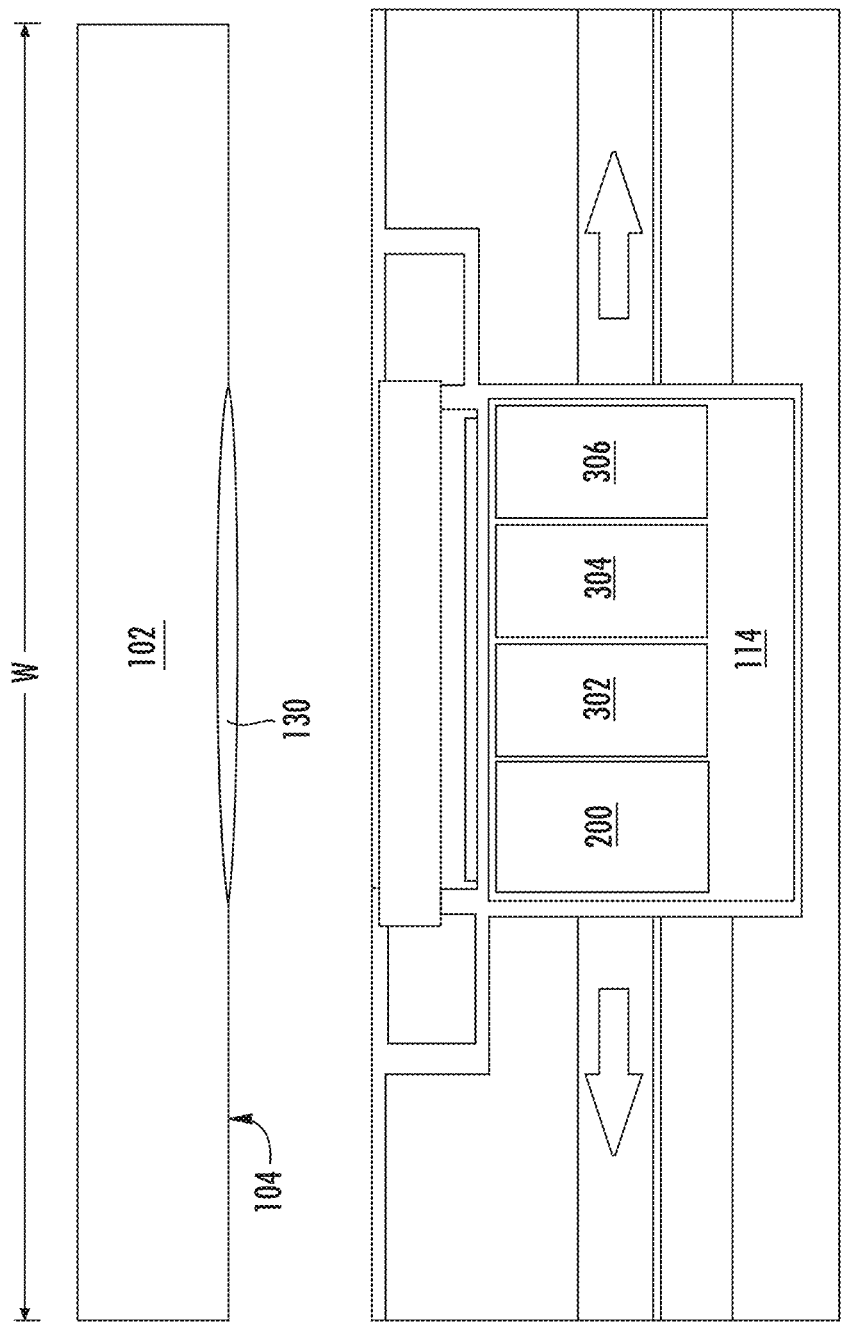
FIG. 4 schematically depicts a coating inspection system of the creping process of FIG. 1, according to one or more embodiments shown and described herein.

Referring again to FIG. 1, the creping process 100 includes a coating inspection system 114 positioned downstream of the coating system 108 in the direction of rotation 116 of the creping cylinder 102. The coating inspection system 114 may be positioned proximate the outer surface 104 of the creping cylinder 102 and oriented to direct a plurality of instruments towards the adhesive coating 130 on the outer surface 104 of the creping cylinder 102. In some embodiments, the coating inspection system 114 may be oriented generally normal to the outer surface 104 of the creping cylinder 102. Referring now to FIG. 4, the coating inspection system 114 includes a topography instrument 200, which may be operable to determine at least one of a thickness and topography of the adhesive coating 130, a rheology of the adhesive coating 130, and a distance from the coating inspection system 114 to the outer surface 104 of the creping cylinder 102. In some embodiments, the coating inspection system 114 also includes one or more than one of a first spectrometer 302, a second spectrometer 304, a temperature sensor 306, or other sensor system.

Figure 5:
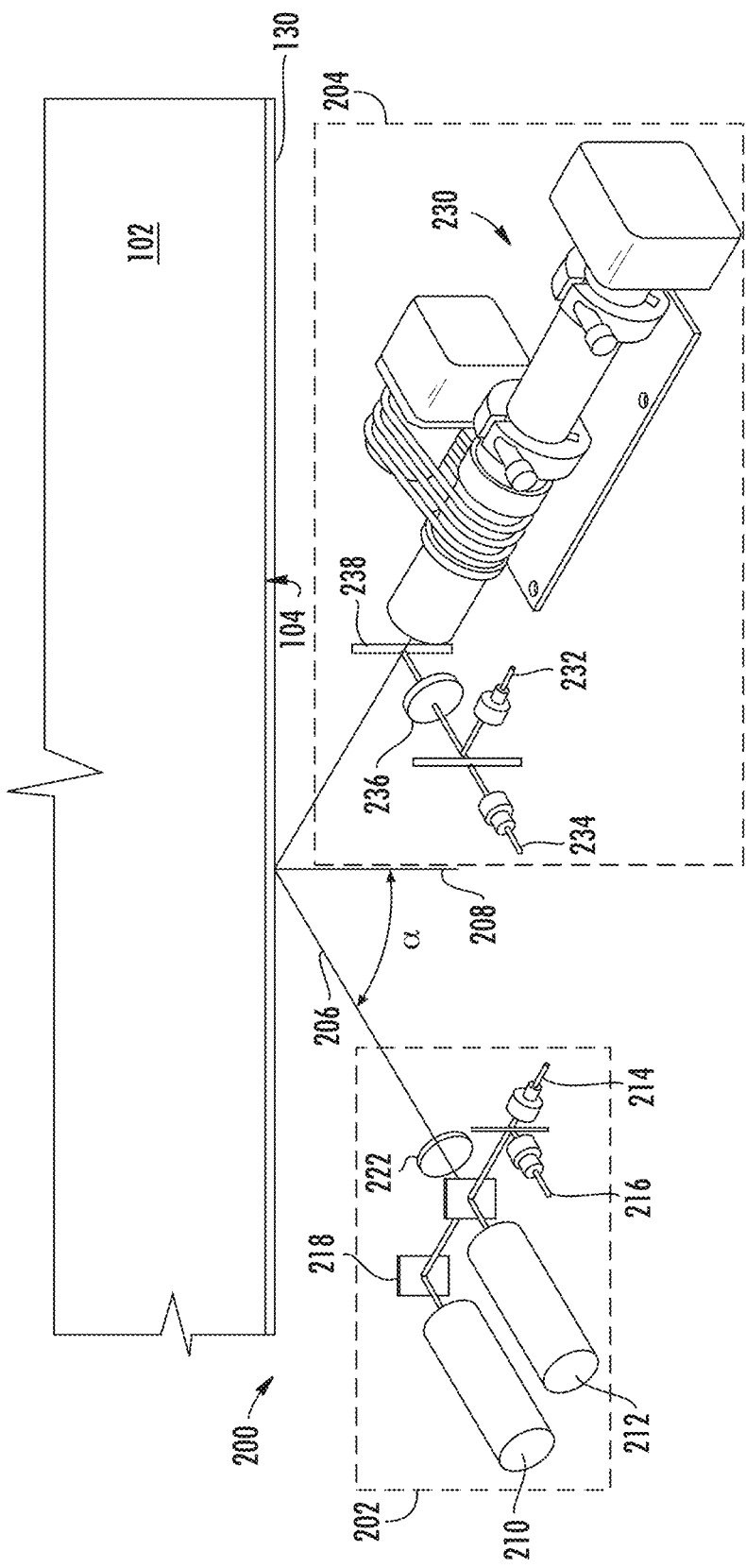
FIG. 5 schematically depicts a perspective view of a topography instrument of the coating inspection system of FIG. 4, according to one or more embodiments shown and described herein.

Referring now to FIG. 5, the topography instrument 200 will now be described. The topography instrument 200 includes a light source system 202 and a detector system 204. The light source system 202 may be operable to produce a beam of light and direct the beam 206 of light towards the outer surface 104 of the creping cylinder 102. The light source system 202 may be positioned to direct the beam 206 of light at an angle α relative to the direction 208 normal to the outer surface 104 of the creping cylinder 102. For example, in some embodiments, the angle α may be greater than or equal to 40°, or greater than or equal to 45°. In some embodiments, the angle α may be less than Brewster's angle, which is the angle of incidence at which light with a particular polarization (e.g., p polarized) is perfectly transmitted through a transparent dielectric surface, with no reflection. Brewster's angle for the adhesive composition may be calculated from the following Equation 1 (EQU. 1):

$$\theta_{Brewster} = \tan^{-1}\frac{n_2}{n_1} \qquad \text{EQU. 1}$$

where $n_1$ is the refractive index for air and $n_2$ is the expected refractive index of the coating. The refractive index of the coating is expected to be greater than 1.33, which is the refractive index for water, but less than 1.5, which is a typical refractive index for glass. This will yield and expected Brewster's angle of approximately 52.75 degrees. In some embodiments, the angle α may be from 40° to 53°, or from 40° to 50°. In some embodiments, the angle α may be about 45°. The detector system 204 may be positioned to receive the beam 206 of light passed through the adhesive coating 130 and reflected off of the outer surface 104 of the creping cylinder 102.

Figure 6:
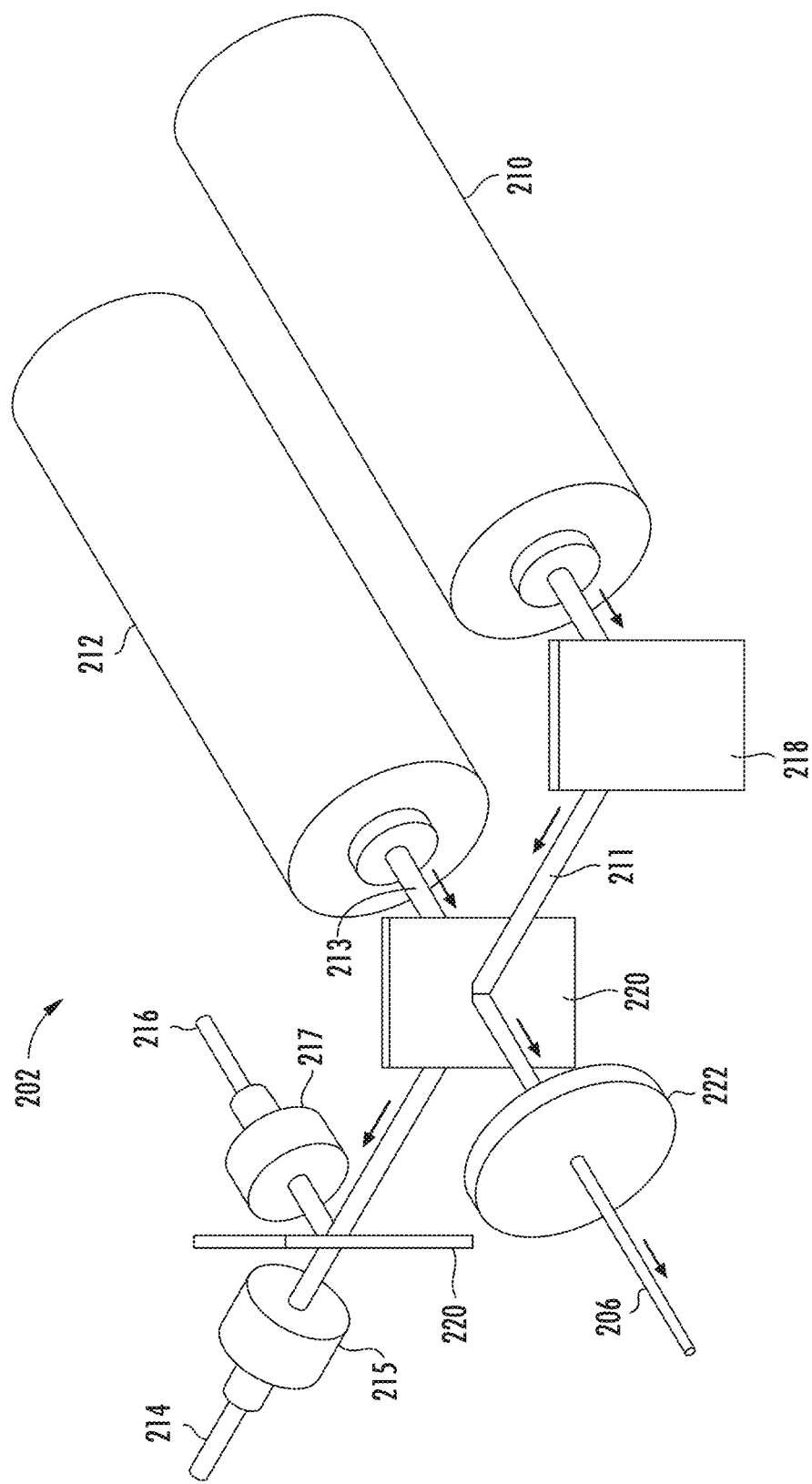
FIG. 6 schematically depicts a perspective view of a light source system of the topography instrument of FIG. 5, according to one or more embodiments shown and described herein.

Referring to FIG. 6, one embodiment of the light source system 202 for producing the beam 206 of light is depicted. The light source system 202 includes at least one light source (e.g., first light source 210 and/or second light source 212) operable to produce the beam 206 of light. In some embodiments, the beam 206 of light may be a collimated beam. In some embodiments, the beam 206 of light may include a single wavelength of light or a plurality of wavelengths of light. In some embodiments, the beam 206 may include a plurality of discrete wavelengths of light, such as 1, 2, 3, 4, or more than 4 discrete wavelengths of light. In some embodiments, the beam 206 may be a dual wavelength beam having a first wavelength and a second wavelength, which is different than the first wavelength. In some embodiments, the wavelengths of the beam 206 may be in the visible spectrum, such as from 380 nanometers (nm) to 750 nm.

The dual wavelength beam may improve operation of the topography instrument 200 by enabling the topography instrument 200 to measure the topography, thickness, and rheology of a broader range of materials. As will be discussed subsequently, the topography instrument 200 relies on determining an absorbance of the beam 206 by the adhesive coating 130. Different materials used to make the adhesive coating 130 have different absorptivity for different wavelengths of light. The inclusion of two or more discrete wavelengths of light into the beam 206 may provide redundancy in cases in which the materials in the adhesive coating 130 do not absorb enough of one specific wavelength. Additionally, the absorbance of one or more wavelengths of light in the beam 206 may be used to verify the topography, thickness, or rheology determined from the absorbance of one or more other discrete wavelengths of light in the beam 206.

Referring to FIG. 6, in some embodiments, the light source system 202 may include a first light source 210 and a second light source 212. Each of the first light source 210 and the second light source 212 may be operable to produce a collimated beam of light. For example, the first light source 210 may be operable to produce a first beam 211 of light having a first wavelength, and the second light source 212 may be operable to produce a second beam 213 of light having a second wavelength. The first light source 210 and the second light source 212 may be any light source capable of producing a collimated beam of light. For example, the first light source 210 and/or the second light source 212 may be lasers, LEDs, or other light source capable of producing a collimated beam of light. In some embodiments, the first light source 210 may be a red laser operable to produce the first beam 211 of laser light having a discrete wavelength greater than or equal to 600 nm, such as from 600 nm to 750 nm, or from 620 nm to 750 nm, for example. In some embodiments, the second light source 212 may be a blue laser operable to produce the second beam 213 of light having a discrete wavelength of less than or equal to 500 nm, such as in a range of from 380 nm to 500 nm, or from 400 nm to 500 nm. In some embodiments, the light source may include one or a plurality of thermally-cooled diode lasers with electronically adjustable intensity (i.e., power output).

Referring to FIG. 6, in some embodiments, the light source system 202 may include optics to combine a portion of the first beam 211 and a portion of the second beam 213 into the dual wavelength beam 206. The optics may include one or a plurality of mirrors 218, one or a plurality of beam splitters 220, and one or a plurality of aperture plates 222. In some embodiments represented in FIG. 6, the first beam 211 from the first light source 210 may be reflected from the mirror 218 towards a beam splitter 220. The second beam 213 from the second light source 212 may also encounter the beam splitter 220. The beam splitter 220 may allow a portion of the first beam 211 and the second beam 213 to pass through the beam splitter and may reflect another portion of the first beam 211 and the second beam 213.

Referring still to FIG. 6, the reflected portion of the first beam 211 and the passed-through portion of the second beam 213 may be directed to one or a plurality of output intensity detectors operable to measure an output intensity of the first beam 211 and/or the second beam 213. For example, in some embodiments, such as those represented in FIG. 6, the light source system 202 may include a first output intensity detector 214 and a second output intensity detector 216. The first output intensity detector 214 and the second output intensity detector 216 may each be operable to determine an intensity of one of the wavelengths of light incorporated into the beam 206. The first output intensity detector 214 and the second output intensity detector 216 may be any device or instrument capable of measuring an intensity of a beam of light. For example, in some embodiments, the first output intensity detector 214 and the second output intensity detector 216 may include, but are not limited to, photo diode sensors. Other intensity detectors are contemplated. In some embodiments, the first output intensity detector 214 may include a first filter 215, which may be a dichroic filter, for example, and the second output intensity detector 216 may include a second filter 217, which may also be a dichroic filter. The first filter 215 and the second filter 217 may be operable to filter the diverted portions of the first beam 211 and the second beam 213, respectively, so that only a single narrow wavelength band (e.g., bandwidth of about 10 nm, for example) of light is introduced to each of the first output intensity detector 214 and the second output intensity detector 216. In some embodiments, the dichroic filters may filter the beam down to a narrow wavelength band of light having a bandwidth of about 10 nm.

The passed-through portion of the first beam 211 and the reflected portion of the second beam 213 may thus be combined to form the dual wavelength beam 206. The dual wavelength beam 206 may then be passed through the aperture plate 222 to reduce the diameter of the beam 206 directed to the outer surface 104 of the creping cylinder 102.

The aperture plate 222 may include an aperture having a diameter of from 0.01 inches to 0.04 inches. The aperture reduces the beam diameter of the beam 206 focused onto the adhesive coating 130 on the creping cylinder 102. As the diameter of the aperture is reduced, the dynamic range of the topography instrument 200 to determine the distance from the topography instrument 200 to the outer surface 104 of the creping cylinder 102 increases. However, reducing the diameter of the aperture may also reduce the number and magnitude of reflections and refractions of the beam encountering the adhesive coating 130, thereby reducing the amount of data available for determining the topography, thickness, and rheology of the adhesive coating 130. Referring again to FIG. 5, from the aperture plate 222, the dual wavelength beam 206 is directed towards the adhesive coating 130 on the outer surface 104 of the creping cylinder 102 at the angle α previously discussed.

Figure 7:
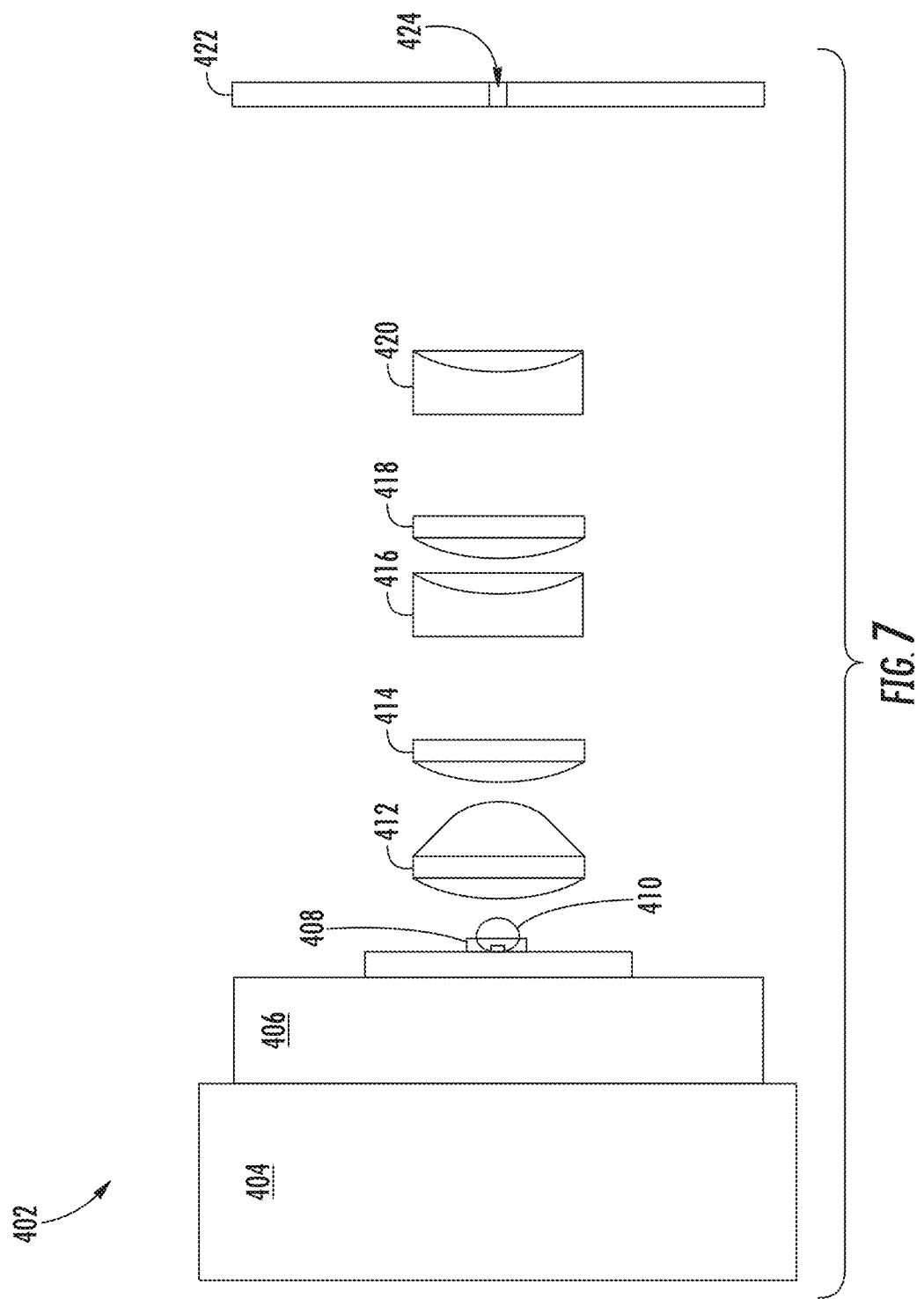
FIG. 7 schematically depicts an alternative light source for the light source system of FIG. 6, according to one or more embodiments shown and described herein.

Referring now to FIG. 7, an alternative light source 402 for the first and second light sources 210, 212 (FIG. 5) is depicted. The light source 402 may be a high power LED light source at any wavelength, which can be substituted for a laser light source in the light source system 202 (FIG. 5). The alternative light source 402 may include a fan 404 operable to blow cooling air onto a heatsink 406. The heatsink 406 may be seated onto and in thermal contact with the metal core board 408 that helps transfer the heat generated by the high power LED 410, which is coupled to the side of the metal core board 408 opposite the heatsink 406. In some embodiments, the alternative light source 402 may include an aspheric lens 412 operable to direct a major portion of the light rays being emitted from the LED source 410 to the next lens which may be a first achromatic doublet lens 414. The first achromatic doublet lens 414 may then direct the light to the next lens which is a concave lens 416. The first achromatic doublet lens 414 concentrates the rays down to a point. The concave lens 416 straightens the light into a smaller beam with a much higher intensity. The alternative light source 402 may include a second achromatic doublet lens 418 positioned so that the beam passes from the concave lens 416 to the second achromatic doublet lens 418. The second achromatic doublet lens 418 may be operable to further concentrate the beam down to a point. The highly concentrated beam from the second achromatic doublet lens 418 may be again straightened out by a concave lens 420 into a straight highly concentrated beam. In some embodiments, the alternative light source 402 may include an aperture plate 422 operable to limit the final diameter of the beam. The aperture plate 422 may include an aperture 424. In some embodiments, the alternative light source 402 may be used for the first light source 210 (FIG. 6) and/or the second light source 213 (FIG. 6). In other embodiments, the alternative light source 402 may be incorporated into the light source system 202 in addition to the first light source 210 and the second light source 213. Other types of alternative light sources may also be used in the light source system 202 of the topography instrument 200.

Figure 8:
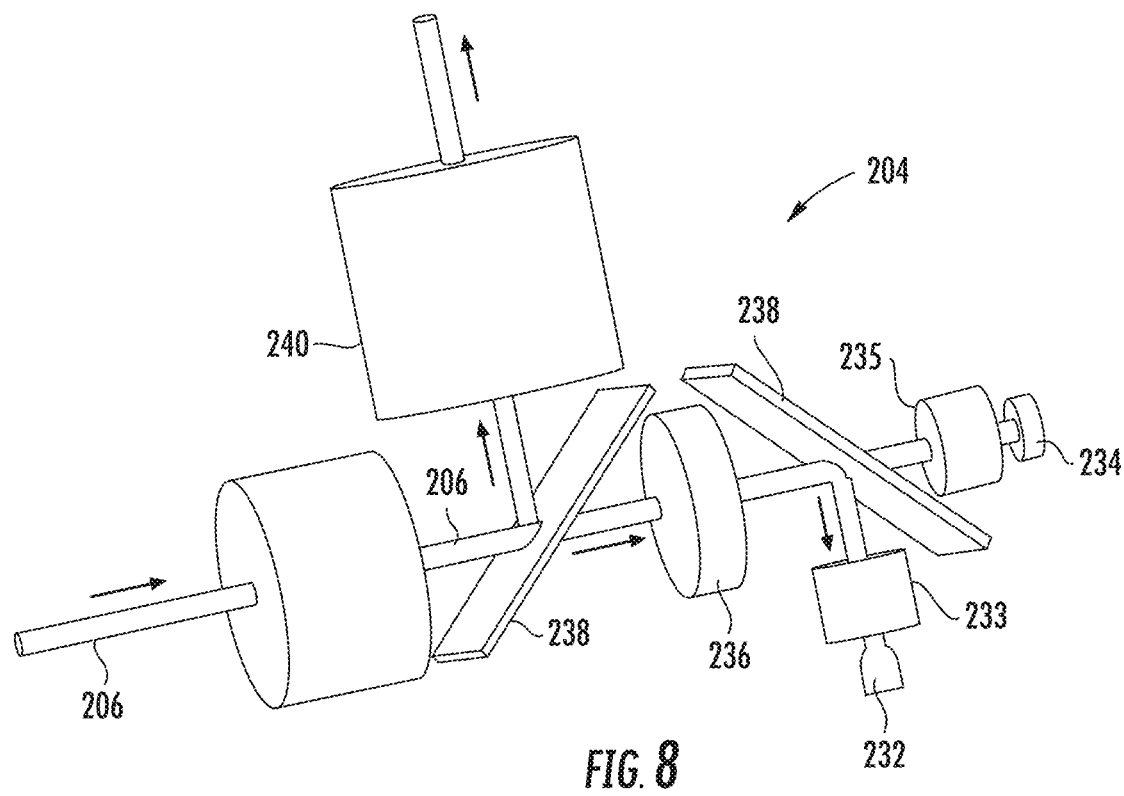
FIG. 8 schematically depicts a perspective view of a detector system of the topography instrument of FIG. 5, according to one or more embodiments shown and described herein.
Figure 9:
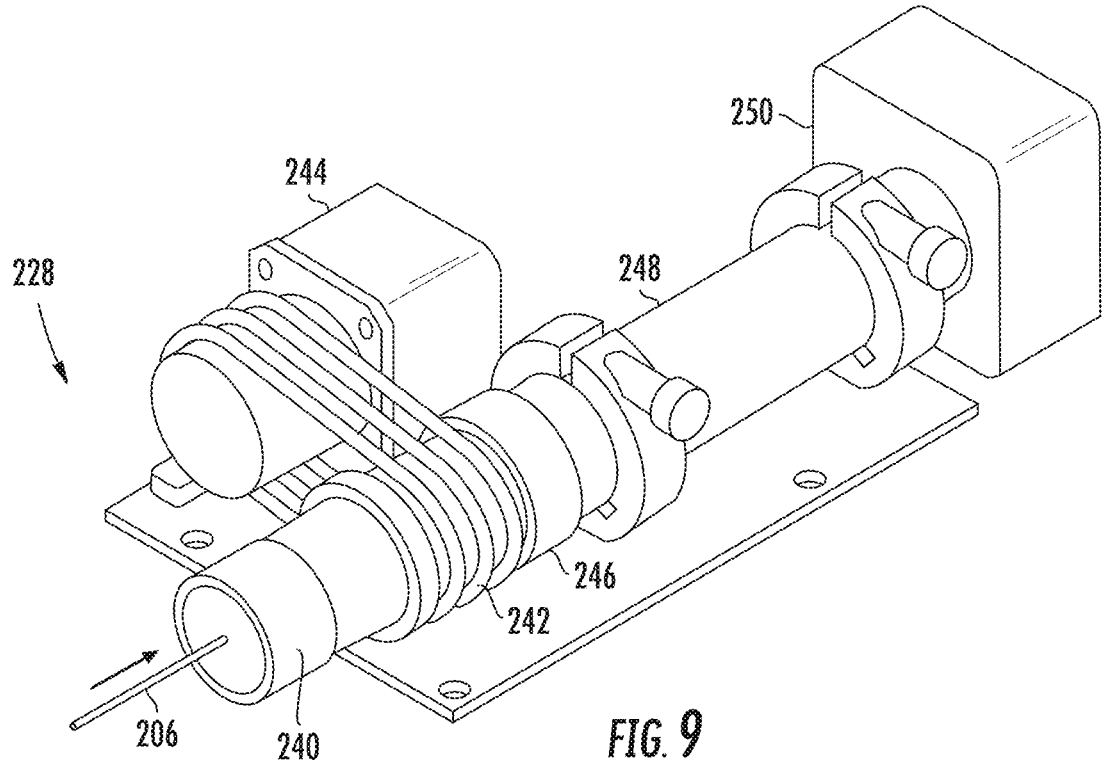
FIG. 9 schematically depicts a perspective view of a microscope imaging system of the detector system of FIG. 8, according to one or more embodiments shown and described herein.

Referring again to FIG. 5, the detector system 204 may be positioned to receive the portions of the beam 206 reflected from the outer surface 104 of the creping cylinder 102. Referring to FIG. 8, the detector system 204 may include an imaging system 228 and a beam intensity measuring system 230. The imaging system 228 may be operable to capture an image of a cross-section of the beam 206 after being passed through the adhesive coating 130 and reflected from the outer surface 104 of the creping cylinder 102. Referring to FIG. 9, in some embodiments, the imaging system 228 may include a polarizing lens 240, a focusing lens 242, an adjusting iris 246, a microscope tube 248, and a camera 250. The imaging system 228 may also include a focus adjustment 244 operable to adjust the focusing lens 242. In some embodiments, the camera 250 may be a CCD camera that includes a pixel array. In some embodiments, the CCD camera may be a megapixel camera having greater than or equal to one million pixels. The pixel array of the CCD camera may be at least 1000 pixels by 1000 pixels. In some embodiments, the CCD camera may have a field of view having a width of from 0.04 inches to 0.1 inches, or about 0.06 inches at the magnification of the microscope, the width being measured from the leftmost pixels to the rightmost pixels. In some embodiments, the pixel array of the CCD camera may be 1280 pixels by 1280 pixels. Thus, in these embodiments, the CCD camera may have a resolution of 0.06 inches per 1280 pixels, which is 0.000046875 inches per pixel (i.e., about 21,333 pixels per inch). Although the imaging system 228 is depicted in FIG. 5 as having a microscope tube 248 and a camera 250, other imaging devices may be used for or in conjunction with the imaging system 228.

Referring again to FIG. 8, the beam intensity measuring system 230 may include one or a plurality of beam intensity detectors operable to measure an intensity of the beam 206 reflected from the outer surface 104 of the creping cylinder 102. For example, in some embodiments, such as the embodiments represented in FIG. 8, the beam intensity measuring system 230 may include a first beam intensity detector 232 and a second beam intensity detector 234. The first beam intensity detector 232 and the second beam intensity detector 234 may each be operable to determine an intensity of one of the wavelengths of light incorporated into the beam 206. The first beam intensity detector 232 and the second beam intensity detector 234 may each be any device or instrument capable of measuring an intensity of a beam of light. For example, in some embodiments, the first beam intensity detector 232 and the second beam intensity detector 234 may include, but are not limited to, photo diode sensors. Other types of light intensity detectors are contemplated. In some embodiments, the first beam intensity detector 232 may include a first filter 233, which may be a dichroic filter, for example, and the second beam intensity detector 234 may include a second filter 235, which may also be a dichroic filter. The first filter 233 and the second filter 235 may be operable to filter the beam 206 so that only a single narrow wavelength band (bandwidth of about 10 nm) of light is introduced to each of the first beam intensity detector 232 and the second beam intensity detector 234. The first filter 233 the second filter 235 may include dichroic filters having bandwidths of 10 nm around the target wavelengths of the dichroic filters. The beam intensity measuring system 230 may include optics to direct a portion of the beam 206 to each of the first filter 233 and the second filter 235. The optics may include, but are not limited to, one or more mirrors, lenses 236, beam splitters 238, or other optical devices, or combinations of optical devices.

Referring again to FIG. 5, in operation of the topography instrument 200, the light source system 202 is operable to produce the beam 206 of light and direct the beam 206 of light towards the outer surface 104 of the creping cylinder 102. The light source system 202 may direct the beam 206 towards the outer surface 104 of the creping cylinder 102 at the angle α with the direction 208 normal to the outer surface 104 of the creping cylinder 102. The beam 206 passes through the adhesive coating 130 to the outer surface 104 of the creping cylinder 102. At least a portion of the beam 206 reflects from the outer surface 104 of the creping cylinder 102 and passes back through the adhesive coating 130. The beam 206 may pass out of the adhesive coating 130. When the beam 206 reaches the detector system 204, the beam splitter 238 may direct a first portion of the beam 206 to the imaging system 228 and a second portion of the beam 206 to the beam intensity measuring system 230. At the beam intensity measuring system, the second portion of the beam 206 may be further divided into portions directed to each of the beam intensity detectors, such as the first beam intensity detector 232 and the second beam intensity detector 234.

Referring again to FIG. 4, the coating inspection system 114 may include the first spectrometer 302, which may include a light source (not shown) and a detector (not shown). The light source may be operable to produce light with a plurality of wavelengths in the ultraviolet, visible, and near infrared wavelengths. In some embodiments, the light source may be capable of producing consistent and constant radiant energy across a spectrum of from 200 nm to 1000 nm. The light source may include a single light source or multiple light sources. For example, in some embodiments, the light source may include a plurality of light emitting diodes (LEDs), each LED capable of emitting light having one or a plurality of wavelengths of light. The LEDs may be chosen at various wavelengths so that the light source produces consistent and constant radiant energy across the wavelength spectrum of from 200 nm to 1000 nm. The LEDs may be cooled, such as by liquid cooling, to remove heat produced from the LEDs. In some embodiments, each LED may be independently controlled for the radiant energy it produces. Alternatively or additionally, in some embodiments, the light source may include a replaceable incandescent light source, which may be operable to produce consistent and constant radiant energy having wavelengths in at least the visible spectrum. In some embodiments, the light source(s) may employ variable power in order to maintain a constant and flat radiant power over the entire range of the first spectrometer 302.

The detector of the first spectrometer 302 may be operable to detect the intensity and wavelengths of the light from the light source passed through the adhesive coating 130 and reflected from the outer surface 104 of the creping cylinder 102. In some embodiments, the detector may include a plurality of photodiodes. In some embodiments, each of the photodiodes may be dedicated to one of the LEDs of the light source. The detector may also include amplifiers and control circuits for each of the LED-photodiode pairs. In some embodiments, the detector of the first spectrometer 302 may be about 0.2 nm.

The first spectrometer 302 may be operable to measure one or more properties of the adhesive coating 130. For example, the first spectrometer 302 may be operable to measure an absorbance spectrum, a fluorescence spectrum, or other property of the adhesive coating 130. In some embodiments, the first spectrometer 302 may be operable to measure an absorbance spectrum of the adhesive coating 130. In some embodiments, the absorbance spectrum of the adhesive coating 130 measured by the first spectrometer 302 may be used to determine an amount of adhesive polymer in the adhesive coating 130, degree of cross-linking of the adhesive polymer, concentration of one or more other constituents of the adhesive coating 130, or combinations of these. Operation of the coating inspection system 114 to the determine the amount of adhesive polymer in the adhesive coating 130, degree of cross-linking of the adhesive polymer, concentration of one or more other constituents of the adhesive coating 130, or combinations of these from the absorbance spectrum of the adhesive coating 130 as determined by the first spectrometer 302 will be described in greater detail subsequently in this disclosure.

Referring still to FIG. 4, the coating inspection system 114 may include the second spectrometer 304, which may include a light source (not shown) and a detector (not shown). The light source may be operable to produce light with a plurality of wavelengths in the near infrared spectrum. As used herein, the term "near infrared spectrum" refers to light having wavelengths in a range of from 750 nm to 2500 nm. In some embodiments, the light source may be capable of producing consistent and constant radiant energy across a spectrum of from 1000 nm to 2500 nm. The light source may include a single light source or multiple light sources. The light sources may be chosen at various wavelengths so that the light source produces more consistent and constant radiant energy across the wavelength spectrum of from 1000 nm to 2500 nm. In some embodiments, the light sources for the second spectrometer 304 for the 1000 nm through 2500 nm light may include incandescent light sources or other heat producing light sources. These light sources (heat sources) may be cooled, such as by liquid cooling, to remove heat produced from the heat sources. In some embodiments, each heat source of the second spectrometer 304 may be independently controlled for the radiant energy it produces. In some embodiments, the light source(s) of the second spectrometer 304 may employ variable power in order to maintain a constant and flat radiant power over the entire wavelength range of the second spectrometer 304.

The detector of the second spectrometer 304 may be operable to detect the intensity and wavelengths of the light from the light source that is reflected from the adhesive coating 130 and/or the outer surface 104 of the creping cylinder 102. In some embodiments, the detector may include a plurality of lead sulfide PbS detectors (PbS detectors). In some embodiments, each of the PbS detectors may be dedicated to one of the heat sources of the overall heat source. The detector may also include amplifiers and control circuits for each of the PbS detector pairs. In some embodiments, the resolution of the second spectrometer 304 may be about 3 nm.

In some embodiments, the second spectrometer 304 may be operable to measure a near infrared (NIR) absorbance spectrum of the adhesive coating 130. In some embodiments, the NIR absorbance spectrum of the adhesive coating 130 measured by the second spectrometer 304 may be used to determine an amount of water (i.e., water/moisture content) and/or an amount of ash (i.e., ash content) in the adhesive coating 130. Operation of the coating inspection system 114 to determine the amount of water and/or ash from the NIR absorbance spectrum of the adhesive coating 130 as determined by the second spectrometer 304 will be described in greater detail subsequently in this disclosure.

Referring again to FIG. 4, coating inspection system 114 may also include one or more than one temperature sensor 306 operable to measure the temperature of the adhesive coating 130 and/or the temperature of the outer surface 104 of the creping cylinder 102. In some embodiments, the temperature sensor(s) 306 may be an infrared temperature sensor.

Figure 10:
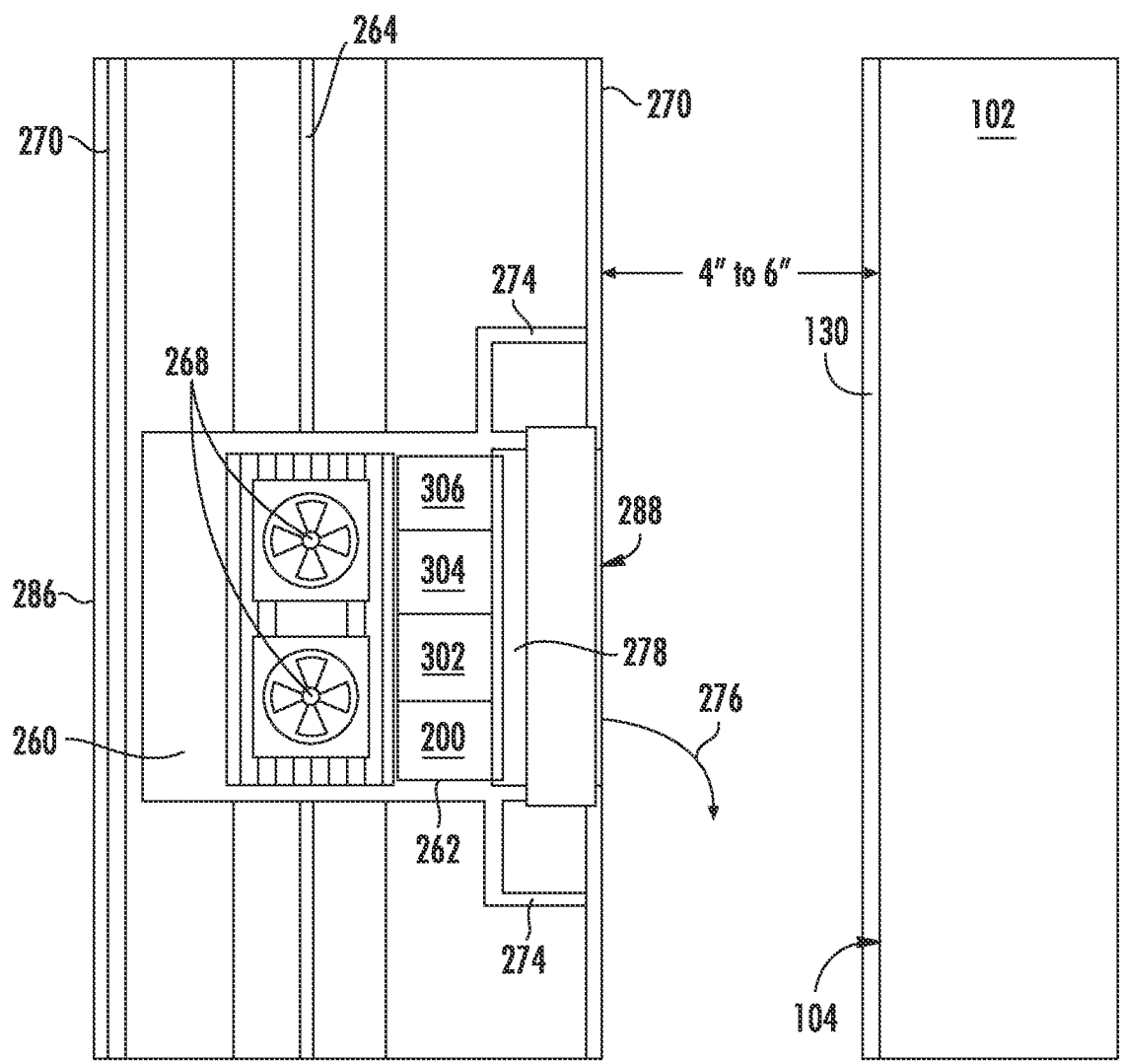
FIG. 10 schematically depicts a cross-section of the coating inspection system of FIG. 4, according to one or more embodiments shown and described herein.

Referring now to FIG. 10, the coating inspection system 114 may include an instrument housing 260. In some embodiments, the topography instrument 200, the first spectrometer 302, the second spectrometer 304, the temperature sensors 306, or other instruments of the coating inspection system 114 may be disposed within the instrument housing 260. In some embodiments, the instrument housing 260 may be a temperature and humidity controlled within a NEMA 12 enclosure. In some embodiments, the instrument housing 260 may be sealed, air tight, and water/moisture proof. The instrument housing 260 may have a lens 278 positioned along a side of the instrument housing 260 facing towards the creping cylinder 102. The lens 278 may be optically transparent and operable to enable light from the various instruments of the coating inspection system 114 to pass through with minimal or no reduction in the intensity of the light. In some embodiments, additional corrections may be made to the data received by the instruments or the reference curves to correct for the presence of the lens.

The instrument housing 260 may include a temperature control system (not shown) operable to maintain the atmosphere inside the instrument housing 260 at a constant temperature, such as within +/−0.5° F. of a temperature setpoint. In some embodiments, constant temperature may be about 70° F.+/−0.5° F. The atmosphere inside the instrument housing 260 may include air or other gas. In some embodiments, the atmosphere inside the instrument housing 260 may be liquid cooled and heated in order to maintain a constant temperature of 70° F.+/−0.5° F. at all times. The instrument housing 260 may be liquid cooled and/or liquid heated using a filtered coolant and containment tank (not shown) which may contain antifreeze. This liquid coolant may be heated and cooled as needed to maintain proper temperature of the atmosphere inside the instrument housing 160. The coolant may be pumped through the instrument housing 260 and the scanning instrument array disposed therein to ensure that the proper temperatures are maintained. In some embodiments, the flow rate of the cooling liquid may be monitored with a pulse type flow meter. In some embodiments, the liquid coolant may also be circulated through the main control cabinet to provide cooling to the electronics of the control system 120 disposed within the main control cabinet.

Referring still to FIG. 10, in some embodiments, the temperature control system may include one or more than one fan 268 operable to circulate air or other gas throughout instrument housing 260. In some embodiments, the instrument housing 260 may include one or more than one temperature sensor inside the instrument housing 260. The temperature sensor may be operable to measure a temperature of the atmosphere within the instrument housing 260. The temperature of the atmosphere within the instrument housing 260 may be indicative of the temperature of one or more than one of the topography instrument 200, the first spectrometer 302, the second spectrometer 304, or the temperature sensor 306 disposed within the instrument housing 260.

In some embodiments, the atmosphere within the instrument housing 260 may be continuously circulated over or through a desiccant to remove moisture from the atmosphere within the instrument housing 260. In some embodiments, the desiccant may include a replaceable bed of anhydrous calcium chloride ($CaCl_2$)), which may maintain a nearly zero percent humidity within the instrument housing 260. For example, the desiccant may be operable to maintain the humidity in the instrument housing 260 less than 1%, or less than 0.5%, or even less than 0.1% by weight. In some embodiments, the instrument housing 260 may include one or more than one humidity sensor operable to measure the humidity of the atmosphere within the instrument housing 260. Enclosing the topography instrument 200, the first spectrometer 302, the second spectrometer 304, and the temperature sensor 306 within the instrument housing 260 and controlling the temperature and humidity may enable the coating inspection system 114 to operate and provide acceptable performance in dusty or dirty environments and environments with ambient temperatures up to 300° F.

Figure 11:
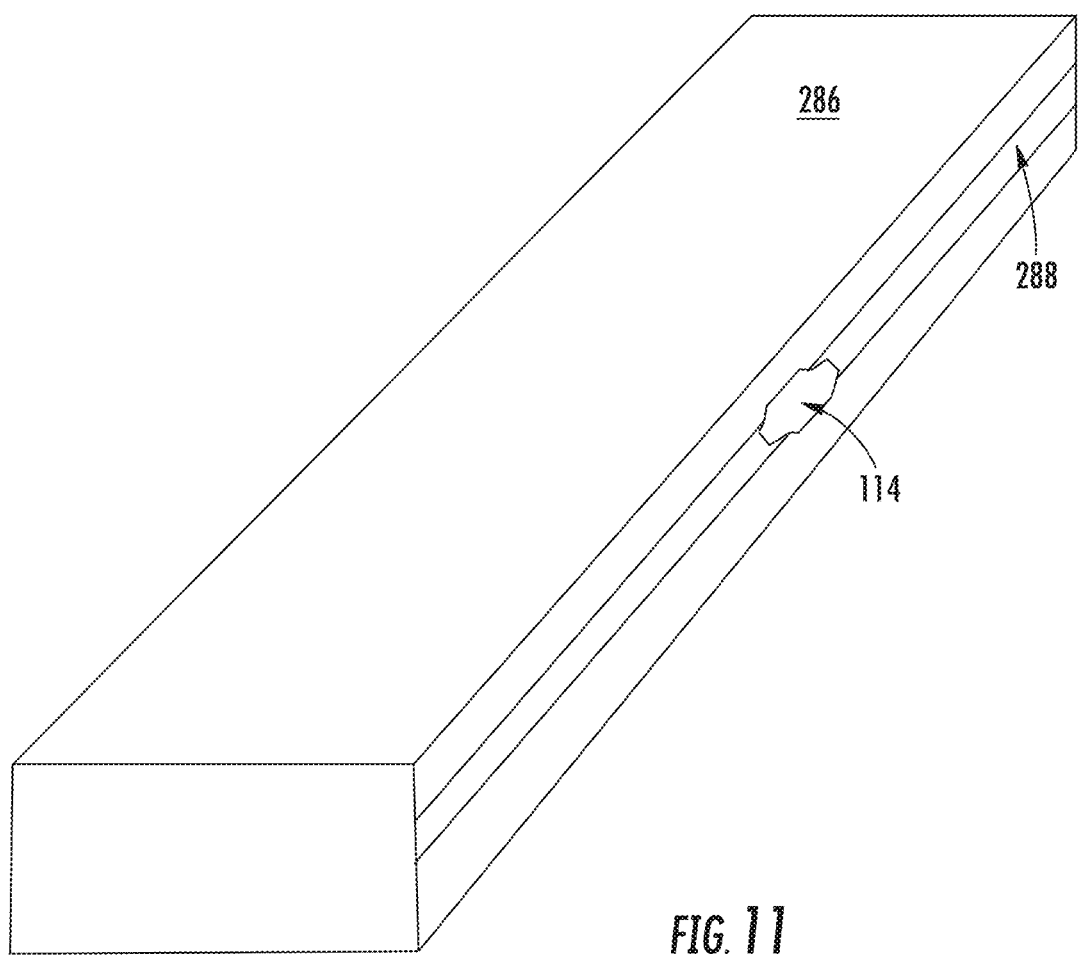
FIG. 11 schematically depicts a perspective view of the outer housing of the coating inspection system of FIG. 10, according to one or more embodiments shown and described herein.

FIG. 10 illustrates an interior view of the coating inspection system 114 shown in FIG. 4 and the associated air purge flow. FIG. 11 illustrates an outer housing 286 that surrounds and protects the coating inspection system 114. Collectively, FIGS. 10 and 11 illustrate the coating inspection system 114 comprising: (i) the topography instrument 200 comprising the microscope imaging system (e.g., CCD camera microscope) and light source system 202 (e.g., laser source); (ii) a the first spectrometer 302 (e.g., a UV-VIS-NIR 200 nm through 1000 nm spectrometer and light source); (iii) the second spectrometer 304 (e.g., a NIR 1000 nm through 2500 nm spectrometer and light source); and (iv) a temperature sensor 306 (e.g., an IR temperature detecting spectrometer). Referring to FIG. 10, the instrument housing 260 may be coupled to a first instrument positioner operable to translate the instrument housing 260 laterally along the width W (FIG. 4) of the creping cylinder 102. As used herein, the term "laterally" refers to a direction that is axial relative to the axis of rotation of the creping cylinder 102 and transverse with respect to the web of paper processed by the creping process 100. In some embodiments, the first instrument positioner may be a lubricated linear ball and guide assembly and the instrument housing 260 may travel back and forth along the lubricated linear ball and guide assembly. The linear ball and guide bars of the linear ball and guide assembly may be made of stainless steel for the shafting with powder coated support beams. The linear ball screws may be continuously lubricated to dissolve any build-up of sprayed chemicals, such as the adhesive composition.

The first instrument positioner may include a stepper motor drive and electronics operable to laterally position the instrument housing 260 and the instruments therein to within an accuracy of about 0.001 inch. In some embodiments, the coating inspection system 114 may include an instrument quadrature encoder that is operable to track and determine the position of the instrument housing 260 and the instruments disposed therein to within about 0.001 inch as the first instrument positioner traverses the instrument housing 260 back and forth across the width W of the creping cylinder 102. In some embodiments, the first instrument positioner may be operable to translate the coating inspection system 114 in discrete increments, which may correspond to data cells having a data cell width. The data cell width may be fixed across the width W of the outer surface 104. For example, in some embodiments, the data cell width may be 0.1 inches.

In some embodiments, the coating inspection system 114 may include a second instrument positioner (e.g., a rail movement, positioning stage, or other type of positioner) operatively coupled to the topography instrument 200. The second instrument positioner may be operable to translate the topography instrument 200 in a direction normal to the outer surface 104 of the creping cylinder 102 (i.e., moving the topography instrument 200 closer to or farther away from the outer surface 104 of the creping cylinder 102). For example, in some embodiments, the second instrument positioner may include a linear positioning stage, rail movement, or other type of positioner operable to move the topography instrument 200 closer to or farther away from the outer surface 104 of the creping cylinder 102. In some embodiments, the second instrument positioner may be coupled to the instrument housing so that the topography instrument 200, the first spectrometer 302, the second spectrometer 304, and the temperature sensor 306 may all be translated in a direction normal to the outer surface 104 of the creping cylinder 102 toward and away from the outer surface 104 of the creping cylinder 102. In some embodiments, the second instrument positioner may include a micro-stepping stepper motor to translate the coating inspection system 114, including the topography instrument 200, first spectrometer 302, second spectrometer 304, and temperature sensor 306, along the second instrument positioner. The second instrument positioner may be operable to position the topography instrument 200 relative to the outer surface 104 of the creping cylinder 102 to maintain the beam 206 in the center of the image area of the microscope imaging system 228 (FIG. 5). Additionally, the second instrument positioner may enable the topography instrument 200 to track the wear of the creping cylinder 102 (FIG. 1) down to a resolution of 0.000001 inches (0.0254 microns) so that operators may be able to predict when maintenance is needed on the creping cylinder 102.

In some embodiments, the entire scanning instrument array (i.e., including the topography instrument 200, first spectrometer 302, second spectrometer 304, temperature sensor 306, and any other instrument included in the coating inspection system 114) may be supported over its length by using a truss structure which may support the weight of the various instruments and maintain alignment while the instrument array is traversed back and forth across the width W of the creping cylinder 102. Referring to FIGS. 10 and 11, in some embodiments, the instrument housing 260 and truss structure may be entirely enclosed within an outer housing 286 which may be operable to keep the debris, water, and paper out of the linear guide assembly (i.e., positioner) and the scanning instrument array contained therein. In some embodiments, the outer housing 286 may be a stainless steel housing. In some embodiments, the outer housing 286 may include a small opening 288 through which filtered purging air may flow out of the outer housing 286 toward the creping cylinder 102. In some embodiments, the opening 288 may be narrow and may extend along a side of the outer housing 286 facing towards the creping cylinder 102. In some embodiments, a belt 270 may be coupled to the instrument housing 260 and extend laterally therefrom to block the opening 288 except for the portion of the opening 288 at the position of the instrument housing 260 and aligned with the lens 278 thereof. Referring to FIG. 10, purging air 276 introduced to the outer housing 286 may flow out of the outer housing 286 through the opening. The purging air 276 may provide a positive air pressure for the open area where the scanning instruments peer out of the outer housing 286. The positive pressure caused by the purging air 276 may maintain the lenses clean and free of the process debris, such as paper fibers or droplets of adhesive composition from application of the adhesive coating 130 for example.

Clean, filtered, and electronically monitored purge air delivered to the outer housing 286 by an air purging pump may be used to keep the lenses 278 clean and to keep debris out of the scanning instrument array. Plant air is dirty and costly. Thus, controlling the quality of the scanning instrument array purging air by employing electronics to monitor the purging air system for proper flowrate and filter condition may help to maintain accurate operation of the coating inspection system 114. In some embodiments, the intake for the purging air system may be positioned outside of the manufacturing facility to ensure the intake purging air supply is as clean as possible before filtering, conditioning, or other treatment.

Referring again to FIG. 1, the control system 120 may include at least one processor and at least one memory module communicatively coupled to the processor. The control system 120 may be communicatively coupled to the coating inspection system 114, the coating system 108, and the creping process 100, through the network 122. For example, in some embodiments, the control system 120 may be communicatively coupled to one or more than one of the topography instrument 200, the first spectrometer 302, the second spectrometer 304, the temperature sensor 306, the instrument quadrature encoder for the instrument housing 260, the cylinder quadrature encoder for the creping cylinder 102, the flow meter for the coating system 108, and the pressure gauge for the coating system 108. The control system 120 may also be communicatively coupled to any other temperature sensor, pressure sensor, moisture sensor, pump, blower, cooling fan, positioner, or other control or sensing device incorporated into the creping process 100. The present disclosure may be embodied in hardware and/or in software (including firmware, resident software, microcode, etc.). The control system 120 may have at least one processor and at least one computer-readable medium. A computer-usable or the computer-readable medium or memory module may be any medium that can contain, store, communicate, propagate, or transport the program for use by or in connection with the instruction execution system, apparatus, or device.

The computer-usable or computer-readable medium or memory module may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller. The network 122 may include wired or wireless communication pathways communicatively coupling the control system 120 to the various other system components (e.g., sensors, pumps, valves, instruments, gauges, motors, etc.).

Referring again to FIG. 1, the control system 120 may include a main control cabinet 126 configured to house multiple processors and multiple memory units. For example, in some embodiments, the main control cabinet 126 may be configured to house multiple networked PC type computers. These will be a minimum of 8 cores each and operate at clock speeds of 4.5 GHz or faster. The processors will be liquid cooled. In some embodiments, the main control cabinet 126 may also include one or more processors and memory modules for controlling one or more of the topography instrument 200, the first spectrometer 302, the second spectrometer 304, the temperature sensor 306, or other instrument of the coating inspection system 114. In some embodiments, the main control cabinet 126 may be NEMA 12 and may be cooled with an air conditioning unit. In some embodiments, the control system 120 may include a remote operator station 124 operable to allow an operator of the creping process 100 to remotely control and observe the systems and operations of the creping process 100, including the coating inspection system 114. The remote operator station 124 may enable the operator to access all function of the unit from this remote control console.

The coating inspection system 114 previously discussed can be used to determine a quality of the adhesive coating 130 applied to the outer surface 104 of the creping cylinder 102. The quality of the adhesive coating 130 can be evaluated by determining a plurality of properties or characteristics of the adhesive coating 130. For example, the quality of the adhesive coating 130 can be evaluated by measuring one or a plurality of the following properties and characteristics: the thickness of the adhesive coating 130; the topography of the adhesive coating 130; the rheology of the adhesive composition; the moisture content; the ash content; and/or the adhesive polymer content of the adhesive coating 130 using the coating inspection system 114. Additionally, the degree of cross-linking of the adhesive polymer in the adhesive coating 130 may also be measured using the coating inspection system 114. The coating inspection system 114 may be operable to provide real time information on these properties and characteristics of the adhesive coating 130 that can be used to make adjustments to one or more operating parameters of the creping process 100, thereby improving the quality of the creped tissue paper produced by the creping process 100. For example, the quality of the adhesive coating 130 determined from information obtained by the coating inspection system 114 may be used to adjust the adhesive composition or application of the adhesive composition to the outer surface 104 of the creping cylinder 102 during operation of the creping process 100.

As previously discussed, the topography instrument 200 of the coating inspection system 114 may be operable to measure the thickness, topography, and/or the rheology of the adhesive coating 130 applied to the outer surface 104 of the creping cylinder 102. Referring to FIG. 4, the coating inspection system 114, including the topography instrument 200, may be driven back and forth across the outer surface 104 of the creping cylinder 102 to accurately profile the applied coating thickness (depth) across the Yankee surface in contiguous 0.1 inch wide increments.

The topography instrument 200 of the coating inspection system 114 can be used to determine the thickness of the adhesive coating 130 by one of two methods. In the first method, an image of the cross-section of the beam 206 after passing through the adhesive coating 130 is captured using the imaging system 228 and the thickness of the adhesive coating 130 may be determined from the captured image. With the first method, the accuracy of the thickness of the adhesive coating 130 can be determined to a level of 0.0002 inches or better. In the second method, the thickness of the adhesive coating 130 may be determined by measuring an initial intensity (output intensity) of the beam 206 using the output intensity detectors, measuring the final intensity of the light beam 206 after passing through the adhesive coating 130 with the beam intensity measuring system 230, determining an absorbance of the light beam by the adhesive coating 130 from a difference between the initial intensity and the final intensity of the beam 206, and calculating the thickness of the adhesive coating 130 from the absorbance by the adhesive coating using Beer's Law and trigonometric relationships. With the second method, the accuracy of the thickness of the adhesive coating 130 can be determined to a level of 0.000001 inches (0.0254 microns) or better.

The topography instrument 200 of the coating inspection system 114 may be further used to determine or measure a profile of the entire Yankee dryer surface topography (i.e., topography of the outer surface 104 of the creping cylinder 102 or topography of the adhesive coating 130 applied thereto) to an accuracy of 0.000001 inches (0.0254 microns) or better. The rheology of the applied adhesive coating 130 can be determined by the topography instrument 200 of the coating inspection system 114 by comparing the coating thickness results of a linear grouping of the data cells (0.1 inch wide each) after each pass of the instrument array across the creping cylinder. Using the topography instrument 200 of the coating inspection system 114, the rheology of the adhesive composition in the adhesive coating 130 may be determined to a level of 0.000001 inches (0.0254 microns) or better. Rheology will be a result of the condition of the coating substance expressed in a change in thickness due to flow, caused by stress, but will depend on the degree of cross-linking between polymer chains and on the coating moisture content. Therefore, the rheology of the adhesive in the adhesive coating 130 may be determined through a combination of measurements obtained from the topography instrument 200, the first spectrometer 302, and the second spectrometer 304 of the coating inspection system 114. Methods for measuring the thickness, topography, and/or rheology of the adhesive coating 130 using the topography instrument 200 will now be described in greater detail.

Referring to FIGS. 5-8, as previously discussed, the imaging system 228 of the topography instrument 200 may be utilized in the first method to determine the thickness and/or topography of the adhesive coating 130. The first method of measuring the thickness employs common laws of physics governing reflection versus refraction of light rays passing into a translucent medium (e.g., the adhesive coating 130) from air, reflecting off of the outer surface 104 of the creping cylinder 102 (i.e., the Yankee surface), passing back through the adhesive coating 130, and finally refracting back out again, exiting the applied adhesive coating 130 into the air. The first method may include one or more of the following steps: generating a beam 206 of light with the light source system 202; measuring an initial intensity of the beam 206, directing the beam 206 of light towards the adhesive coating 130 on the outer surface 104 of the creping cylinder 102; capturing an image of the beam 206 with the imaging system 228 of the topography instrument 200 after the beam 206 has passed through the adhesive coating 130 and reflected from the outer surface 104 of the creping cylinder 102; and determining a thickness or a topography of the adhesive coating 130 from the initial intensity of the beam 206 and the captured image of the beam 206.

Referring to FIG. 6, as previously described, the light may be a beam 206 of light generated by the light source system 202. In some embodiments, the light source system 202 may combine the light from two lasers, one at 670 nm (i.e., first beam 211) and one at 440 nm (i.e., second beam 213), through mirrors and beam-splitters into one dual wavelength beam 206. An aperture plate 222 having a 0.01 inch to 0.04 inch aperture may be utilized to modify the beam diameter of the beam 206 focused onto the adhesive coating 130 and the outer surface 104 of the creping cylinder 102 (i.e., the coated Yankee Surface). The beam 206 may be directed towards the outer surface 104 of the creping cylinder 102 at a beam entry angle α of incidence of greater than or equal to 40 degrees. The diameter of the aperture may influence the dynamic range in the determination of the distance from the topography instrument 200 to the outer surface 104 of the creping cylinder 102 (i.e., Yankee surface) and the volume of reflections and refractions of the light through the coating. For example, a smaller diameter aperture will increase the dynamic range in determining the distance of the topography instrument 200 to the outer surface 104 of the creping cylinder 102, but will reduce the volume of reflections and refractions through the adhesive coating 130, thereby reducing the quantity of data available for determining the thickness of the adhesive coating 130. The aperture diameter of the aperture may be chosen such that the smaller the beam diameter you employ will increase the dynamic range in determining the distance of the instrument to the Yankee surface (for topography of the Yankee dryer surface) but at the same time will reduce the amount of volume of reflections and refractions through the coating thereby reducing the amount of data available for determining the coating thickness. In some embodiments, an aperture having a diameter of 0.025 inches may provide the best results for the purpose of this instrument with respect to balancing dynamic range with quantity of data available for determining the thickness. At the angle α of greater than or equal to 40 degrees, nearly 80% to 90% of the emitted laser light in the beam 206 may be refracted into the coating medium (i.e., the adhesive coating 130). This is based on the refractive index of the applied coating medium (i.e., the adhesive coating 130), which is generally translucent. Some wave patterns may be generated by the use of the aperture plate 222, but these wave patterns are of lesser intensity compared to the intensity of the main beam 206 and can be ignored by either adjusting the exposure time of the camera, or by setting a mathematical threshold for pixel response.

As previously described, the first method includes measuring the initial intensity of the beam 206. It is a requirement that the quantum of laser energy emitted be known. Referring to FIG. 6, the light source system 202 includes one or more output intensity detectors, such as the first output intensity detector 214 and the second output intensity detector 216, each of which may be operable to measure the initial intensity of one wavelength of light. As previously described, the output intensity detectors may be photo diode sensors with wavelength specific dichroic filters to isolate a narrow wavelength band around the wavelength of light to be measured by the photodiode sensor. Through the use of the wavelength specific dichroic filters (bandwidth=10 nm) and photo diode sensors, with the associated amplification circuits, the exact energies of each laser output can be determined.

Figure 12:
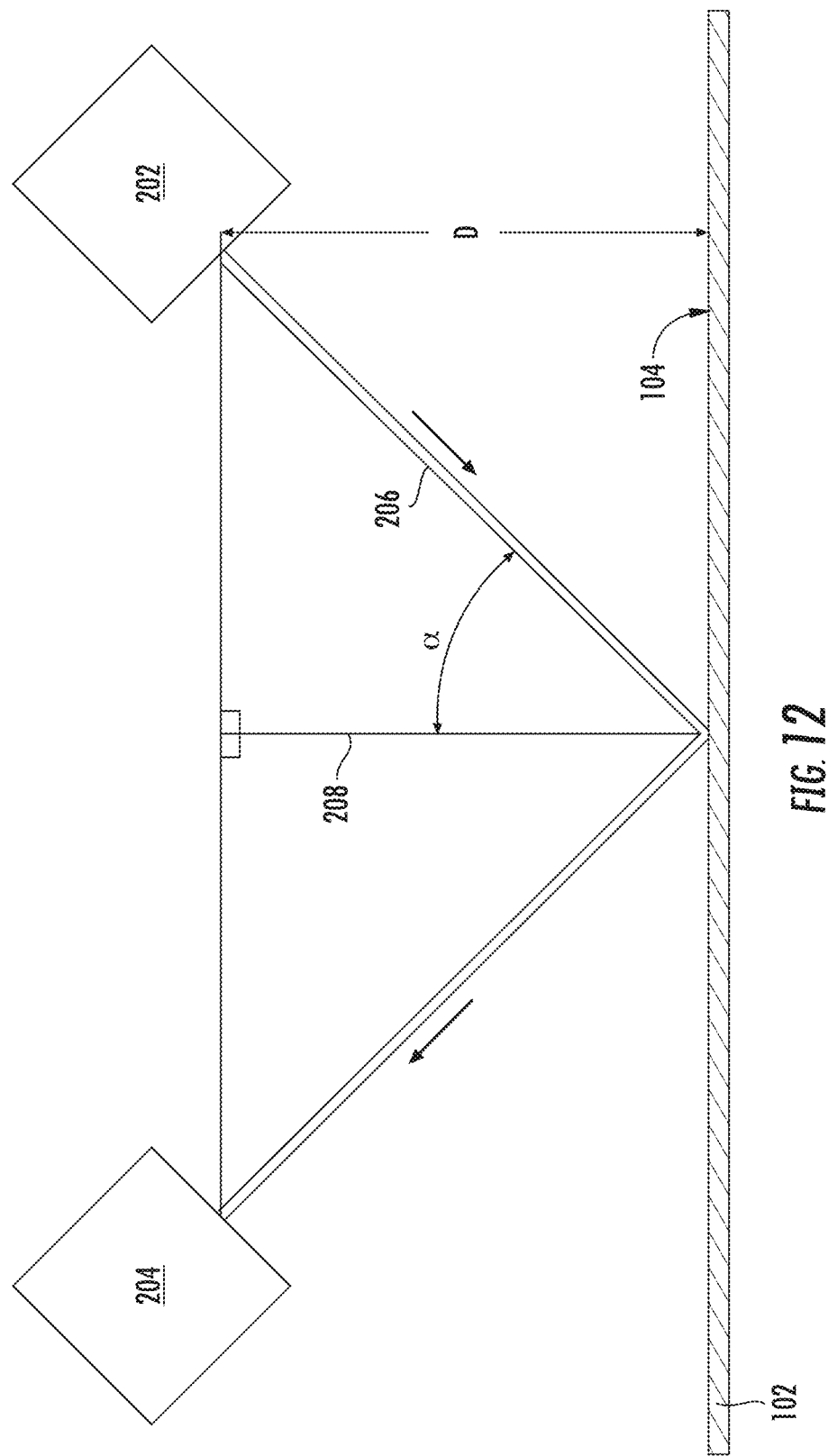
FIG. 12 schematically depicts operation of the topography instrument of FIG. 5 with an uncoated creping cylinder, according to one or more embodiments shown and described herein.

Referring to FIG. 12, the topography instrument 200 is shown directing the beam 206 produced by the light source system 202 towards the uncoated creping cylinder 102 at the angle α between the beam 206 and the direction 208 normal to the outer surface 104 of the creping cylinder 102. Although the angle α is shown in FIG. 12 as being 45 degrees, it is understood that the angle α can be any angle greater than or equal to 40 degrees and less than the Brewster's angle of the adhesive coating 130, as previously described in this disclosure. The topography instrument 200 may be positioned a distance D measured in the direction 208 normal to the outer surface 104 of the creping cylinder 102.

As shown in FIG. 12, without the adhesive coating 130 on the creping cylinder 102, the beam 206 may reflect off of the outer surface 104 of the creping cylinder 102 and may travel towards the detector system 204. Referring to FIG. 5, the imaging system 228 (e.g., CCD camera) of the detector system 204 may be positioned to capture an image of the beam 206 reflected from the outer surface 104 of the creping cylinder 102 without the adhesive coating 130 applied. The image of the reflected beam 206 without the adhesive coating 130 applied to the outer surface 104 of the creping cylinder 102 may provide a baseline profile on the reflection and absorbance of the metal of the outer surface 104 of the creping cylinder 102. This baseline profile of the reflection and absorbance of the metal of the outer surface 104 of the creping cylinder 102 may be used to compensate for the absorbance of the outer surface 104 of the creping cylinder 102 when determining the thickness of the adhesive coating 130.

Figure 13:
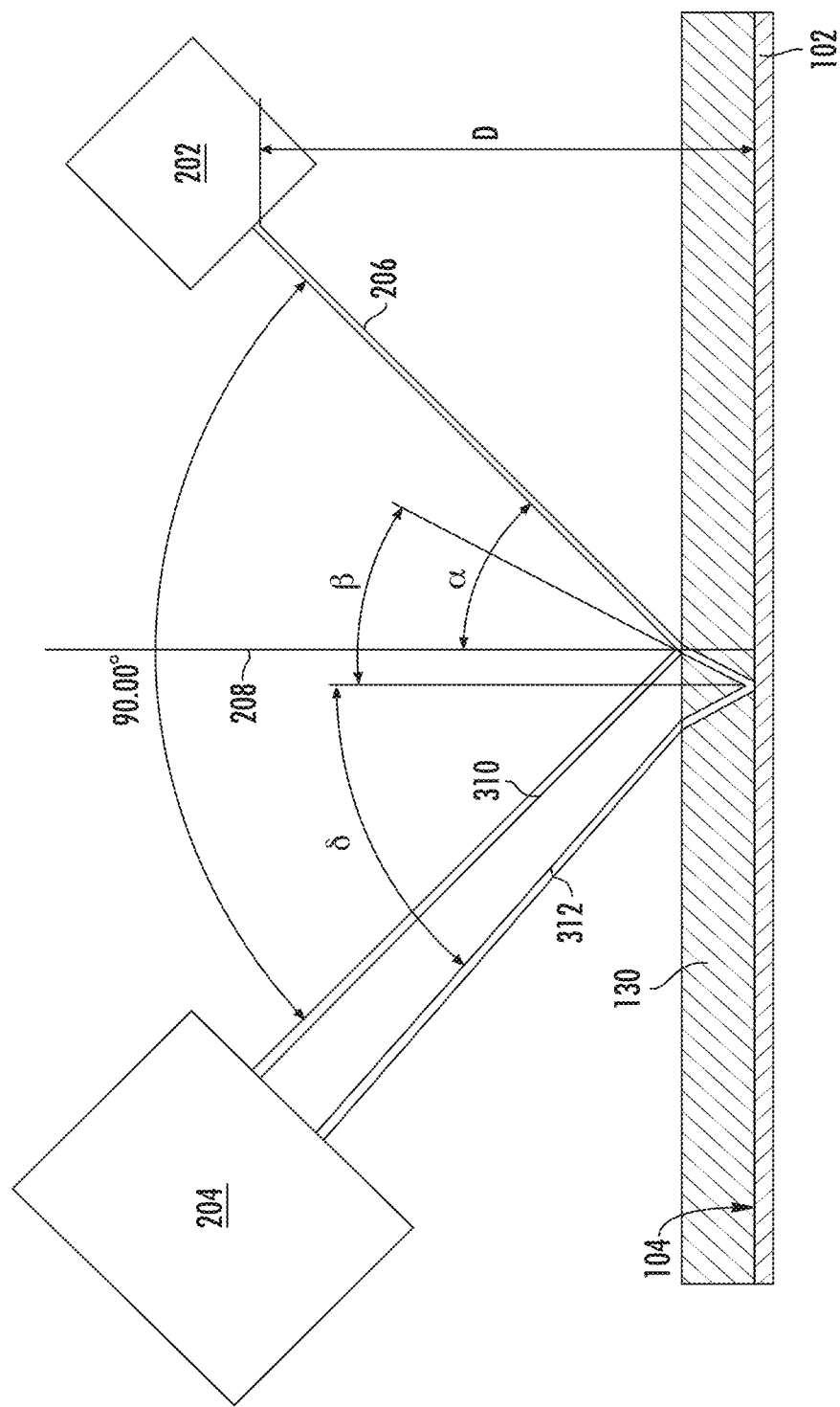
FIG. 13 schematically depicts operation of the topography instrument of FIG. 5 for determining the thickness of the adhesive coating on a coated creping cylinder, according to one or more embodiments shown and described herein.

Referring to FIG. 13, the travel path of the beam 206 from the light source system 202 to the detector system 204 is illustrated with the adhesive coating 130 applied to the outer surface 104 of the creping cylinder 102. The proportions in FIG. 13 have been exaggerated for purposes of illustration. As the beam 206 passes into the adhesive coating 130, the beam 206 refracts through the adhesive coating, which is a translucent medium, until the beam 206 reflects off the metal surface of the outer surface 104 of the creping cylinder 102 beneath the adhesive coating 130. The surface finish of the creping cylinder 102 (Yankee) may have a surface roughness characterized by an Ra in a range of from 12 Ra (450 microinches) to 25 Ra (1000 microinches). At the surface roughness of the outer surface 104 of the creping cylinder 102, the light beam 206 may reflect off of this surface in a mostly predictable manner generating a pattern of reflection relative to the finish/polish of this metal surface and modified by the thickness of the applied coating. As described in ASME B46.1, Ra is the arithmetic average of the absolute values of the profile height deviations from the mean line, recorded within the evaluation length. Simply put, Ra is the average of a set of individual measurements of the peaks and valleys of a surface. The Ra for a surface can be calculated from the following Equation 2 (EQU. 2).

$$Ra = (1/L)\int_0^L |Z(x)|dx \qquad \text{EQU. 2}$$

In EQU. 2, L is the evaluation length in inches, Z(x) is the profile height function. Some portion of the reflected rays will reflect at different angles than expected due to imperfections (i.e., hills and valleys) in the topography (finish) of the outer surface 104 of the creping cylinder 102 at its current state of polish (Ra value). Even as the Yankee surface (i.e., the outer surface 104 of the creping cylinder 102) becomes smoother (i.e., reduced Ra) over time, the outer surface 104 of the creping cylinder 102 will always include microscopic defects in the surface which will cause these random reflection patterns relative to the current Ra value.

Referring to FIG. 13, the path traveled by the beam 206 through the adhesive coating 130 may be described through consideration of Snell's Law. Snell's Law is based on the phenomenon that occurs when light passes from a less optically dense medium such as air into a translucent medium (more optically dense) such as the adhesive coating 130. When the beam 206 enters the adhesive coating 130, the speed of the light comprising the beam 206 from the laser source will slow down and shift toward a lower wavelength and will also change in direction slightly. This shift in direction will always be toward normal when light is entering into a more optically dense medium. In some embodiments, since the beam 206 includes two different wavelengths of light (440 nm and 670 nm), there will be a slightly different resultant angle for the 440 nm beam compared to the 670 nm beam (i.e., each wavelength of light in the beam 206 will have a slightly different refraction angle upon entering the adhesive coating 130). For instance, for a visible wavelength light of wavelength of 550 nm entering water (refractive index of n=1.333) at an angle of 42 degrees, the resultant refraction angle entering the water from air would be 30 degrees ($\sin^{-1}(\sin 42 \times 1/1.33=30.2)$) shifted toward normal on average. This is based on the average refractive index of 550 nm with n=1.333. Depending on the wavelength it will be slightly different for 440 nm and 670 nm, for which is n=1.337 and n=1.331, respectively, for water. The difference is determined using Snell's Law, which is provided below in Equation 3 (EQU. 3) for the case of refraction of the beam 206 by the adhesive coating 130.

$$n_{air} \sin \alpha = n_{coating} \sin \beta \qquad \text{EQU. 3}$$

In EQU. 3, $n_{air}$ is the refractive index of the ambient air, $\alpha$ is angle $\alpha$ of incidence of the beam 206 on the surface of the adhesive coating 130, $n_{coating}$ is the refractive index of the adhesive coating 130, and angle $\beta$ is the internal angle shown in FIG. 13 between the beam 206 traveling through the adhesive coating 130 and the direction 208 normal to the outer surface 104 of the creping cylinder 102. The refractive index of air $n_{air}$ is generally considered to be 1 (1.000277 for air at standard temperature and pressure), and the refractive index of the coating $n_{coating}$ may be between 1.333 and 1.6, however, the differences in refractive index (n) between different wavelengths is mentioned here only for reference implying that the actual refraction patterns will differ slightly blue to red.

When the beam 206 of laser light reflects off of the outer surface 104 of the creping cylinder 102 (i.e., Yankee surface) and travels back through the adhesive coating 130, the exact opposite refraction condition results when the beam 206 reaches the interface between the adhesive coating 130 and the air. The internal angle of 30 degrees, traveling through the applied coating, from the refracted initial beam of 42 degrees, will not hit the surface of the coating where 6% of the light will be reflected at 30 degrees again and 96% of this resultant beam will be refracted, and exit the coating medium at 49 degrees from the angle of incidence. Therefore, not only will the original image of the beam 206 be shifted dimensionally, but it will also be dimmer when received by the pixels of the imaging system 228 (i.e., CCD camera microscope) by the internal coating reflections as a percentage loss from the original beam intensities. Also, since the adhesive coating 130 is not completely transparent, the original beam intensities of the beam 206 may be attenuated proportional to its optical translucence properties. The adhesive coating 130 acts as a neutral density filter reducing the intensity of the beam 206 proportional to its refracted path length through the adhesive coating 130. The amount of change in the intensity of the beam 206 as well as the amount of dimensional shift of each resultant laser beam image received by the imaging system 228 (i.e., CCD camera microscope) is proportional to the thickness of the applied coating (i.e., the adhesive coating 130) and any change in the distance D between the topography instrument 200 and the outer surface 104 of the creping cylinder 102.

Figure 16:
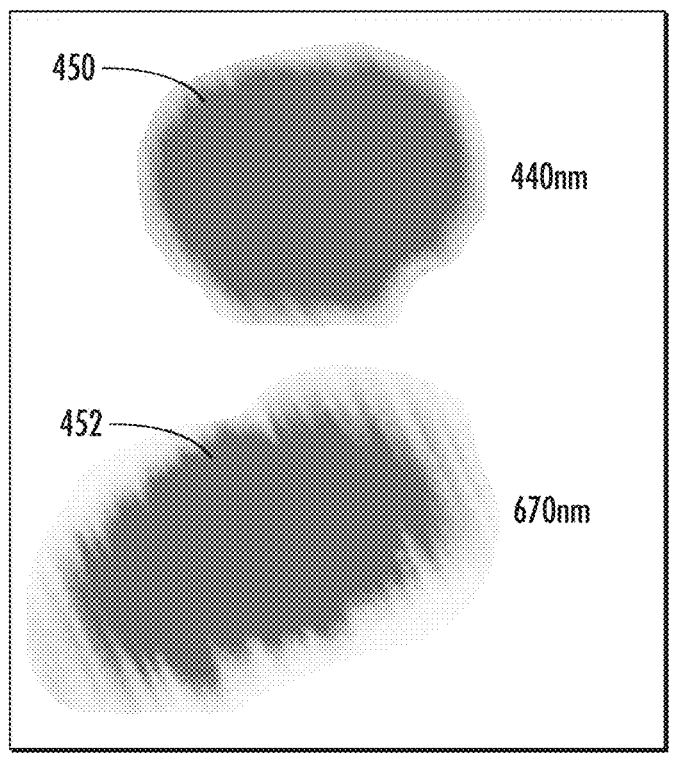
FIG. 16 is an image of laser spots captured by the microscope imaging device of FIG. 8 from a moving creping cylinder, according to one or more embodiments shown and described herein.
Figure 17:
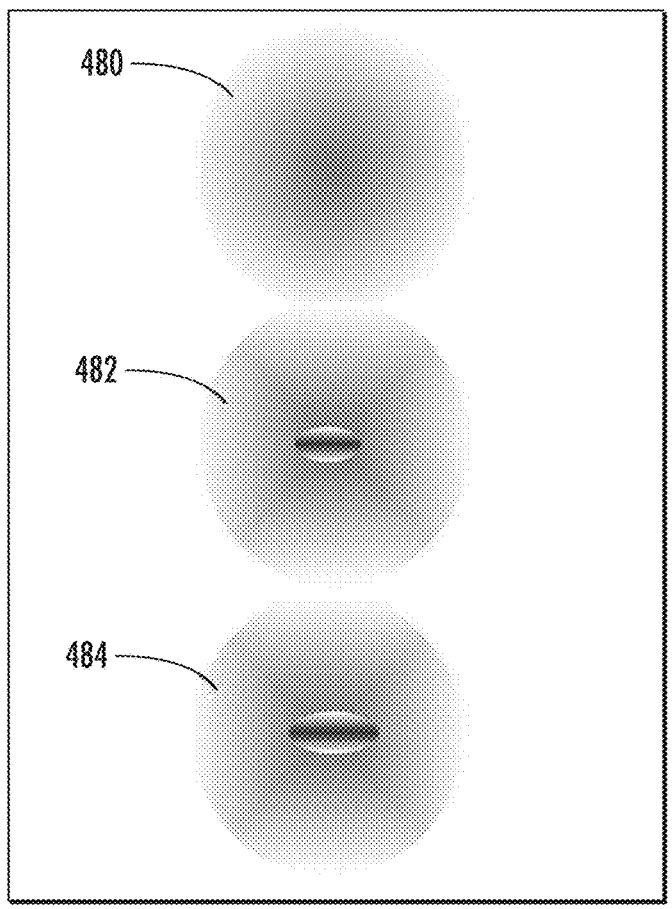
FIG. 17 illustrates the effect of the spot image change due to thickness changes of an applied coating to a reflective surface, according to one or more embodiments shown and described herein.
Figure 18:
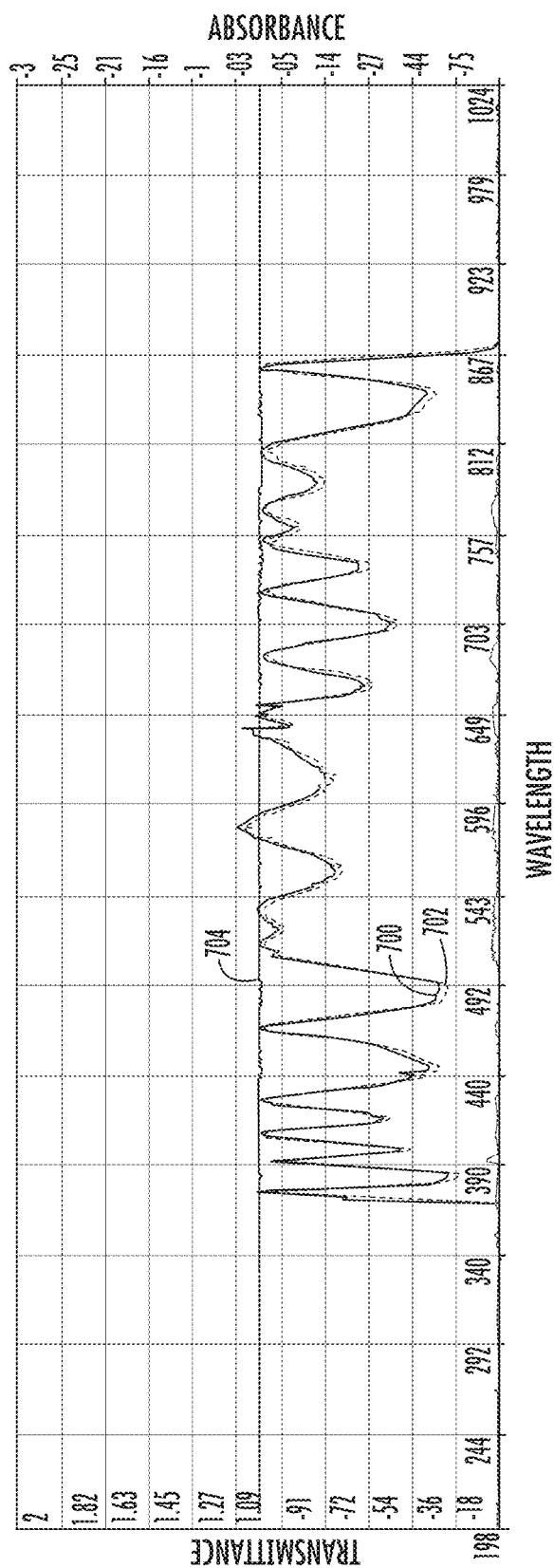
FIG. 18 graphically depicts the absorbance spectrum measured by a spectrometer of the coating inspection system of FIG. 4 and reference absorbance curve for barium sulfate (BaSO4), which is optically flat, expressed in intensity (y-axis) as a function of wavelength (x-axis), the absorbance spectrum facilitating calibration of the spectrometer, according to one or more embodiments shown and described herein.

The imaging system 228 captures an image of the cross section of the beam 206 after the beam 206 has passed through the adhesive coating 130 and been reflected from the outer surface 104 of the creping cylinder 102. Examples of the images captured by the imaging system 228 of the beam 206, which is a dual wavelength beam, are depicted in FIG. 16. In FIG. 16, the cross-section of the 440 nm portion of the beam 206 is indicated by reference number 450, and the cross-section image of the 670 nm portion of the beam 206 is indicated by reference number 452. As shown in FIG. 16, the difference in wavelength between the two wavelengths of light comprising the beam 206 may result in different shapes and positions of the image of the cross-section for each wavelength. Referring to FIG. 17, images of the cross-section of the beam are provided for an uncoated outer surface of the creping cylinder (reference number 480), a creping cylinder having an adhesive coating with a lesser thickness (reference number 482), and a creping cylinder having an adhesive coating with a greater thickness (reference number 484). As shown in FIG. 17, increasing the thickness of the adhesive coating 130 on the outer surface 104 of the creping cylinder 102 decreases the dispersion and increases the overlap of the reflected and refracted images.

Rather than analyzing individual reflections, of which there are thousands per image, the image can be compared to a reference of an uncoated metal surface of the same Ra value of surface finish. Since the reflections/refractions most often overlap each other, the overall image can be evaluated based on pixel response over an area. Since the reflectivity of the Yankee surface (i.e., the outer surface 104 of the creping cylinder 102) can vary from point to point, a correlation may be used to compensate for this variation in the reflectivity of the Yankee surface. It was found that, if you determined the area of the image spot in pixels for each laser (440 nm and 670 nm), the integration of the total pixel responses in that area would vary, mostly in linear fashion, and inversely proportional to the thickness of the applied coating. This is independently true for all coatings tested. However, it is expected that changes in pixel response are effected by the opacity of different materials. However, this effect could be easily corrected for mathematically for a particular substance by using a reference response curve for that material. Therefore, in some embodiments, determining a thickness of the adhesive coating 130 may include correcting the image information of the beam 206 for variability in the reflectivity of the outer surface 104 of the creping cylinder 102. In some embodiments, correcting the image information of the beam 206 for variability in the reflectivity of the outer surface 104 of the creping cylinder 102 may further include adjusting the image information with a reference response curve for a specific adhesive composition used for the adhesive coating 130.

The following equations 4-11 (EQU. 4-EQU. 11) correlate the integration of pixel responses over the number of pixels taken up by the image of each spot to the thickness of the adhesive coating 130.

$$\text{CalMils} = \text{a known calibration thickness ex.: 0.100 mils} \qquad \text{EQU. 4}$$

$$\text{@ ref thickness} = \text{refers to a value @ CalMils} \qquad \text{EQU. 5}$$

Slope Blue Size Thickness=((ln(CalMils)−0)/((Blue size coated thickness @ ref thickness×Blue integrated responses @ ref thickness)−(Blue size uncoated @0 mils thickness×Blue integrated responses @0 mils thickness)) EQU. 6

Offset Blue Size Thickness=ln(CalMils)−(Slope Blue Size Thickness×Blue size coated @ ref thickness×Blue integrated responses @ ref thickness)) EQU. 7

Slope Red Size Thickness=((ln(CalMils)−0)/((Red size coated @ ref thickness×Red integrated responses @ Ref thickness)−(Red size uncoated @0 mils thickness×Red integrated responses @0 mils thickness)) EQU. 8

Offset Red Size Thickness=ln(CalMils)−(Slope Red Size Thickness×Red size coated @ ref thickness×Red integrated responses @ ref thickness)) EQU. 9

Log 10(Blue Laser Thickness)=(((Blue size @ current thickness×Blue integrated responses @ current thickness)×Slope Blue Size Thickness)+Offset Blue Size Thickness)/1000 EQU. 10

Log 10(Red Laser Thickness)=(((Red size @ current thickness×Red integrated responses @ current thickness)×Slope Red Size Thickness)+Offset Red Size Thickness)/1000 EQU. 11

The previous equations EQU. 4 through EQU. 11 closely correlate to actual thickness in inches and may be used to determine the thickness of the adhesive coating 130 from the image information obtained from the imaging system 228 of the topography instrument 200. However, if necessary, the thickness can be further adjusted using one or both of the following equations 12 and 13 (EQU. 12 and EQU. 13):

Coating Thickness=(Coating Thickness*slope or gain)+offset EQU. 12

Coating Thickness=Coating Thickness+some offset (Such as −0.00005 mils, which is the current noise floor of the system) EQU. 13

In some embodiments, a plotted curve can be made at known thicknesses in order to have fixed reference points while calculating with the equations above (i.e., EQU. 4 through EQU. 13) to determine thicknesses between known points.

FIG. 12 depicts an uncoated creping cylinder 102 (i.e., Yankee cylinder) where the dual wavelength beam 206 reflects off of the outer surface 104 of the creping cylinder 102. Since no coating is present, nearly 100% of the emitted light beam 206 reflects toward the microscope (i.e., the imaging system 228 of the topography instrument 200). The degree of dispersion of the reflected beam coinsides with the Ra value of the surface finish of the current state of the outer surface 104 of the creping cylinder 102 (i.e., Yankee dryer surface). The greater the Ra value, the greater the dispersion will be.

FIG. 13 depicts a more typical situation where the outer surface 104 of the creping cylinder 102 (i.e., the surface of the Yankee dryer) has had the adhesive coating 130 applied. The angle α of incidence is set to 45 degrees in FIG. 13 for purposes of simplicity. However, it is understood that the angle α can be any suitable angle, such as any angle greater than or equal to about 40 degrees, or any angle between 40 degrees and 53 degrees.

In some embodiments, the light source system 202 (e.g., laser source or other light source) emits the dual wavelength beam 206 that includes light of 440 nm and 670 nm of stable known energy. The dual wavelength beam 206 first encounters the upper surface of the adhesive coating 130 where about 80% to 90% of the laser energy of the beam 206 is refracted into the coating. According to Snell's Law, at a refractive index of the adhesive coating 130 of n=1.5, the angle of refraction β will be 28 degrees toward the normal (i.e., the direction 208 normal to the outer surface 104 of the creping cylinder 102) of the entering beam 206. The beam 206 then reflects off of the outer surface 104 of the creping cylinder 102 (i.e., Yankee dryer surface) back through the adhesive coating 130. This angle of reflection off of the outer surface 104 of the creping cylinder 102 will also be at 28 degrees and heading toward the outer surface of the adhesive coating 130, where about 80% to 90% of this beam will be refracted out of the adhesive coating 130. The beam 206 exits the adhesive coating 130 at an exiting angle of refraction γ, which may be greater than the angle α of incidence of the beam 206 entering the adhesive coating 130. As shown in FIG. 13, the exiting angle or angle of refraction γ may be 45.24 degrees and may be laterally (i.e., in a direction axial with respect to the creping cylinder 102) shifted by 2×(tan (28 degrees))×(the thickness of the coating (for example 0.001 inches thick)). At a thickness of the adhesive coating 130 of 1.0 mils or 0.001 inches, the beam 206 would be shifted laterally by about 1.0 mils to the left in FIG. 13. In combination with the refraction, there will be a total shift of approximately 0.051 inches in the direction away from the light source system 202 (i.e., laser source) when viewed by the imaging system 228 (i.e., CCD camera microscope) compared to the uncoated creping cylinder 102 of FIG. 12, for which no shift occurs. Since the beam 206 is not a single particle of light, but is a two dimensional beam, an overlapping of the forward most point of the spot and the rear most point of the spot, causes an elongation of the spot as seen by the imaging system 228 (i.e., CCD camera microscope). This is because part of the beam is being reflected (10% to 20%) from the outer surface of the adhesive coating 130 and is not shifted, while approximately 80% to 90% of the contributing image is refracted and shifted. There will always be some intensity loss from the beam 206 due to reflection of portions of the beam 206 inside the coating and some of the intensity will be lost due to decreased optical translucency of the coating, as it will act like a neutral density filter. However, what is evident is that the image of the beam 206 captured by the imaging system 228 will become more elongated as the thickness of the adhesive coating 130 increases because of the overlap caused by refraction bending away from the laser source direction combining with the percentage of reflected rays.

Compensation for changes in laser intensity may be made or required to modify the results obtained from the images. In some embodiments, the results obtained from the images may be adjusted to compensate for changes in exposure time of the CCD camera (i.e., imaging system 228) and any focus adjustments. In some embodiments, determining the thickness, topography, or rheology of the adhesive coating 130 may include compensating or adjusting the image information obtained by the detector system 204 (i.e., including information obtained from the imaging system 228 and/or the first beam intensity detector 232 and the second beam intensity detector 234) for changes in the initial intensity of the beam 206, the exposure time of the imaging system 228, focus adjustments of the imaging system 228, or combinations of these.

A dual wavelength beam that includes light of two different wavelengths is preferably used for the beam 206 due to the fact that the different wavelengths reflect and refract differently with different materials. The reflected spot patterns generated from each laser are different (as shown in FIG. 16) however, the equations above hold true for both. In other words even though the spot sizes and characteristics may be different and the integrated pixel responses may be different as perceived by the imaging system 228 (i.e., the CCD imaging array), the relationship of integrated pixel response to pixel area of the spot holds true regardless of the wavelength.

Measuring the thickness of the adhesive coating 130 on the outer surface 104 of the creping cylinder 102 using the imaging system 228 of the topography instrument 200 may include directing the beam 206 towards the adhesive coating 130 at the angle α and capturing an image of the cross-section of the beam 206 after the beam 206 has passed through the adhesive coating 130 and been reflected from the outer surface 104 of the creping cylinder 102. The image of the cross-section of the beam 206 may include one or a plurality of image spots, where each of the image spots corresponds to a discrete wavelength of light in the beam 206. Measuring the thickness of the adhesive coating 130 using the imaging system 228 may further include comparing the image of the cross-section of the beam 206 with a reference image. The reference image may be an image of the beam 206 captured by the imaging system 228 without the adhesive coating 130 applied to the outer surface 104 of the creping cylinder 102. Measuring the thickness of the adhesive coating 130 using the imaging system 228 may include determining a thickness of the adhesive coating 130 from the comparison of the captured image of the beam 206 with the reference image. In some embodiments, determining the thickness of the adhesive coating 130 from the comparison of the captured image of the beam 206 with the reference image may include determining an elongation of one or more image spots of the captured image relative to the reference image. In some embodiments, measuring the thickness of the adhesive coating 130 using the imaging system 228 may include adjusting the image information obtained from the image of the beam 206 captured by the imaging system 228 or the thickness determined from the image for changes in the initial intensity of the beam 206, the exposure time of the imaging system 228, focus adjustments of the imaging system 228, or combinations of these.

As stated earlier, the CCD microscope method of determining coating thickness may have an overall resolution of 0.0002 inches for the thickness of the adhesive coating 130.

Referring to FIGS. 12 and 13, another aspect of the coating inspection system 114 is the ability to determine the distance D to the Yankee surface from the instrument imaging microscope device. In some embodiments, the topography instrument 200 may be operable to determine the distance D from the outer surface 104 of the creping cylinder 102 to the topography instrument 200, such as from the outer surface 104 of the creping cylinder 102 to the detector system 204, or more specifically to the imaging system 228, of the topography instrument 200. First, the center of the spot image of each laser in the image captured by the imaging system 228 may be determined by evaluating pixel responses to a threshold and by row and column. Since the angle α of incidence is known and constant, the center of the evaluated spot image will move in the field of view of the imaging system 228 (i.e., the CCD image area of the microscope) by a linear number of pixels corresponding to the change in the distance D of the topography instrument 200 (i.e., the instrument) to the outer surface 104 of the creping cylinder 102 (i.e., Yankee surface). The entire field of view, at the magnification of the microscope, is only approximately 0.06 inches from the very left pixels to the very right most pixels. From a digital standpoint, the distance resolution would be 0.06 inches/1280 pixels=0.00046875 inches/pixel. However, each pixel is 12 bit or 0 to 5 volts/4096. Spot sizes for both the blue laser and the red laser, at an exposure time of 50 microseconds comprise a pixel area made up of approximately 65,000 pixels each laser spot. The actual distance changes from the outer surface 104 of the creping cylinder 102 to the topography instrument 200 may be resolved down to a resolution of 0.000001 inches (0.0254 microns).

As previously discussed, the entire instrument (i.e., the topography instrument 200) may be placed on a rail movement or other type of positioner (second instrument positioner) so that as the outer surface 104 of the creping cylinder 102 wears (greater than the 0.06" field of view of the microscope), the topography instrument 200 can be repositioned on-the-fly (i.e., during operation), using a micro-stepping stepper motor, to re-center the image of the beam 206. The second instrument positioner and stepper motor may enable the topography instrument 200 to be moved forward, toward the outer surface 104 of the creping cylinder 102, as the outer surface 104 of the creping cylinder 102 wears. The ability to move the topography instrument 200 forward towards the outer surface 104 of the creping cylinder 102 may enable maintaining the image centered in the view area of the microscope imaging system 228. Additionally, measuring the distance D from the outer surface 104 of the creping cylinder 102 to the topography instrument 200 and moving the topography instrument 200 forward toward the outer surface 104 of the creping cylinder 102 may enable tracking of surface wear of the outer surface 104 of the creping cylinder 102, which may be used to predict when maintenance of the creping cylinder is needed. A dial indicator and other precision measuring devices may be used to calibrate the initial distance from the outer surface 104 of the creping cylinder 102 to the topography instrument 200.

In some embodiments, measuring the distance from the outer surface 104 of the creping cylinder 102 to the topography instrument 200 may include directing the beam 206 towards the adhesive coating 130 at the angle α and capturing an image of the cross-section of the beam 206 after the beam 206 has passed through the adhesive coating 130 and reflected from the outer surface 104 of the creping cylinder 102. The image of the cross-section of the beam 206 may be captured by the imaging system 228 of the topography instrument 200. The image of the cross-section of the beam 206 may include one or a plurality of image spots, where each of the image spots corresponds to a discrete wavelength of light in the beam 206. Measuring the distance from the outer surface 104 of the creping cylinder 102 to the topography instrument 200 may further include determining a center of the cross-section of the beam 206 from the captured image and comparing the center of the cross-section of the beam 206 to a center of the field of view of the imaging system 228. Measuring the distance from the outer surface 104 of the creping cylinder 102 to the topography instrument 200 may include determining the distance from the outer surface 104 of the creping cylinder 102 to the topography instrument 200 from the comparison and the initial distance of the outer surface 104 of the creping cylinder 102 from the topography instrument 200. The initial distance of the outer surface 104 of the creping cylinder 102 from the topography instrument 200 may be determined at the initial installation of the topography instrument 200 and may be determined using a precision measuring device, such as a dial indicator. In some embodiments, the distance D from the outer surface 104 of the creping cylinder 102 to the topography instrument 200 may be determined by adjusting a setpoint distance from the outer surface 104 of the creping cylinder 102 to the topography instrument 200 based on a difference between the center of the cross-section of the beam 206 determined from the captured image and the center of the view area of the imaging system 228. The setpoint distance from the outer surface 104 of the creping cylinder 102 to the topography instrument 200 may be the distance from the outer surface 104 of the creping cylinder 102 to the topography instrument 200 immediately after the most recent adjustment of the position of the topography instrument 200 relative to the outer surface 104 of the creping cylinder 102. The setpoint distance may be equal to the initial distance when the topography instrument 200 is first installed. In some embodiments, measuring the distance D from the outer surface 104 of the creping cylinder 102 to the topography instrument 200 may further include adjusting the image information obtained from the image of the beam 206 captured by the imaging system 228 for changes in the initial intensity of the beam 206, the exposure time of the imaging system 228, focus adjustments of the imaging system 228, or combinations of these.

In embodiments in which the microscope imaging system 228 is used to determine the distance D from the outer surface 104 to the topography instrument 200 and the thickness of the adhesive coating 130, the scan speed of the topography instrument 200 may be less than or equal to about 14 scans per second at a CPU speed of 4.5 gigahertz (GHz) with 8 cores. The scan speed of the topography instrument 200 may be increased by using the microscope imaging system 228 to measure the distance D from the outer surface 104 of the creping cylinder 102 only and determining the thickness of the adhesive coating 130 from measurement of the absorption of the beam 206 by the adhesive coating 130 using the beam intensity detectors 232, 234. Determining the thickness of the adhesive coating 130 using measurements of absorption reduces the number of calculations needed. Thus, it is possible to increase the scan speed of the topography instrument up to and including 20 scans per second by using the microscope imaging system 228 to measure the distance D only. The scan speed may be limited by processor speed of the processor system used to analyze the data from the topography instrument 200 rather than the imaging speed of the microscope imaging system 228. Thus, the scan speed of the topography instrument 200 may be increased by increasing the computing speed of the processors used to analyze the data, such as by employing faster CPUs. For example, using a liquid cooled 7 GHz CPU with 18 cores may increase the scan rates into the range of 40 to 60 scans per second for embodiments in which the thickness is determined from measurement of absorption using the first and second beam intensity detectors 232, 234 rather than the microscope imaging system 228.

The topography instrument 200 may be used to determine the thickness of the adhesive coating 130 from the absorbance of the beam 206 by the adhesive coating 130, in particular absorbance of the beam 206 by the adhesive polymers in the adhesive coating 130. For controlling the creping process and improving the quality of creped paper, it is desired to be able to determine the thickness of the adhesive coating 130 to a resolution of less than or equal to 0.000001 inches (0.0254 microns). By making use of the absorptivity of the adhesive polymers in the adhesive coating 130 at the two wavelengths of the light comprising the dual wavelength beam 206 (e.g., at 440 nm and at 670 nm for example), it is possible to apply Beer's law to determine a path length of the beam 206 through the adhesive coating 130, which can be used to determine the thickness of the adhesive coating 130 using trigonometric relationships. In some embodiments, the thickness of the adhesive coating 130 may be determined by determining the absorbance of at least one wavelength of light in the beam 206 by the adhesive coating 130, calculating the path length of the beam 206 passing through the adhesive coating 130 using Beer's Law, and calculating the thickness of the adhesive coating 130 from the path length of the beam 206.

The absorbance of each wavelength of light by the adhesive coating 130 may be determined by generating the beam 206 that includes at least one wavelength of light, directing the beam 206 towards the adhesive coating 130 where the beam 206 passes through the adhesive coating 130 and is reflected from the outer surface 104 of the creping cylinder 102, measuring the initial intensity of at least one wavelength of the beam 206, measuring the final intensity of at least one wavelength of the beam 206 after passing the beam through the adhesive coating 130 and reflecting the beam 206 from the outer surface 104 of the creping cylinder 102, and comparing the initial intensity of the beam 206 with the final intensity of the beam 206. In some embodiments, the beam 206 may be a dual wavelength beam.

Referring to FIG. 26, an absorbance spectrum showing 500 (y-axis) as the noise floor and the line 502 located near the middle at transmittance=1.0 (left y axis) and Absorbance=0.0 (right y axis) for uncoated stainless steel having an Ra of 16 over a wavelength range of from 200 nm to 1000 nm (x-axis) under ultraviolet long-wave spectrum is depicted. Referring to FIG. 27, an absorbance spectrum 504 over a wavelength range of from 365 nm to 860 nm (x-axis) spectrum is depicted for stainless steel having a Ra of 16 and coated with 0.5 mils of an adhesive composition. As shown in FIG. 27, the absorbance spectrum 504 for the stainless steel coated with 0.5 mils of adhesive exhibited peak wavelength from 365 nm to 390 nm. This peak lies in the ultraviolet long-wave portion of the spectrum.

Figure 15:
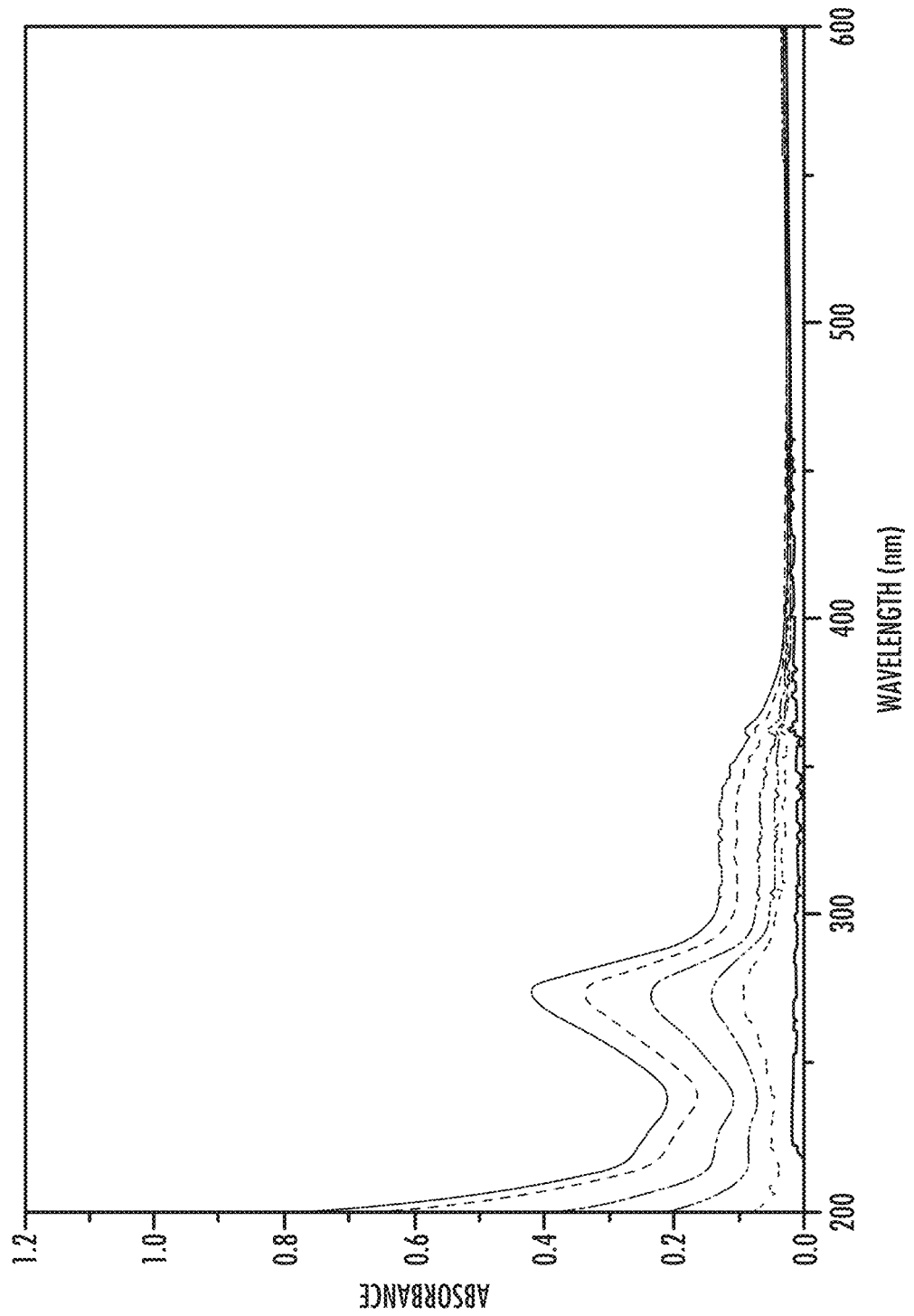
FIG. 15 graphically depicts absorbance spectra of an adhesive polymer (y-axis) over a wavelength range of from 200 nm to 600 nm, the absorbance spectra representing different concentrations of the adhesive polymer in an aqueous solution, according to one or more embodiments shown and described herein.

Referring to FIG. 15, a series of absorbance spectra for a typical adhesive composition at varying concentrations in water are depicted. As the concentration of the coating adhesive increases, the absorbance increases accordingly.

The changes in the absorbance spectra relative to a stable reference spectrum can be determined. Deviation of the absorbance spectra relative to a stable reference spectrum can be due to cross-linking and other energy changes in the adhesive composition. Calculating a stable energy state, or an acceptable energy state can be accomplished by integrating the product of the area of an absorbance peak/pixel (0.2 nm) multiplied by the wavelength of that pixel. The level of absorbance at any wavelength is directly proportional to the number of bonds which are able to absorb the wavelength. In other words, the level of absorbance at that wavelength and at the energy of radiation is proportional to the concentration of the absorbing bonds. Wavelength itself is a measure of the frequency at a known radiant energy. In other words, the product of the absorbance times wavelength $(A(\lambda)*\lambda)$ gives a number at any wavelength for the number of bonds at that wavelength which are at a known energy level because of the frequency at which the bonds absorb. Integration of the area of a peak determines its volume to be A.

The whole absorbance peak could move by X pixels (0.2 nm each) up or down in wavelength, but the integrated volume (area inside of the peak) may still have the same A value. This would not indicate any change in the overall energy state of the absorbing species. If the entire peak shifts to a lower wavelength (higher energy) or shifts to a higher wavelength (lower energy), this indicates that an important change has occurred in the molecular properties of the coating chemistry from an energy standpoint. At a specific wavelength, an energy volume number $Ev(\lambda)$ may be determined using the following Equation 14 (EQU. 14):

$$Ev(\lambda) = A(\lambda) * \lambda \qquad \text{EQU. 14}$$

where $Ev(\lambda)$ is the Energy volume number, $\lambda$ is the wavelength, and $A(\lambda)$ is the absorbance at a wavelength within the peak range. Integration of Equation 14 yields the reference energy volume ($EV_{ref}$) of the stable absorbance peak, as shown in the following Equation 15 (EQU. 15):

$$EVref = \int_{\lambda ps}^{\lambda pe} (A(\lambda) * \lambda) dx \qquad \text{EQU. 15}$$

where $EV_{ref}$ is the referenced energy volume of the stable absorbance peak, $\lambda$pe is the ending (higher) wavelength (lower energy) of the absorbance peak, and $\lambda$ps is the starting (lower) wavelength (higher energy) of the absorbance peak. EQU. 15 may be used when the process is stable, the coating is in good condition, and a snapshot of the coating during this state would be a good condition to duplicate at all times. Alternatively, the reference energy volume of the stable absorbance peak representing the adhesive having little or no cross-linking may be determined in the laboratory using the adhesive in the liquid state by a cuvette method. However, from a control perspective, applying EQU. 15 to process data, in real time, when the process is in a stable state and producing a good quality product may be preferable. At the time the reference number is calculated, current concentration c of the adhesive in the adhesive coating 130, the current thickness (converted to path length l in cm.) of the adhesive coating 130, and the absorbance per wavelength $A(\lambda)$, which is measured per pixel (0.2 nm), may also be measured and recorded.

Once determined, the $EV_{ref}$ is adjusted to correct for the current concentration c and the current thickness of the adhesive coating 130 (converted to path length l in cm.). The $EV_{ref}$ must be modified to correlate to the value for $A(\lambda)$ it would have been, if taken under the current concentration c and the current thickness of the adhesive coating 130. A modification of Beer's Law, which is discussed later, may be used to adjust $A(\lambda)$ to correct for the concentration c of the adhesive in the adhesive coating 130 and the thickness of the adhesive coating 130. The modified Beer's Law is provided in the following Equation 16 (EQU. 16):

$$A'(\lambda) = e(\lambda) * \left(\frac{lc}{lref}\right) * \left(\frac{Cc}{cref}\right) \qquad \text{EQU. 16}$$

where: $A'(\lambda)$ is the new reference absorbance, $e(\lambda)$ is the extinction coefficient constant for the coating polymer at a particular wavelength, Ic is the current path length, Iref is the reference path length value, Cc is the current concentration of the coating on the Yankee, and Cref is the reference concentration of the coating on the Yankee at time of reference. Then a modified reference energy volume number may be determined from the following Equation 17 (EQU. 17):

$$EV'ref = \int_{\lambda ps}^{\lambda pe} (A'(\lambda) * \lambda) dx \qquad \text{EQU. 17}$$

Then, the new scan data may be applied using the following Equation 18 (EQU. 18):

$$EVnum = \int_{\lambda ps}^{\lambda pe} (A(\lambda) * \lambda) dx \qquad \text{EQU. 18}$$

In EQU. 18, $\lambda$pe is the ending (higher) wavelength (lower energy) of the absorbance peak, and $\lambda$ps is the starting (lower) wavelength (higher energy) of the absorbance peak. The values for $\lambda$pe and $\lambda$ps used in EQU. 17 for $EV'_{ref}$ may be different than those used in EQU. 18 for $EV_{num}$ above. $EV_{num}$ is the current energy volume number for the current scan data.

The energy volume difference $EV_{diff}$ between the adjusted reference energy volume $EV'_{ref}$ and the current energy volume EVnum can be calculated from the following Equations 19 or 20 (EQU. 19 or EQU. 20):

$$EVdiff = \left[\int_{\lambda ps}^{\lambda pe} (A(\lambda) * \lambda) dx\right] - EVref \qquad \text{EQU. 19}$$

Or simply:

$$EVdiff = EVnum - EVref \qquad \text{EQU. 20}$$

where $EV_{diff}$ is the Energy Volume Difference between the recalculated reference $EV_{ref}$, and the current Energy Volume Number $EV_{num}$. If this number, $EV_{diff}$ is less than zero the overall energy state of the coating has increased and may indicate that the degree of cross-linking may have decreased. However, if this number, $EV_{diff}$, is greater than zero, the overall energy state of the coating has decreased and may be indicate that the degree of cross-linking may have increased. The goal from a control standpoint would be to try to maintain $EV_{diff}$ as close to zero as possible. Keeping the energy state of the coating molecules constant indicates that the process is running in a known stable state. If the energy state changes then the molecular properties have changed indicating process instability.

$EV_{ref}$ and $EV_{num}$ may be further adjusted to compensate for changes in the surface temperature of the creping cylinder 102, pH of the polymer (adhesive) solution, and the presence of other species that might absorb in the peak regions. The $EV_{ref}$ and $EV_{num}$ equations may require $A(\lambda)$ to be recalculated for temperature changes on the outer surface 104 of the creping cylinder 102. In some embodiments, a simple linear correlation y=mx+b based the differences in $A(\lambda)$ caused by temperature effects between two different known temperatures may be used to compensate for temperature. The effect of changes in pH could also have an effect on the absorbance spectra. Adjusting to correct for pH could be accomplished by adjusting the process water used in diluting the polymer for application, to a known pH prior to, or after the polymer solution being used, is blended for use in for application onto the outer surface 104 of the creping cylinder 102. Softening the water, removing heavier metals such as calcium and iron by substituting these and other metals with sodium through ion-exchange, could help keep the pH and other aspects of the process easier to control. This would also keep the spray nozzles from becoming blocked by lime over time.

Specifically, controlling a process by, or being used as part of a process control algorithm, by the changes in the overall molecular energy state of the molecules of the polymer coating. A method of calculating to assign a number which, not only reflects the volume (absorbance) of the peak at a frequency $A(\lambda)$ but, also the change in energy due to the location ($\lambda$) of the volume of energy (absorbance $A(\lambda)$) at ($\lambda$).

Referring again to FIG. 6, as previously described, the light source system 202 of the topography instrument 200 may include at least one output intensity detector, such as the first output intensity detector 214 and/or the second output intensity detector 216, each output intensity detector operable to measure the initial intensity of one wavelength of light comprising the beam 206. Referring to FIG. 8, the detector system 204 of the topography instrument 200 includes at least one beam intensity detector, such as the first beam intensity detector 232 and/or the second beam intensity detector 234, each of the beam intensity detectors may be operable to measure the final intensity of one wavelength of light in the beam 206 after the beam 206 has traveled through the adhesive coating 130 and been reflected form the outer surface 104 of the creping cylinder 102. As shown in FIG. 8, the detector system 204 may include a series of beam splitters 238 and dichroic filters (first filter 233 and second filter 235) along with photodiode detectors (e.g., first beam intensity detector 232 and second beam intensity detector 234) which, when amplified, are operable to measure residual (transmitted) light (i.e., final intensity of the light), from each wavelength (440 nm and 670 nm), which has passed through an unknown coating thickness. Since the individual laser output radiant powers (i.e., initial intensity of each wavelength) are known, by measuring the transmitted power (final intensity) of each wavelength of light in the beam 206 after passing the beam 206 through the adhesive coating 130, the absorbance $A(\lambda)$ of each wavelength by the adhesive coating 130 can be calculated using Equation 21 (EQU. 21), which is the equation for absorbance and provided below.

$$A(\lambda) = \log(100/\% \ T) = 2.000 - \log(\% \ T) \qquad \text{EQU. 21}$$

where:

$$\% \ T = 100 * (P/Po)$$

In EQU. 21, % T is the percent transmittance of wavelength $\lambda$ through the adhesive coating 130, P is the radiant power detected through the coating after any absorbance, Po is the radiant power transmitted through the coating. Po for an output of a 670 nm light source output is measured to be 216, and Po for an output of a 440 nm light source is measured 214. P is the radiant power measured after absorbance where 670 nm light is detected at 234 and the 440 nm light is detected at 232. If absorbance has occurred at a given wavelength, then P will be less than Po by the degree of absorbance.

Beer's Law states that the absorbance, $A(\lambda)$, of a species at a particular wavelength of electromagnetic radiation $\lambda$ is proportional to the concentration c of the absorbing species and to the length of the path l of the electromagnetic radiation through the sample containing the absorbing species. Beer's Law is expressed by the following Equation 22 (EQU. 22):

$$A(\lambda) = e(\lambda) l c \qquad \text{EQU. 22}$$

The molar absorptivity constant $e(\lambda)$ is called the absorbance of the species at the wavelength, $\lambda$. The molar concentration of the absorbing species, c. The path length (l) here, for the purposes of determining the thickness of the coating, is the path that the beam travels through the adhesive coating 130, which extends from the point at which the beam first enters the adhesive coating 130 to the point at which the beam refracts out of the adhesive coating 130 after being reflected from the outer surface 104 of the creping cylinder 102.

The concentration c of the adhesive polymer in the adhesive coating 130 may be known, such as by knowing the concentration of the adhesive composition applied to the outer surface 104 of the creping cylinder 102 or by determining the concentration c of the adhesive polymer using the first spectrometer 302 as described in further detail in this disclosure. Since we know the concentration c of the adhesive polymer as well as the molar absorptivity constant $(e(\lambda))$ of the adhesive polymer, then the absorbance detected is directly proportional to the path length l. The path length l calculated from the absorbance $A(\lambda)$ may then be converted to the coating thickness using trigonometric relationships. To rule out signal to noise ratio problems, due to the high analog gain involved on the transmitted signals, a high throughput analog input board may be used to yield 5000 readings per sensor per second. By averaging many separate readings, the occasional blips, such as those by cosmic particles and "popcorn" noise, can be averaged out. The repeatability of this method is within 0.000001 inches (0.0254 microns), which meets the requirement necessary to profile the coating thickness properly. It should be noted that different wavelength lasers could be substituted for better responses with different polymers.

Figure 28A:
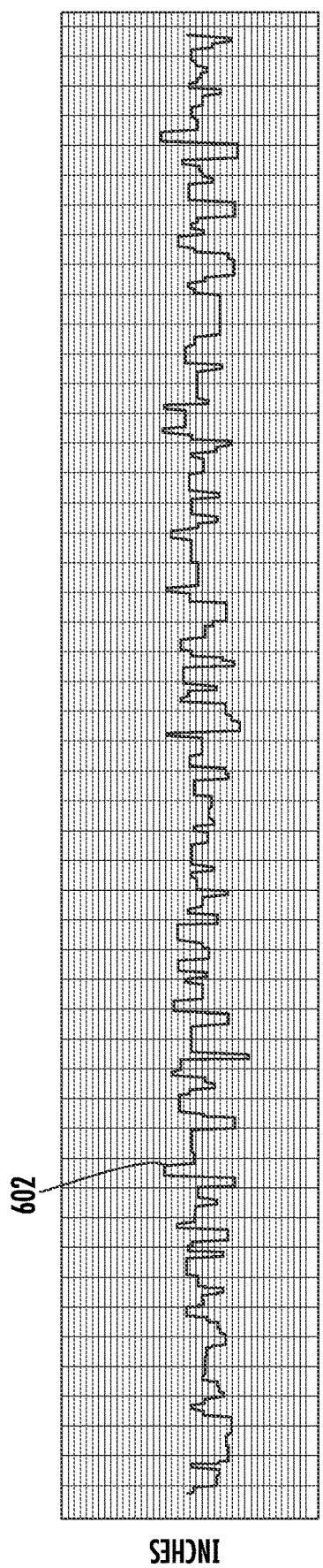
FIG. 28A graphically depicts the topography (y-axis) of an outer surface of a creping cylinder measured by the topography instrument of FIG. 5 as a function of the lateral position (x-axis) on the creping cylinder, according to one or more embodiments shown and described herein.
Figure 28B:
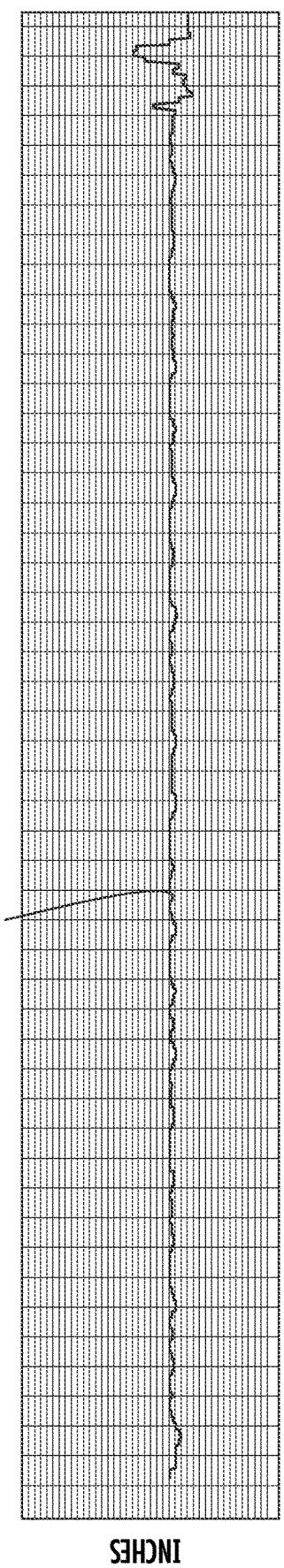
FIG. 28B graphically depicts a coating thickness and topography of an adhesive coating having an as-applied thickness of 0.000045 inches, the coating thickness and topography (y-axis) measured by the topography instrument of FIG. 5 as a function of the lateral position (x-axis) on the creping cylinder, according to one or more embodiments shown and described herein.
Figure 28C:
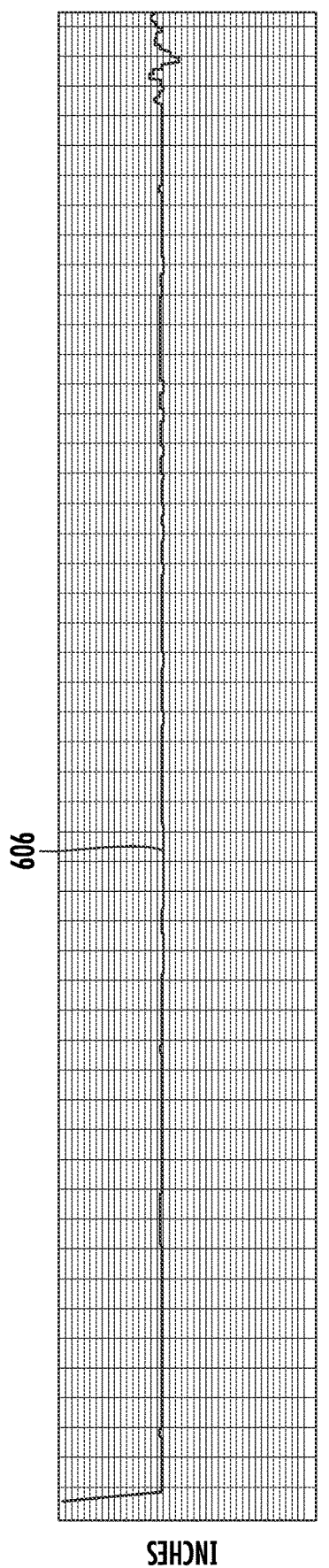
FIG. 28C graphically depicts a coating thickness and topography of an adhesive coating having an as-applied thickness of 0.000048 inches, the coating thickness and topography (y-axis) measured by the topography instrument of FIG. 5 as a function of the lateral position (x-axis) on the creping cylinder, according to one or more embodiments shown and described herein.
Figure 28D:
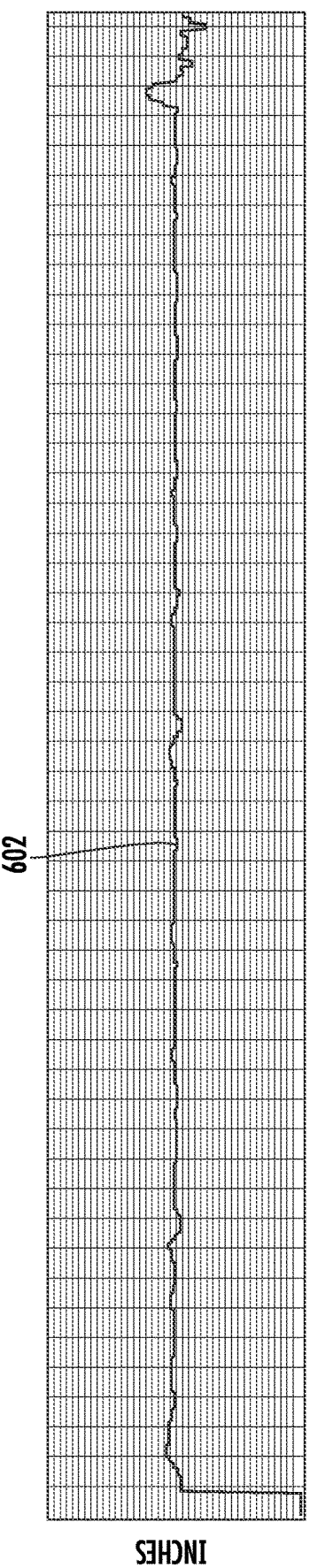
FIG. 28D graphically depicts a coating thickness and topography of an adhesive coating having an as-applied thickness of 0.000200 inches, the coating thickness and topography (y-axis) measured by the topography instrument of FIG. 5 as a function of the lateral position (x-axis) on the creping cylinder, according to one or more embodiments shown and described herein.

Referring to FIG. 28A, the topography 602 of an outer surface of a creping cylinder measured by the topography instrument 200 as a function of the lateral position on the creping cylinder is depicted. In FIG. 28A, the outer surface of the creping cylinder did not have an adhesive coating applied. Referring to FIG. 28B, a coating thickness 604 as a function of lateral position along the outer surface of the creping cylinder for an adhesive coating having an as-applied thickness of 0.000045 inches is depicted. The coating thickness 604 was measured using the topography instrument 200 disclosed herein. Referring to FIG. 28C, the coating thickness 606 as a function of lateral position along the outer surface of the creping cylinder for an adhesive coating having an as-applied thickness of 0.000048 inches is depicted. The coating thickness 606 was measured using the topography instrument 200 disclosed herein. Referring to FIG. 28D, the coating thickness 612 as a function of lateral position along the outer surface of the creping cylinder for an adhesive coating having an as-applied thickness of 0.000200 inches is depicted. The coating thickness 606 was measured using the topography instrument 200 disclosed herein.

Referring again to FIG. 13, in some embodiments, measuring the thickness of the adhesive coating 130 may include directing the beam 206 towards the adhesive coating 130 at the angle $\alpha$, where at least a portion of the adhesive coating 130 may pass through the adhesive coating 130, reflect from the outer surface 104 of the creping cylinder 102, and pass back through and out of the adhesive coating 130. Measuring the thickness of the adhesive coating 130 may further include measuring the initial intensity of the beam 206, measuring a final intensity of the portion of the beam 206 reflected from the outer surface 104 of the creping cylinder 102 and passed back through the adhesive coating 130, comparing the final intensity to the initial intensity, and determining an absorbance of the beam 206 by the adhesive coating 130 from the comparison between the initial intensity and the final intensity. Measuring the thickness of the adhesive coating 130 may further include calculating the thickness of the adhesive coating 130 from the absorbance of the beam 206 by the adhesive coating 130. The thickness of the adhesive coating 130 may be calculated from the absorbance of the beam 206 using Beer's Law and trigonometric functions as previously described in this disclosure. In some embodiments, the final intensity of the beam 206 may be adjusted to compensate for changes in the ash content of the adhesive coating 130, the concentration of adhesive polymers in the adhesive coating 130, the temperature of the adhesive coating 130 and/or the topography instrument 200, moisture content of the adhesive coating 130, absorbance of the beam 206 by the outer surface 104 of the creping cylinder 102, or combinations of these. In some embodiments, the thickness determined from the initial intensity and the final intensity of the beam 206 may be adjusted for vibrations created from the creping process 100. In some embodiments, the absorbance of the beam 206 by the adhesive coating 130 may further be adjusted to correct for instrument drift, LED junction temperature changes, LED age, or other parameter of the topography instrument 200. In some embodiments, the topography instrument 200 may be positioned at a calibration area and the output intensities of the light source (e.g., the first light source 210 and/or the second light source 212) calibrated.

In some embodiments, the topography of the adhesive coating 130 on the outer surface 104 of the creping cylinder 102 may be determined by combining thickness measurements from multiple data cells across the outer surface 104 of the creping cylinder 102. The width of each data cell may be set to a fixed width by configuring operation of the first instrument positioner. For example, in some embodiments, each data cell may have a width of about 0.1 inches wide. Referring to FIG. 4, for a creping cylinder 102 having a width W of the outer surface 104 of 15 feet, the number of 0.1 inch data cells across the width W of the outer surface 104 of the creping cylinder 102 would be about 1800 data cells. The length of the data cells may depend on the rotational speed of the creping cylinder 102, the exposure time of the coating inspection system 114, or both. For example, for a creping cylinder 102 rotating at a speed that results in a linear speed of the outer surface 104 of about 70 miles per hour, the data cell may have a length of about 70 inches. The topography of the adhesive coating 130 may be determined by measuring the thickness of the adhesive coating 130 for a plurality of data cells extending laterally and circumferentially across the outer surface 104 of the creping cylinder 102 and then aggregating the thickness measurements of the plurality of data cells to produce a topography profile of the adhesive coating 130.

Referring again to FIGS. 5 and 13, in some embodiments, the coating inspection system 114 may be operable to determine the rheology of the adhesive coating 130. The rheology of the adhesive coating 130 can be determined by a method similar to determining the topography of the adhesive coating 130. The rheology of the applied adhesive coating 130 can be determined by the topography instrument 200 of the coating inspection system 114 by comparing the coating thickness results of a linear grouping of the data cells (0.1 inch wide each) after each pass of the instrument array across the creping cylinder. Using the topography instrument 200 of the coating inspection system 114, the rheology of the adhesive composition in the adhesive coating 130 may be determined to a level of 0.000001 inches (0.0254 microns) or better. Rheology will be a result of the condition of the coating substance expressed in a change in thickness due to flow, caused by stress, but will depend on the degree of cross-linking between polymer chains and on the coating moisture content. Therefore, the rheology of the adhesive in the adhesive coating 130 may be determined through a combination of measurements obtained from the topography instrument 200, the first spectrometer 302, and the second spectrometer 304 of the coating inspection system 114. For example, by comparing current scan pass data cells to the data cells from previous scans at the same location, a non-Newtonian moment of the adhesive coating 130 can be determined. Since the differences between data cells, current scans to previous scans, can be used to determine the flow of the polymer, the degree of stress applied to the coating can also be determined. The resolution of the data cells is, again, 0.1 inch wide×0.000001 inch (0.0254 microns) high for any position across the entire width W of the creping cylinder 102 (i.e. Yankee dryer surface).

In some embodiments, determining the rheology of the adhesive coating 130 may include determining thicknesses of the adhesive coating 130 for a first plurality of data cells distributed across the outer surface 104 of the creping cylinder 102, each of the first plurality of data cells associated with a position on the outer surface 104 of the creping cylinder 102. Determining the rheology of the adhesive coating 130 may further include determining the thicknesses of the adhesive coating 130 for a second plurality of data cells, where the second plurality of data cells are associated with the same positions as the first plurality of data cells. The thicknesses of the second plurality of data cells may be measured subsequent to measurement of the thicknesses for the first plurality of data cells. Determining the rheology of the adhesive coating 130 may further include comparing the thicknesses of the adhesive coating 130 for the second plurality of data cells to the thicknesses of the adhesive coating 130 for the first plurality of data cells and determining a change in thickness of the adhesive coating 130 due to flow caused by stress on the adhesive coating 130. In some embodiments, determining the rheology of the adhesive coating 130 may further include adjusting the rheology of the adhesive coating 130 to account for the temperature of the adhesive coating 130 (as measured by the temperature sensor 306) and/or the composition of the adhesive coating 130 (as measured using the first spectrometer 302 and/or the second spectrometer 304).

Although the thickness, topography, and rheology of the adhesive coating 130 provide information on the quality of the adhesive coating 130, these attributes of the adhesive coating 130 provide less than a comprehensive evaluation of the quality of the adhesive coating 130. A more comprehensive evaluation of the quality of the adhesive coating 130 may be obtained by additionally measuring one or more than one of the concentration of the adhesive polymer in the adhesive coating 130, the moisture content of the adhesive coating 130, the ash content of the adhesive coating 130, the degree of cross-linking of the adhesive polymer in the adhesive coating 130, the concentration of other constituents of the adhesive composition, or combinations of these. As previously described, the coating inspection system 114 may include the first spectrometer 302, which may be operable to determine the concentration of the adhesive polymer in the adhesive coating 130, the degree of cross-linking of the adhesive polymer in the adhesive coating 130, or both. The first spectrometer 302 may also be operable to measure the concentration of other constituents of the adhesive coating 130, such as release agents or other additives.

A further aspect of the present disclosure relates to measuring the coating absorbance and fluorescence properties of the adhesive coating 130 in detecting the Yankee dryer adhesive/release coating thickness and coating quality using the first spectrometer 302. As previously discussed, in some embodiments, the first spectrometer 302 may be an industrialized Ultraviolet Visible Near-Infrared (UV-VIS-NIR) spectrometer, which may be operable to optically analyze the adhesive/release coating thickness as well as the quality of the adhesive/release coating applied (e.g., the composition of the adhesive coating 130 and/or the degree of cross-linking of the adhesive polymer in the adhesive coating 130. As previously discussed, in some embodiments, the light source of the first spectrometer 302 may include 20 to 30 different LEDs chosen at various wavelengths to ensure a consistent and constant radiant energy is produced across the entire spectrum of the spectrometer range of 200 nm to 1000 nm. The LEDs may be liquid cooled to remove the heat produced from this process. Each LED may be independently controlled for the radiant energy it produces and may be verified and servo controlled by the use of dedicated photo diodes and associated amplifier and control circuits for each. As part of the coating inspection system 114, the first spectrometer 302 may be driven back and forth (i.e., left to right or laterally) across the outer surface 104 of the creping cylinder 102. In some embodiments, the first spectrometer 302 may be positioned at a distance of from about 6 inches to 8 inches from the outer surface 104 of the creping cylinder 102 (i.e., Yankee dryer surface). Thus, the first spectrometer 302 may be positioned to yield measurements of the quality/thickness of the adhesive coating 130 for each 0.1 inch of linear movement of the coating inspection system 114 across the outer surface 104 of the creping cylinder 102.

In operation, the light from the light source of the first spectrometer 302 may be directed towards the adhesive coating 130 on the outer surface 104 of the creping cylinder 102. The light source of the first spectrometer 302 may be controlled to produce a defined output intensity of each wavelength of light. The light passes into the adhesive coating 130, reflects from the outer surface 104 of the creping cylinder 102, and passes back through the adhesive coating 130. At least a portion of the adhesive coating 130 may be absorbed by the constituents of the adhesive coating 130 and by the metal of the outer surface 104 of the creping cylinder 102. The light transmitted through the adhesive coating 130 and reflected from the outer surface 104 of the creping cylinder 102 may be collected by a detector of the first spectrometer 302. The detector may be operable to measure the transmitted intensity and wavelength of the light received by the detector. The transmitted intensity and wavelengths of the light received by the detector may be compared to the output intensity and wavelengths of the light produced by the light source of the first spectrometer 302 to produce an absorbance curve for the adhesive coating 130. In some embodiments, the absorbance curve measured for the adhesive coating 130 may be compared to a reference absorbance curve and the concentration of the adhesive polymer, degree of cross-linking of the adhesive polymer, concentration of other constituent, or combinations of these may be determined from the comparison. In some embodiments, the reference absorbance curve may be corrected for temperature of the adhesive coating 130, the composition of the adhesive coating 130, the thickness of the adhesive coating 130, or combinations of these.

In some embodiments, the reference absorbance curve may be corrected for temperature by producing a temperature reference plot. A different infra-red detector, such as the temperature sensor 306, may be utilized to produce an accurate temperature profile for the entire outer surface 104 of the creping cylinder 102 at a scan rate of 20 scans per second. As the temperature of the adhesive coating 130 changes, the absorbance bands for the adhesive coating 130, as measured by the first spectrometer 302, may shift. Therefore, the reference absorbance curve must be corrected for the temperature changes/fluctuations before comparing the absorbance curve for the adhesive coating 130 to the reference absorbance curve. This is easily done by comparing the incoming absorbance curve produced by the first spectrometer 302 to the reference absorbance curve for the coating created in memory, where there must be a slope and offset created for the adjustment for each pixel (0.2 nm) based on temperature drift. In other words, the reference absorbance curve may be adjusted by applying a slope and offset adjustment to each pixel (i.e., each 0.2 nm band of wavelength). These reference absorbance curves may be generated by running absorbance scans of the individual (pure) constituents of the adhesive composition of the adhesive coating 130 at two different calibration temperatures. The first calibration temperature $T_1$ may be at the lowest expected temperature of the adhesive coating 130, and the second calibration temperature $T_2$ may be at the highest expected temperature of the adhesive coating 130. For each pixel (0.2 nm) of the absorbance band, the true corrected pixel response for each pixel can be calculated from the reference scans, and corrected for the current temperature of the adhesive coating 130. The slope and offset for each pixel for each constituent of the adhesive composition can be determined from Equation 23 (EQU. 23) and Equation 24 (EQU. 24), respectively.

$$\text{Slope(constituent, pixel)} = \frac{(\text{Pixel Response at } T_2 - \text{Pixel Response at } T_1)}{(T_2 - T_1)} \quad \text{EQU. 23}$$

$$\text{Offset(constituent, pixel)} = \quad \text{EQU. 24}$$
$$(\text{Pixel Response at } T_2) - (\text{Slope(constituent, pixel)} \times T_2)$$

As the new absorbance pixels come in from the first spectrometer 302, the pixels for the reference absorbance curve stored in memory (i.e., one or more memory modules) may be adjusted for the current temperatures of the adhesive coating 130 (including the adhesive and release components). The pixel values for each reference pixel of the reference absorbance curve may be adjusted for the current temperature $T_c$ of the adhesive coating 130 using Equation 25 (EQU. 25) which is provided below.

$$\text{(New Reference Pixel Response)} = (\text{Slope(constituent, pixel)} \times T_c) + \text{Offset(constituent, pixel)} \quad \text{EQU. 25}$$

For example, for the adhesive polymer constituent of the adhesive coating 130, the New Reference Pixel Response for each pixel is equal to the sum of the Offset (adhesive, pixel) and the product of the Slope (adhesive, pixel) and current temperature $T_c$ of adhesive coating 130. For the release agent, the New Reference Pixel Response for each pixel is equal to the sum of the Offset (release, pixel) and the product of the Slope (release, pixel) and current temperature $T_c$ of adhesive coating 130. This series of temperature corrections must be done on each pixel (0.2 nm) for each constituent of the adhesive composition used for the adhesive coating 130.

In addition to correcting for temperature, the reference absorbance curve may be adjusted for the expected composition of the adhesive composition used for the adhesive coating 130. As previously described, the adhesive composition used for the adhesive coating 130 may be a mixture of multiple constituents (e.g., adhesive polymer, water, release agent, etc.), and the composition of the adhesive coating 130 may be controlled by the adhesive system 112 (FIG. 1) and/or the control system 120 (FIG. 1) of the creping process 100. Since the adhesive composition applied to form the adhesive coating 130 is determined by the control mechanism of this system (i.e., pump addition rates for each constituent of the adhesive composition), the percentages/ concentrations of each constituent are used to create a master component absorbance curve for reference to compare the actual incoming absorbance curve of the coating being applied. This is done by calculating each pixel as a percentage contribution of each component in the applied mix, based on the flow rates of each component of the applied coating. But before that can be done, the absorbance contribution of each constituent pixel response (0.025 nm/pixel) may be calculated based on the concentration of each constituent at different concentrations. According to Beer's Law, the pixel response is expected to be generally linear with respect to concentration, but will also vary linearly in response to changes in thickness of the adhesive coating 130 determined at any point an absorbance spectrum is measured or taken along the Yankee cylinder (i.e., the creping cylinder 102). According to Beer's Law, the absorbance of a species at a particular wavelength of light can be calculated from the percent transmittance of the wavelength of light using Equation 26 (EQU. 26).

$$A(\lambda) = \log(100/\% \ T) = 2.000 - \log(\% \ T) \qquad \text{EQU. 26}$$

As previously described, Beer's Law states that the absorbance, $A(\lambda)$, of a species at a particular wavelength of electromagnetic radiation, $\lambda$, is proportional to the concentration c of the absorbing species and to the length of the path, l, of the electromagnetic radiation through the sample containing the absorbing species. The equation for Beer's Law was previously provided in EQU. 22. As previously described, the molar absorptivity constant $e(\lambda)$ is the absorptivity of the species at the wavelength, $\lambda$. For purposes of determining the absorbance curve using the first spectrometer 302, the path length I is the thickness of the adhesive coating 130 as determined by the topography instrument 200 according to the methods previously described in this disclosure.

Again, each of the pixels of the reference absorbance curve may be corrected for the actual concentrations of each constituent of the adhesive composition (i.e., the concentrations of each constituent in the adhesive composition prior to forming the adhesive coating 130), as well as adjusting the reference absorbance curve for the applied thickness of the adhesive coating 130 at any point along the outer surface 104 of the creping cylinder 102 (i.e., the Yankee surface scanned). The adjustments for concentration of each constituent may be developed by measuring absorbance spectra at two known concentrations for each constituent, at a constant thickness and constant temperature for both. The two known concentrations may include a first concentration $c_1$ and a second concentration $c_2$. The first concentration $c_1$ may be at the lowest expected concentration of the constituent in the adhesive composition, and the second concentration $c_2$ may be at the highest expected concentration of the constituent in the adhesive composition. According to Beer's Law above, a linear relationship exists such that a slope and offset can be calculated for each pixel (1 pixel=0.2 nm) to modify each pixel of the reference absorbance curve, based on the actual addition rate for any constituent in the adhesive composition. The addition rate of each component is a function of this control. The slope and offset for each pixel for each constituent may be calculated using the following Equation 27 (EQU. 27) and Equation 28 (EQU. 28), respectively.

$$\text{Slope(constituent, pixel)} = \frac{(A(\lambda) \text{ at } c_2 - A(\lambda) \text{ at } c_1)}{(c_2 - c_1)} \qquad \text{EQU. 27}$$

$$\text{Offset(constituent, pixel)} = \qquad \text{EQU. 28}$$
$$(A(\lambda) \text{ at } c_2) - (\text{Slope(constituent, pixel)} \times c_2)$$

Therefore, the reference absorbance value at any pixel (every 0.2 nm) can be calculated from the following Equation 29 (EQU. 29) and corrected for concentration and temperature.

Reference Absorbance $A(\lambda)$ @ the current $[c]$ for each pixel=((concentration Slope×(Calculated $[c]$ from current addition rate of component))+ concentration Offset  EQU. 29

In addition to adjusting the reference absorbance curve for temperature and concentration, the reference absorbance curve may also be adjusted to compensate for variations in the thickness of the adhesive coating 130. In other words, in some embodiments, each pixel of the reference absorbance curve may be corrected for changes in the path length caused by variations in the thickness of the adhesive coating 130. As previously described, the light from the light source of the first spectrometer 302 passes into the coating, is reflected from the outer surface 104 of the creping cylinder 102, and passes back through the coating. Thus the light reflected from the outer surface 104 of the creping cylinder 102 makes two passes through the thickness of the adhesive coating 130. However, the data for the reference absorbance curves were also obtained in this same manner. Therefore, the pixels of the reference absorbance curve may be adjusted to account for the difference between the current thickness of the adhesive coating 130 and the thickness of the adhesive coating 130 used to make the reference absorbance curves. For example, the pixels of the reference absorbance curve may be adjusted for coating thickness according to the following Equation 30 (EQU. 30).

Corrected absorbance $A(\lambda)$ per pixel for coating thickness=(Reference Absorbance $A(\lambda)$ @ the current $[c]$ for each pixel)×(Current Coating Thickness/Coating thickness for the reference)  EQU. 30

This presents us with a perfect representation of what the absorbance curve should look like corrected for temperature, composition of the adhesive, and topography/thickness of the current adhesive coating 130 at that particular point across the outer surface 104 of the creping cylinder 102 (i.e., the Yankee surface). The procedure thus far has created a reference absorbance curve for each component only. The individual pixel responses (0.2 nm) of the reference absorbance curves for each of the constituents of the adhesive composition may then be added together to get the cumulative reference curve to be compared to the incoming scan of all of the components in the applied coating mix (i.e., the absorbance curve measured by the first spectrometer 302). For example, in some embodiments, the Total Pixel Response per pixel from all constituents of the adhesive composition may be calculated according to the following Equation 31 (EQU. 31).

Total Pixel Response per pixel from all components=Contribution from Adhesive component+Contribution from Release component+Contribution from Plasticizer component+Contribution from MAP component+Contribution from ~etc.  EQU. 31

Adding the reference absorbance curves for each of the constituents of the adhesive composition together produces an actual cumulative reference absorbance curve that reflects ideal conditions at the current temperature of the process and at the appropriate mixture concentrations of each constituent in the adhesive composition. The incoming absorbance curves generated by the first spectrometer 302 may be compared to the cumulative reference absorbance curve and various properties of the adhesive coating 130 may be determined from the differences between the incoming absorbance curves and the cumulative reference absorbance curve.

Differences in the magnitudes of one or more of the absorbance peaks of the incoming absorbance curve measured by the first spectrometer 302 compared to the cumulative reference absorbance curve may indicate a difference in the concentration of one or more than one constituent of the adhesive composition. For example, in some embodiments, a difference in the magnitude of the absorbance peak characteristic of the adhesive polymer in the incoming absorbance curve measured by the first spectrometer 302 compared to the cumulative reference absorbance curve may indicate a difference in the concentration of the adhesive polymer in the adhesive composition applied to the outer surface 104 of the creping cylinder 102 compared to the expected composition. This may indicate a problem with the adhesive system 112, the coating system 108, or another part of the creping process 100. In some embodiments, the difference in concentration may be transmitted to the control system 120, which may be operable to adjust one or more operating parameters of the adhesive system 112, coating system 108, or creping process 100. For example, in some embodiments, the control system 120, in response to receiving a difference in concentration from the coating inspection system 114, may be operable to instruct the adhesive system 112 to add or subtract amounts of one or more constituents of the adhesive composition in that area.

In some embodiments, the concentration of the adhesive polymer in the adhesive coating 130 may be determined by measuring an absorbance of light by the adhesive coating 130, generating an incoming absorbance curve of the adhesive coating 130 from measurement of the absorbance of light, comparing the incoming absorbance curve of the adhesive coating 130 to a reference absorbance curve, and determining a difference in concentration of the adhesive polymer in the adhesive coating 130 from the comparison. In some embodiments, the determining a difference in concentration of the adhesive polymer in the adhesive coating 130 may include identifying a difference in the magnitude of one or more absorbance peaks of the incoming absorbance curve relative to the reference absorbance curve and determining a difference in the concentration of the adhesive polymer in the adhesive coating 130 from the difference in magnitude of the one or more absorbance peaks.

In some embodiments, comparison of the incoming absorbance curve with the cumulative reference absorbance curve may indicate a shift in wavelength of one or more absorbance peaks. A shift in wavelength of one or more absorbance curves may indicate a change in the degree of cross-linking of the adhesive polymer in the adhesive coating 130. The resultant shift in wavelength of the absorption peak(s) due to changes in the degree of cross-linking (sharing protons between polymer chains) can result in a shift in the absorbance peak toward lower energy at a higher wavelength as the cross-linking increases. A normal peak for the type of polymer molecule used in an adhesive coating 130 on the creping cylinder 102, may have an absorbance peak at a wavelength in a range of from 285 nm to 400 nm when in aqueous solution, such as being applied to the creping cylinder 102. A typical polymer used in the creping process may be dendritic and may have several generations of convergent synthesis to tailor the polymer's properties to meet the specific application requirements. These are called dendronized polymers.

In solution with water, the adhesive polymer exhibits a peak wavelength representative of mostly tighter bound hydrogen atoms (i.e., protons), lower cross-linking (i.e., protons which are not linked to any other carbon atoms other than its parent carbon atom, may have an absorbance peak of 285 nm to 400 nm). This is a result of the bond strengths between the atoms of each of the molecules, at the molecules' current energy state (mostly due to temperature). If the molecule absorbs at a particular wavelength, it is because of its ability to accept energy at this frequency. If the bonds are able to absorb radiant energy at a particular wavelength, they will vibrate/stretch at this frequency reflecting the acceptance (absorbance) of the radiated energy they have absorbed. These energized bonds may then convert this absorbed light energy to heat, vibrating and/or stretching the bonds. These bonds want to lose this absorbed energy to settle back to the state they were in before this energy was absorbed. The absorbance wave length is expected to be toward higher energy at a lower wavelength. However, if the bond is being pulled on by nearby carbon atoms (other than its parent carbon atom), this causes the bond to be stretched slightly. Therefore, even though this increases the strength of the hydrogen bonding (covalent) between different or adjacent carbon atoms in the polymer molecule (higher cross-linking), the bonds have been stretched and the expected absorbance wavelength will be shifted towards lower energy at a higher wavelength. Increasing the cross-linking of the polymer can result in a stronger adhesive coating. An increase or decrease in the degree of cross-linking may only cause a shift in the absorbance peak of a few nanometers at most. This is well within the 0.2 nm resolution of the spectrometer being used for the first spectrometer 302.

The degree of cross-linking can affect the quality of the adhesive coating 130 applied to the outer surface 104 of the creping cylinder 102, which may impact the quality of the creped paper 140 produced by the creping process 100. If the degree of cross-linking is too great, then the adhesive coating 130 may become too brittle, and if the degree of cross-linking is too low, the coating may become too rubber-like. Controlling the degree of cross-linking of the adhesive polymer in the adhesive coating 130 may have a great impact on the quality of the creped paper 140 produced by the creping process 100. The degree of cross-linking of the adhesive polymer may be controlled by adding compounds, such as phthalates, which can lessen the cross-linking or controlling the moisture content of the adhesive coating, which may influence the amount of water embedded between the polymer chains and reduce the degree of cross-linking.

The degree of cross-linking of the adhesive polymer in the adhesive coating 130 may impact the quality of the adhesive coating 130. For example, in some embodiments, if the incoming absorbance band for the adhesive shifts slightly toward higher energy (i.e., decreasing wavelength), the degree of cross linkage between polymer chains of the adhesive polymer may have decreased relative to the ideal conditions represented by the cumulative reference absorbance curve, which may result in coating temper problem.

In some embodiments, the degree of cross-linking of the adhesive polymer in the adhesive coating 130 may be determined by measuring an absorbance of light by the adhesive coating 130, generating an incoming absorbance curve of the adhesive coating 130 from measurement of the absorbance of light, comparing the incoming absorbance curve of the adhesive coating 130 to a reference absorbance curve, and determining a degree of cross-linking of the adhesive polymer in the adhesive coating 130 from the comparison. In some embodiments, the determining the degree of cross-linking of the adhesive polymer in the adhesive coating 130 may include identifying a shift in wavelength of one or more absorbance peaks of the incoming absorbance curve relative to the reference absorbance curve and determining a difference in the degree of cross-linking of the adhesive polymer in the adhesive coating 130 from the shift in wavelength of the one or more absorbance peaks.

Even though the thickness of the adhesive coating 130 may be sufficient, the quality of the adhesive coating 130 in that area may not be of proper quality, such as by having too little or too much of the adhesive polymer in the adhesive composition or variances in the degree of cross-linking of the adhesive polymer. The small differences between the incoming absorbance curve measured by the first spectrometer 302 and the cumulative reference absorbance curve provide data on variances in the composition of the adhesive composition and degree of cross-linking of the adhesive polymers, which influence the quality of the adhesive coating 130 applied to the outer surface 104 of the creping cylinder 102. Evaluating the quality of the adhesive coating 130 applied to the outer surface 104 of the creping cylinder 102 by measuring the absorbance curve of the adhesive coating 130 and identifying these small differences may enable changes to be made to the creping process 100 to achieve the proper composition and chemical characteristics of the adhesive coating 130 applied to the outer surface 104 of the creping cylinder 102 in order to prevent excessive blade wear and improve the quality of the coating, which may result in a better quality creped-paper product while reducing costs of the creping process 100. The resolution of 0.1 inches of the first spectrometer 302 across the outer surface 104 of the creping cylinder 102 provides an overall picture of the creping process 100 on a microscopic level and may enable control systems and methods to be employed to correct and control the coating process on a molecular/microscopic level.

In some embodiments, the first spectrometer 302 may also be used to verify the thickness of the adhesive coating 130 determined by the topography instrument 200. For example, the thickness of the adhesive coating 130 may be obtained from the incoming absorbance curve measured by the first spectrometer 302 using Beer's Law (EQU. 22). Rearranging Beer's Law from EQU. 22 produces the relationship $l=A(\lambda)/(e(\lambda) \cdot c)$, where l is the path length, $A(\lambda)$ is the absorbance measured by the first spectrometer 302, and c is the concentration of one of the constituents (e.g., adhesive polymer) of the adhesive composition. Thus, the actual coating thickness, obtained from the topography instrument 200, can be verified directly from the absorbance curve obtained from the first spectrometer 302.

In addition to measuring the concentration and degree of cross-linking of the adhesive polymer in the adhesive coating 130, the coating inspection system 114 may be operable to measure the moisture content and ash content of the adhesive coating 130, which may provide additional information for assessing the quality of the adhesive coating 130. The water content and ash content of the adhesive coating 130 may be measured using the second spectrometer 304 of the coating inspection system 114. As previously described, in some embodiments, the second spectrometer 304 may be a near-infrared (NIR) spectrometer that may be operable to detect and measure the amount of moisture (i.e., water) in the adhesive coating 130. In some embodiments, the second spectrometer 304 may have a wavelength range of from 1000 nm to 2500 nm. The second spectrometer 304 may be operable to measure the moisture content of the adhesive coating 130 in real time. As part of the coating inspection system 114, the second spectrometer 304 may be driven back and forth across the outer surface 104 of the creping cylinder 102 to measure the moisture content of the adhesive coating 130 across the entire outer surface 104 of the creping cylinder 102.

Determining the moisture content of the adhesive coating 130 provides further indications of the quality of the adhesive coating 130. For example, the adhesive coating 130 may become too hard if the moisture content is insufficient. The continuous introduction of paper fiber and ash from the creping process will also affect the ability of the adhesive coating 130 to maintain sufficient moisture content. Additionally, the temper of the adhesive coating 130 may be important to the creping process and may be influenced by the moisture content of the adhesive coating 130. For example, if the adhesive coating 130 has too little moisture, the adhesive coating 130 may become too hard, which may cause excessive wear on the creping blades. Additionally, insufficient moisture content may influence the tackiness of the adhesive coating 130 so that the adhesive coating 130 may not provide the proper tackiness at the roll-nip for adhesion of the paper. Further, insufficient moisture content may cause the adhesive coating 130 to lose its durability, become brittle, and possibly exhibit cracking. If the moisture content is excessive (i.e., too much water), the adhesive coating 130 may become like jelly and may not adhere to the paper at the roll-nip. Additionally, excessive moisture content may cause the adhesive coating 130 to lose its effectiveness in protecting the creping cylinder 102 (i.e., Yankee cylinder) from damage caused by the creping blade. Failure to maintain control of the moisture content of the adhesive coating 130 within a target range will thus diminish the overall creping quality. Determining the moisture content of the adhesive coating 130 and maintaining the moisture content within an acceptable range may ensure that an adhesive coating 130 exhibitting good temper and durability is produced on the outer surface 104 of the creping cylinder 102.

Figure 14:
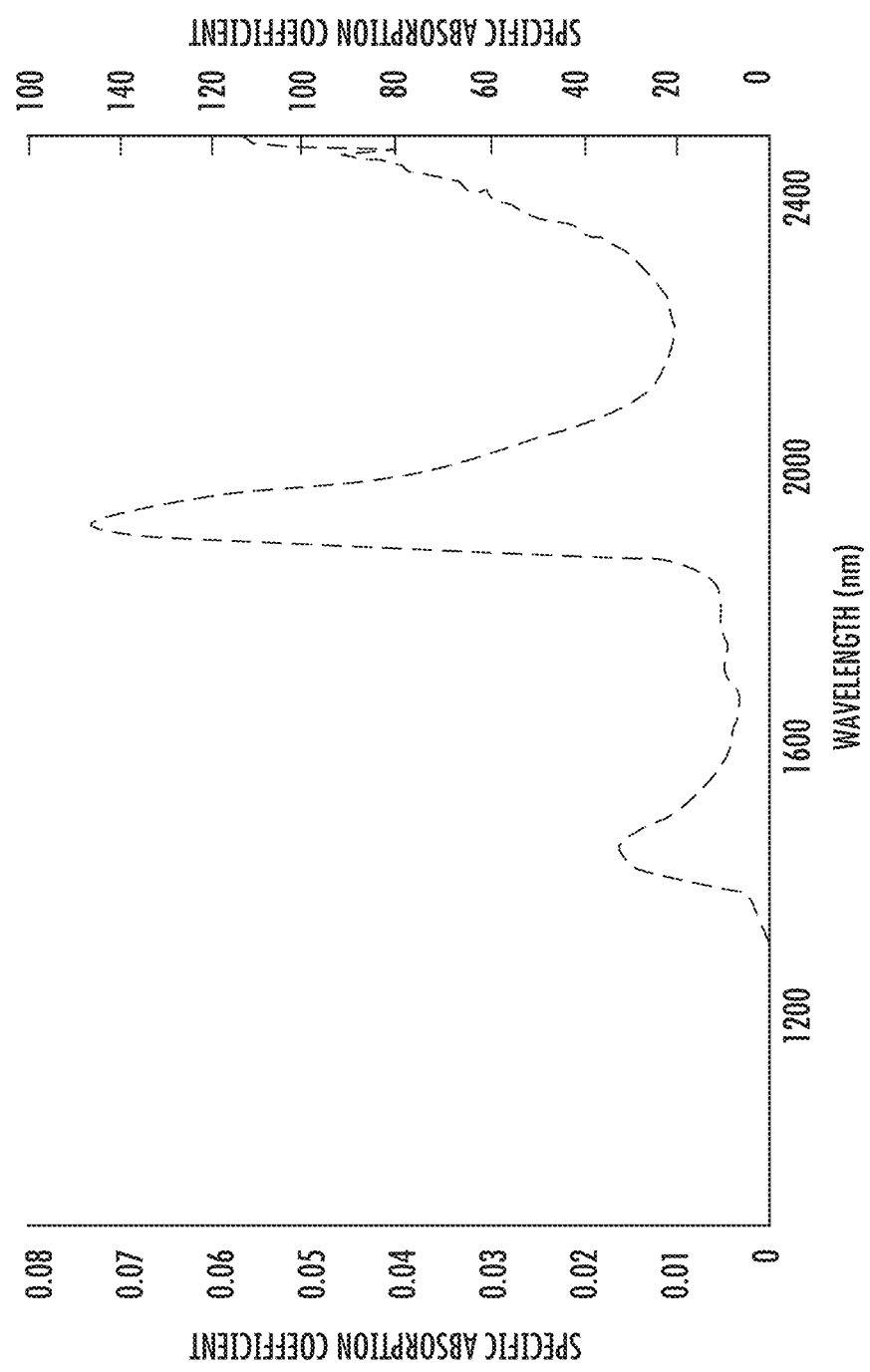
FIG. 14 graphically depicts the absorbance of water (y-axis) in the near-infrared (NIR) spectrum in a wavelength range from 1000 nm to 2500 nm (x-axis), according to one or more embodiments shown and described herein.

Water has strong light absorbance bands centered at wavelengths of about 1450 nm, about 1940 nm, and about 2500 nm, with important secondary absorbance bands centered at wavelengths of about 980 nm and about 1240 nm (Carter, 1991). FIG. 14 provides an absorption curve for water in the wavelength range of from 1000 nm to 1500 nm. Absorbance of water follows the formula; $a*v1+v2+b*v3$ where $a+b=1$. Specifically, v1 is symmetrical stretch of the H—O—H water molecule bonding distance of the hydrogen atoms from the Oxygen atom at its center. The v2 is a measure of a changing bond angle from the normal 104.4 degrees at 20° C. Finally, v3 is the asymmetrical stretch where the Hydrogen atoms are in stretch mode but one Hydrogen atom is stretching toward the Oxygen atom and the other away from it. There are many absorbance bands for liquid water and they all absorb in a similar manner.

Operation of the second spectrometer 304 to measure the moisture content of the adhesive coating 130 may be similar to the method of measuring the content of the adhesive polymer in the adhesive coating 130 using the first spectrometer 302. For example, the moisture content of the adhesive coating 130 may be determined from comparing an incoming absorbance curve produced by the second spectrometer 304 against one or more reference absorbance curves. Comparing the incoming absorbance curves against the reference absorbance curve may include determining a difference in the magnitude of one or more absorbance peaks of the incoming absorbance curve against the corresponding peaks on the reference absorbance curve. The absorbance peaks compared may include one or more absorbance peaks corresponding to the absorbance bands of water (i.e., primary absorbance bands centered at wavelengths 1450 nm, 1940 nm, and 2500 nm, or secondary absorbance bands centered at wavelengths of 980 nm and 1240 nm, as previously described). In some embodiments, the moisture content of the adhesive coating 130 may be determined by comparing the magnitude of an absorbance peak in a range of from 1920 nm to 1950 nm of the incoming absorbance curve to the magnitude of a corresponding absorbance peak of the reference absorbance curve. In some embodiments, the moisture content of the adhesive coating 130 may be calculated from the moisture content represented by the reference absorbance curve and a difference in the magnitude of the absorbance peak(s) of the incoming absorbance curve to the reference absorbance curve.

The reference absorbance curves for moisture content for the second spectrometer 304 may be generated by a process similar to the process described for generating the reference curves for the constituents of the adhesive composition using the first spectrometer 302. For example, absorbance curves for two adhesive coatings 130 having different known moisture contents may be generated using the second spectrometer 304. These two reference absorbance curves may be used to model the pixel response for each of the pixels of the second spectrometer 304. In some embodiments, the reference absorbance curves of the second spectrometer 304 may be corrected for temperature, composition of the adhesive coating 130, thickness of the adhesive coating 130, or other parameter, or combination of parameters similar to the adjustments described previously in relation to operation of the first spectrometer 302.

In some embodiments, the moisture content of the adhesive coating 130 may be adjusted in response to the moisture content determined by the second spectrometer 304. For example, in some embodiments, in response to the moisture content determining using the second spectrometer 304, the control system 120 (FIG. 1) may adjust the moisture content of the adhesive coating 130 by adjusting the amount of one or more constituents of the adhesive composition, introducing the use of plasticizers into the adhesive composition, and/or operating a driven auxiliary spray wand (e.g., repair wand 110) to fix defective areas, thereby repairing defective areas and maintaining the overall quality of the coating temper.

The second spectrometer 304 of the coating inspection system 114 may also be operable to measure the ash content of the adhesive coating 130. Operation of the second spectrometer 304 to measure the ash content of the adhesive coating 130 may be similar to the process of determining the concentration of one or more constituents of the adhesive composition using the first spectrometer 302. For example, the second spectrometer 304 may be initially used to generate at least two absorbance curves for two adhesive coatings 130 having a known ash content. The two absorbance curves may then be used to generate one or a plurality or reference absorbance curves for the ash content of the adhesive coating 130, as previously described in detail in relation to the cumulative reference curve generated using the second spectrometer 304. In some embodiments, the reference absorbance curves for the ash content may also be adjust for temperature, thickness of the adhesive coating 130, and/or concentration of one or more constituents of the adhesive composition.

The presence of ash in the adhesive coating 130 may influence the temper of the adhesive coating 130 as previously described in this disclosure. Thus, in some embodiments, the control system may be operable to adjust the composition of the adhesive composition in response to the measurement of the ash content of the adhesive coating 130 using the second spectrometer 304. Additionally, the ash content may influence the absorbance of the dual wavelength beam of the topography instrument 200 measured by the detector system 204 of the topography instrument 200. For example, not intending to be bound by theory, ash in the adhesive coating 130 may reflect or absorb portions of the dual wavelength beam of the topography instrument 200, which may reduce the absorbance of the dual wavelength beam detected by the detector system 204 of the topography instrument 200. Therefore, in some embodiments, the ash content of the adhesive coating 130 measured by the second spectrometer 304 may be used to correct the final intensity of the dual wavelength beam measured by the beam intensity detectors of the detector system 204 of the topography instrument 200. For example, in some embodiments, the topography instrument 200 may be operable to receive the ash content for a data cell from the second spectrometer 304 and adjust the thickness measurement for the data cell based on the ash content of the adhesive coating 130 in the area of the data cell.

In some embodiments, a method for determining the quality of the adhesive coating on the outer surface of the creping cylinder in a process for creping paper may include measuring at least one of a degree of cross-linking of the adhesive polymer, a concentration of the adhesive polymer in the adhesive coating, a water content of the adhesive coating, an ash content of the adhesive coating, or combinations of thereof. The method for determining the quality of the adhesive coating may include determining a thickness of the adhesive coating. The thickness of the adhesive coating may be determined by directing a beam of light through the adhesive coating at an angle, measuring an initial intensity of the beam, measuring a final intensity of the at least a portion of the beam reflected and passed back through the adhesive coating, determining an absorbance of the beam of light by the adhesive coating from a difference between the initial intensity and the final intensity of the beam, and calculating the thickness of the adhesive coating from the absorbance by the adhesive coating. At least a portion of the beam reflects from the surface of the creping cylinder and passes back through the adhesive coating;

In some embodiments, a method for creping paper may include applying an adhesive composition to an outer surface of a creping cylinder to form an adhesive coating on the creping cylinder, the adhesive composition comprising an adhesive polymer and water. The method may further include contacting a continuous paper sheet with the adhesive coating on the creping cylinder, removing or separating the continuous paper sheet and at least a portion of the adhesive coating from the outer surface of the creping cylinder, and determining a quality of the adhesive coating on the creping cylinder. Determining the quality of the adhesive coating on the creping cylinder may include measuring at least one of a degree of cross-linking of the adhesive polymer, a concentration of the adhesive polymer in the adhesive coating, a water content of the adhesive coating, an ash content of the adhesive coating, or combinations of thereof; and determining a thickness of the adhesive coating. In some embodiments, determining the thickness of the adhesive coating may include directing a beam of light through the adhesive coating at an angle, wherein at least a portion of the beam reflects from the surface of the creping cylinder and passes back through the adhesive coating; measuring an initial intensity of the beam; measuring a final intensity of the at least a portion of the beam reflected and passed back through the adhesive coating; determining an absorbance of the beam of light by the adhesive coating from a difference between the initial intensity and the final intensity of the beam; and calculating the thickness of the adhesive coating from the absorbance by the adhesive coating. Determining the quality of the adhesive coating may be performed prior to contacting the continuous paper sheet with the adhesive coating.

In some embodiments, the method for creping paper may further include adjusting the adhesive composition or application of the adhesive composition to the outer surface of the creping cylinder based on the quality of the adhesive coating. For example, in some embodiments, the method for creping paper may include sending a control signal to the adhesive system to change the composition of the adhesive composition based on the quality of the adhesive coating determined by the coating inspection system. Alternatively or additionally, in some embodiments, the method for creping paper may include transmitting a control signal to the coating system or repair wand to adjust the application rate of the adhesive composition to the outer surface of the creping cylinder in one or more regions of the creping cylinder. In some embodiments, the repair wand may be used to introduce a material to the adhesive coating in a targeted area in response to the quality determined in that area. For example, the repair wand may be used to introduce moisture or adhesive composition to the adhesive coating in the area to modify the moisture content or the thickness of the coating, respectively.

In some embodiments, determining the quality of the adhesive coating may include determining the adhesive polymer content of the adhesive coating. Determining the adhesive polymer content may include measuring an incoming absorbance curve of the adhesive coating using a spectrometer and comparing the incoming absorbance curve of the adhesive coating to a reference absorbance curve. The adhesive polymer content may be proportional to a magnitude of one or more absorbance peaks of the incoming absorbance curve relative to corresponding peaks of the reference absorbance curve. The reference absorbance curve may be adjusted for a temperature of the adhesive coating, a composition of the adhesive composition prior to applying the adhesive composition to the creping cylinder, the thickness of the adhesive coating, or combinations thereof.

In some embodiments, determining the quality of the adhesive composition may include determining a degree of cross-linking of the polymer in the adhesive coating. Determining the degree of cross-linking of the polymer in the adhesive coating may include measuring an incoming absorbance curve of the adhesive coating using a spectrometer and comparing the incoming absorbance curve of the adhesive coating to a reference absorbance curve. The degree of cross-linking of the polymer in the adhesive coating may be proportional to a shift in the average wavelength of one or more peaks of the incoming absorbance curve relative to corresponding peaks of the reference absorbance curve.

In some embodiments, determining the quality of the adhesive composition may include determining the water content of the adhesive coating. In some embodiments, determining the water content of the adhesive coating may include measuring an incoming absorbance curve of the adhesive coating using a near-infrared spectrometer and comparing the incoming absorbance curve of the adhesive coating to a reference absorbance curve. In some embodiments, the moisture content of the adhesive coating may be proportional to a magnitude of one or more absorbance peaks of the incoming absorbance curve relative to corresponding peaks of the reference absorbance curve.

In some embodiments, the information on the quality of the adhesive coating 130 obtained from the methods described herein using the coating inspection system 114 may be used to correct blade wear and create and maintain a quality coating, which will yield a higher quality crepe paper product. Additionally, in some embodiments, the information on the quality of the adhesive coating 130 as measured by the coating inspection system 114 and the methods disclosed herein may reduce chemical and operating cost by applying the adhesive coating (i.e, the chemical coating mix) in a more efficient and meaningful manner based on actual real time analysis of the quality of the adhesive coating 130. In some embodiments, the data on the quality of the adhesive coating 130 collected from the coating inspection system 114 may be used by the control system to adjust the adhesive composition to maintain the best adhesive coating 130 for the product being made under the current operating conditions. Individual control of the release agent, adhesive polymer, MAP, and plasticizers may be implemented by adjusting addition rates of each addition pump of the adhesive system 112 (FIG. 1). For example, in some embodiments, if the thickness of the adhesive coating 130, as measured using the topography instrument 200, is found to be too thin, the control system 120 may be operable to increase the speed of the addition pump for the adhesive composition, which will increase the amount of the adhesive composition applied to the Yankee dryer surface by the coating system 108 (FIG. 1). In some embodiments, the speed of the adhesive pump may be adjusted to maintain a proper thickness and maintain the proper coating temper. In some embodiments, if the coating moisture content, as measured by the second spectrometer 304 of the coating inspection system 114, is insufficient and the coating is becoming too hard, a plasticizer component addition rate for the adhesive system 112 may be automatically increased to add more plasticizer to the adhesive composition. In some embodiments, each additive component addition rate of the adhesive system 112 may be adjusted independently to correct deficiencies in the adhesive coating 130 over the outer surface 104 of the creping cylinder 102 (i.e., Yankee dryer surface). In some embodiments, adjustment of the adhesive composition by the adhesive system 112 or the addition rate of the adhesive composition to the outer surface 104 of the creping cylinder 102 may be performed in response to the evaluation of the quality of the adhesive coating 130 as determined by the coating inspection system 114 as the coating inspection system 114 is moved laterally back and forth across the outer surface 104 of the creping cylinder 102.

In some embodiments, problem areas of the adhesive coating on the outer surface of the creping cylinder (i.e., Yankee dryer surface) that are not typical of the overall condition of the adhesive coating may be repaired by implementing a single component addition wand (i.e., repair wand 110 in FIG. 3). The repair wand 110 may employ a proportional valve to vary the level of an addition component in an area of the adhesive coating 130 that needs repair. The repair wand 110 may be driven back and forth to these troubled areas where a more concentrated solution of adhesive or release component can be sprayed onto those areas building up and repairing these areas as needed. The repair quality may be evaluated as the scanning of this multiple instrument array passes back over those areas in successive scans. The operator may be shown graphically where these areas are being automatically repaired by this machine. For example, in some embodiments, the control system may be configured to display a graphical indication of the location of the trouble areas of the adhesive coating on the operator control station 124 (FIG. 1). The position of the coating inspection system 114 (i.e., scanning instrument array), the current position of any repair wands 110, all component addition rates, and a complete overall graphical depiction of the current state of the coating process at a resolution of 0.1 inches, may be shown graphically on monitors at the remote operators control station 124.

All process temperatures, component addition flow rates, component tank levels, process conditions for the applied coating across the Yankee dryer surface, may also be shown graphically on the remote operators control station 124. The control system 120 may also include audio alarms that may be sounded to indicate any parameter that is out of limits. In some embodiments, these alarms may be date and time stamped and then saved to permanent record on the system hard drive (i.e., memory module). All items requiring maintenance may be presented to the operator so that these issues can be resolved.

The methods disclosed herein for determining the quality of the adhesive coating on the creping cylinder or for creping paper may be embodied in machine readable instructions stored on one or more memory modules of the control system. The machine readable instructions, when executed by one or more processors of the control system, may cause the coating inspection system to determine a quality of the adhesive coating by any of the methods disclosed herein. The machine readable instructions, when executed by the one or more processors of the control system, may also cause the control system to transmit control signals to one or more components of the paper creping system (e.g., adhesive system, coating system, creping blade, etc.) to adjust one or more parameters of the creping process in response to the determined quality of the adhesive coating.

In one aspect of the present disclosure, a system for applying an adhesive coating to a creping cylinder may include an adhesive system operable to prepare an adhesive composition, an adhesive applicator operable to apply the adhesive composition to an outer surface of a creping cylinder to form an adhesive coating on the creping cylinder, a coating inspection system comprising a topography instrument and at least one spectrometer, and a control system communicatively coupled to the adhesive system, the adhesive applicator, and the coating inspection system, the control system comprising at least one processor, at least one memory module, and machine readable instructions stored on the at least one memory module. The machine readable instructions, when executed by the process, may cause the system to determine one or more than one of a thickness, a topography, and a rheology of the adhesive coating using the topography instrument, adjust application of the adhesive coating to the outer surface of the creping cylinder in response to the thickness, topography, rheology, or combinations of these, determine at least one property of the adhesive coating using the at least one spectrometer. The at least one property includes a concentration of adhesive polymer in the adhesive coating, degree of cross-linking of the adhesive polymer in the adhesive coating, concentration of water in the adhesive coating, ash content of the adhesive coating, or combinations of these. The machine readable instructions, when executed by the processor may further include adjusting one or more operating parameters of the adhesive system, the adhesive applicator or both in response to the at least one property of the adhesive coating. In some embodiments, the machine readable instructions, when executed by the processor, may cause the system to determine the determine the thickness, topography, or rheology of the adhesive coating using the topography instrument according to any of the method steps previously discussed herein. In some embodiments, the machine readable instructions, when executed by the processor, may cause the system to determine the a concentration of adhesive polymer in the adhesive coating, degree of cross-linking of the adhesive polymer in the adhesive coating, concentration of water in the adhesive coating, ash content of the adhesive coating, concentrations of other constituents in the adhesive coating, or combinations of these using the at least one spectrometer according to any of the method steps previously discussed herein.

Figure 19:
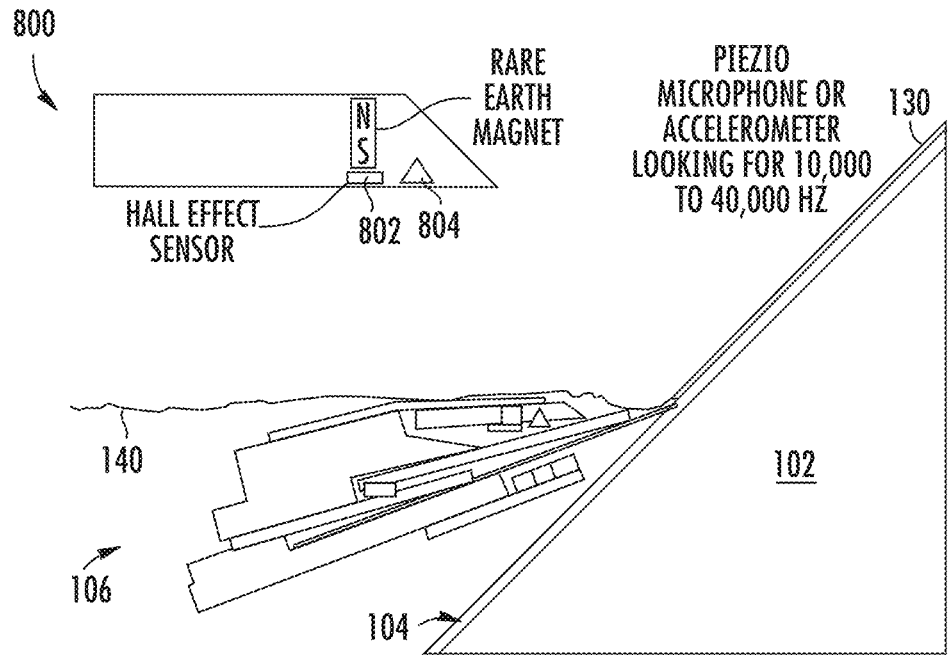
FIG. 19 schematically depicts a side view of an embodiment of a creping blade having a Hall Effect device for measuring blade pressure and a piezoelectric device for vibration pick-up, according to one or more embodiments as shown and described herein.

A Further Description of Implementing Sensors in Order to Monitor the Creping Process Referring to FIGS. 19-23, a holder houses the creping blade 106, which is a type of doctoring blade, and applies pressure, at some critical angle, to the blade edge against the creping cylinder 102 (i.e., Yankee dryer cylinder). The pressure and angle of the creping blade 106 against the outer surface 104 of the creping cylinder 102 (i.e., Yankee Dryer) is critical and is adjustable at determined points across the length of the blade. As these blades wear, their effect on the adhesive coating 130 and the outer surface 104 of the creping cylinder 102 (i.e., polymer coated Yankee dryer surface) and the creping blade's ability to affect the proper folding of the tissue as it hits the edge of this Creping blade diminishes. Therefore, it becomes necessary to monitor this part of the tissue process. It is also important to monitor the effects of the creping process along the entire length of the creping blade 106 by implementing a plurality of sensor blocks 800 every few inches. Referring to FIG. 24, a creping blade 106 is shown having a plurality of sensor blocks 800 positioned along the creping blade 106. Referring to FIG. 19, each sensor block may include a blade pressure sensor 802, a temperature sensor, and a vibration sensor 804 as well as a transmitter to transmit the sensor data back to a receiving unit. This sensor block data may be encoded by an addressable serial number, for each block. This serial number tells the receiving unit which block is transmitting as well as the position of that sensor block along the blade. The individual sensors are described further on in this document. The important aspect here is to describe the importance of having multiple sensor blocks along the entire blade. For instance, if the blade were to bite through the protective coating 5 feet downstream of a temperature sensor, the heat transfer through the blade to a distant heat sensor would never occur, and never be detected. The distance between the defective area, where the blade 106 is rubbing against the metal of the creping cylinder (i.e., Yankee dryer surface), and the temperature sensor is too great, the blade 106 between these two points is being cooled by departing this energy against the normally coated and protected area of the creping cylinder 102. The heat transfer between the two critical points, between the problem area and the temperature sensor, would never occur because the blade section between these two points is being cooled. Therefore, applying sensors every few inches is required as the process conditions vary, inch to inch, along the entire outer surface 104 of the creping cylinder 102 (i.e., Yankee dryer surface). The same scenario holds true for blade pressures as well as vibrational frequencies, hence, the need to have multiple sensor blocks across the creping blade is an important part of this disclosure. The technology for each type of sensor contained within a sensor block will be described later in this disclosure.

A measurement of the folding process (as the tissue hits the creping blade 106) is normally expressed in folds per inch. As the proper number of folds per inch (FPI) increases beyond a desired target FPI, the tissue may become weak, losing its strength properties, diminishing inter-fiber bonding to a level that is unacceptable. Conversely, if the FPI decreases, the pliability of the tissue may diminish causing the product to be not as soft as would be desired. Maintaining the desired equilibrium may therefore maintain the strength and softness of the tissue. Being able to measure the FPI every few inches across the creping blade 106 may enable the FPI to be maintained in equilibrium to maintain the strength and softness of the tissue (i.e., creped paper 140). Since the tissue paper (i.e., creped paper 140) is traveling at speeds of around 1232 inches per second, or at about 70 miles an hour, when it encounters the creping blade edge, the energy departed onto the creping blade edge may be substantial. This is evident in how quickly the edges of the creping blade 106 wear even though the edges may be made of hardened metal alloy tips. When conditions are just right for this process, it is said that the tissue will "explode" at the creping blade 106. Under this principle, the creping process will carry this vibrational (explosion rate) energy from the tip of the creping blade 106 to its absorbing point, which is the holder. During this process, the plane (width) of the creping blade 106 may oscillate as the energy waves, via the creping process, move through it. These energy waves may be at a frequency which equals this explosion frequency or a harmonic there of. In other words, the creping blade 106 may act as a speaker broadcasting sounds correlating to the folds per inch of the creping process. The creping blade 106 may also produce vibration frequencies not directly associated with the FPI. Installing a piezoelectric microphone device, or a Hall Effect sensor, or an accelerometer sensor near, or in close contact, along the oscillating plane of the blade 106 may enable one to measure these frequencies. Implementing a dual twin T notch type of filtering on the raw analog signals (removes unwanted frequencies, which will simplify the equations) and further applying Fast Fourier Transforms on the measures of data received may enable the derivation of the FPI (Folds/Inch) of the tissue creping process.

As the blades increase in wear, a noticeable temperature change will occur due to the corresponding changes in friction experienced by the blade. Placing temperature detectors along the length of the blade planes may provide an indication of the amount of wear as temperature differentials move across the blade plane. These will be reported by the individual sensor blocks. In addition, if the creping blade 106 cuts through the adhesive coating 130 on the creping cylinder 102, the temperature rise at any sensor location will be quickly dramatic, indicating the need for the immediate attention of the operator in that sensor block location. This will emanate as an audio alarm and an appropriate text message and graphic display for the operator.

The force of the blade assembly across the entire width W of the creping cylinder (i.e., Yankee Dryer) may be monitored with multiple sensor blocks. If the force exerted on the creping blade is not correct at a particular location, or if a hot spot develops during production, damage to the adhesive coating 130 and/or the creping cylinder 102 in that area may occur. The force exerted on the creping blade 106 and the blade assembly (holder) will cause a deflection on the blade plane over its width. Changes on this pressure during the process will occur as the blades 106 wear but also could arise for other reasons as well. For instance, if a wet spot is encountered in the tissue web. This condition will soften the adhesive coating 130 slightly thereby decreasing the blade force slightly in those sensor block areas. The location of these defects will be graphically displayed as senor block locations which are in alarm state or out of running specifications. Many conditions can change this force in production, for instance, the creping cylinder 102 may have an out of roundness within specifications. The out of roundness may cause a rhythmic oscillation in blade pressure detected as the creping cylinder 102 rotates. However, for the purposes of the present disclosure, it is sufficient to say that changes may occur and that those changes may need to be monitored along the entire length of the creping blade 102 through the use of multiple sensor blocks.

Referring to FIG. 19, the blade pressure sensor 802 of the sensor block 800 may include aa Hall Effect sensor, which may be operable to measure the pressure on the creping blade 106 by measuring the Hall Effect. The Hall Effect Method takes advantage of a changing blade deflection. This causes the blade assembly to become closer, or farther away, from the fixed magnets. As this happens, a measurable disturbance should occur in the magnetic flux generated by the magnets as received on the Hall Effect Sensor. The sensor is designed to read changes in magnetic flux.

Figure 20:
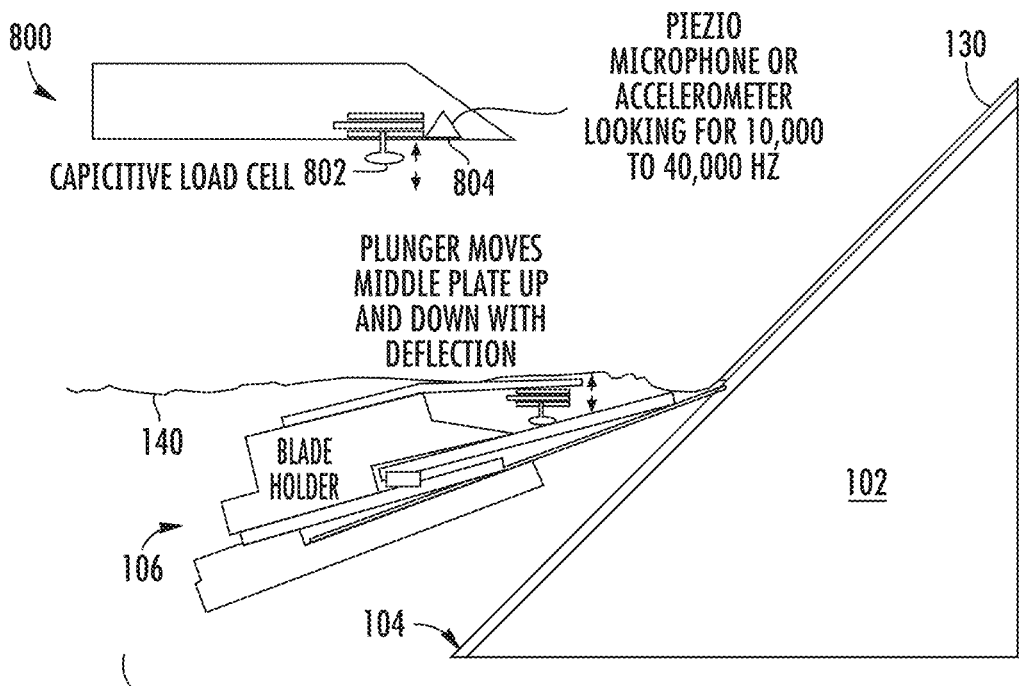
FIG. 20 schematically depicts a side view of an embodiment of a creping blade having a capacitive load cell for measuring blade pressure and a piezoelectric device for vibration pick-up, according to one or more embodiments as shown and described herein.

Referring to FIG. 20, in some embodiments, the blade pressure sensor 802 may include a a Capacitive Load Cell sensor. The Capacitive Load Cell sensor works by passing a proportional amount of the square wave charging the outside plates to the center plate. If the outer plates are charged with a square wave at approximately 500 kHz to 1 MHz, and where these square waves are simply out of phase or phase shifted by 90 degrees from each other, then at zero deflection of the inner plate, the resulting signal output on the middle plate should be 45 degrees phase shifted position between the upper and lower plates. As the middle plate deflects toward the upper plate due to load, the phase shift of the middle plate will shift toward that of the phase of the upper plate. If the deflection is negative, the phase shift on the middle plate will shift in the direction of the lower plate.

Figure 21:
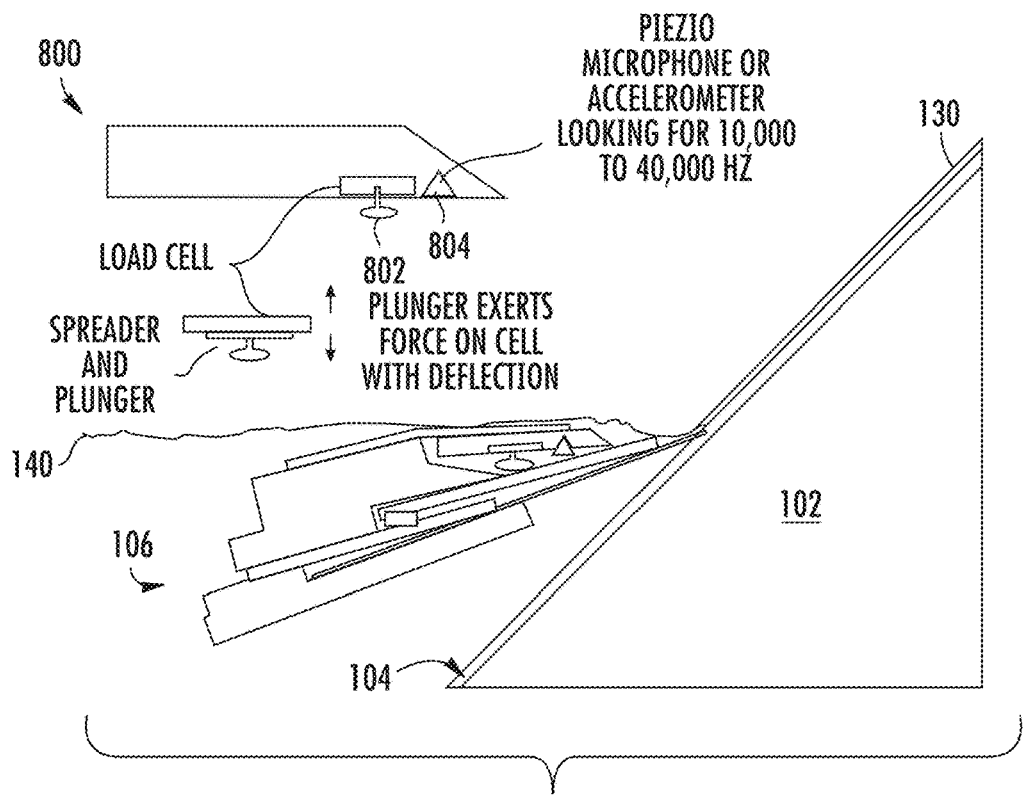
FIG. 21 schematically depicts a side view of an embodiment of a creping blade having a standard load cell device for measuring blade pressure and a piezoelectric device for vibration pick-up, according to one or more embodiments as shown and described herein.

Referring to FIG. 21, in some embodiments, the blade pressure sensor 802 may include a Load Cell sensor. The use of Load Cells is a very accurate way to measure the deflection and forces on the creping blade 106 directly. The load cells work by measuring force by deflecting a strain gauge printed on a metal form.

Figure 22:
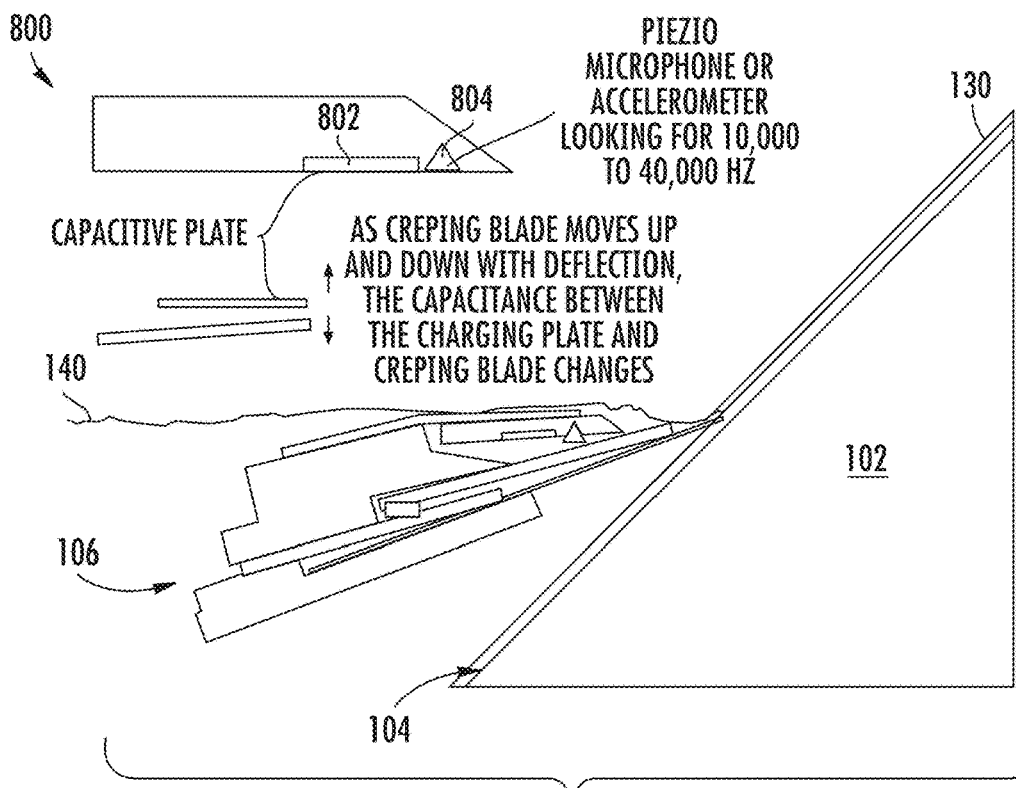
FIG. 22 schematically depicts a side view of an embodiment of a creping blade having a capacitance plate device for measuring blade pressure and a piezoelectric device for vibration pick-up, according to one or more embodiments as shown and described herein.

Referring to FIG. 22, in some embodiments, the blade pressure sensor 802 may include a Capacitive Plate sensor. The Capacitive Plate method uses the property where two plates will transfer a charge based on the dielectric constant and the distance between two plates. Since the dielectric constant is equal to 1 for air, the distance between the Creping Blade and the charging plate is a direct function of the degree of deflection between the charging plate and the creping blade 106. Operation of the capacitive plate sensor system may vary with changes in temperature so a temperature correction mechanism may be used to compensate for temperature. Also, since the air in a paper mill is extremely humid, and considering that the dielectric constant of water is 80.1 (at 20° C.) compared to that of air which is 1, compensation for the humidity of the water vapor between the creping blade 106 and the charging plate may be required as well.

Figure 23:
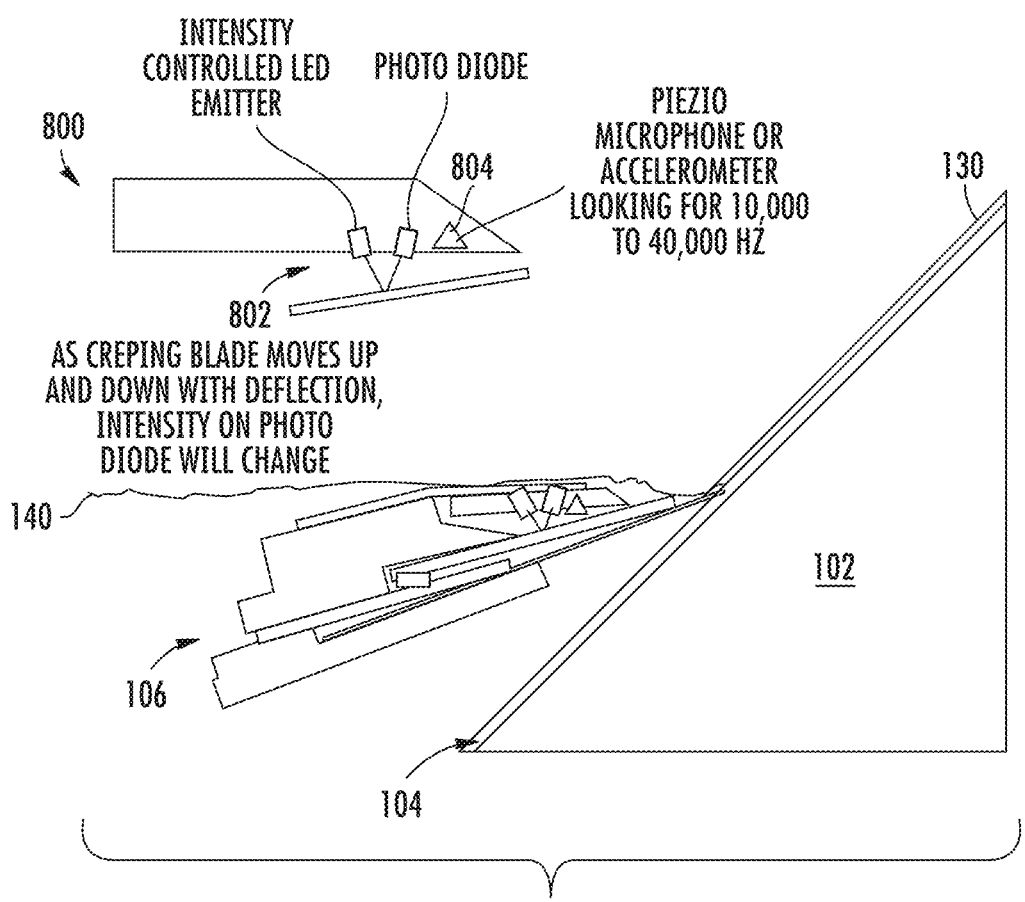
FIG. 23 schematically depicts a side view of an embodiment of a creping blade having an optical device (e.g., an LED intensity device) for measuring blade pressure and a piezoelectric device for vibration pick-up, according to one or more embodiments as shown and described herein.
Figure 24:
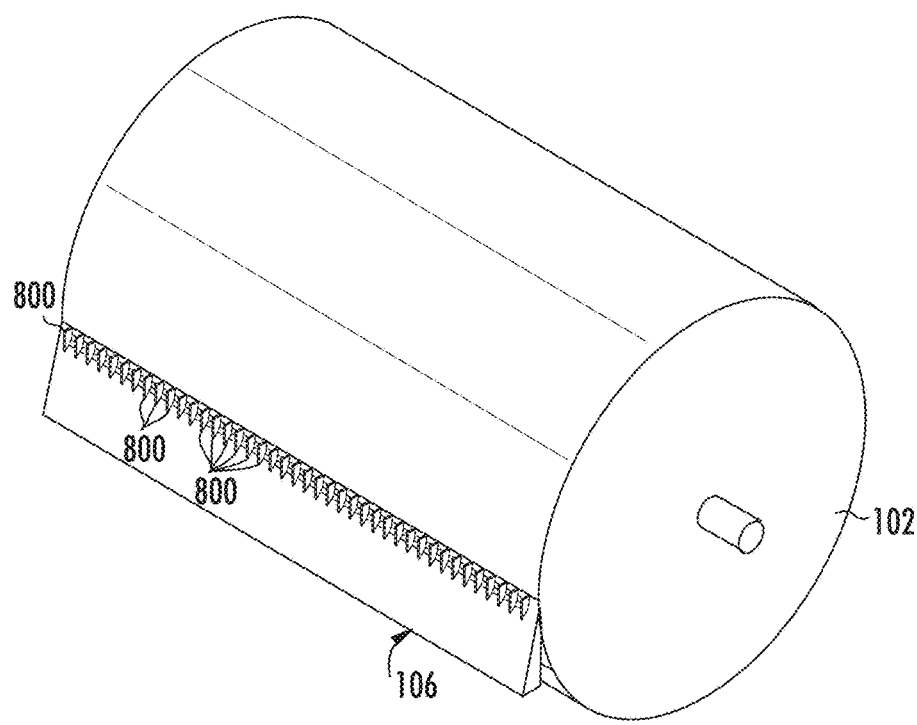
FIG. 24 schematically depicts a perspective view of a creping blade having a plurality of sensor blocks positioned along the width of the creping blade to monitor creping blade conditions, where each of the plurality of sensor blocks includes a pressure sensor, a vibration sensor, a temperature sensor, or combinations of these, according to one or more embodiments as shown and described herein.

Referring to FIG. 23, in some embodiments, the blade pressure sensor 802 may include a LED Sensor. The LED intensity method is also very feasible. The LED sensor works by sending out a quantum energy of light, which bounces off of the creping blade surface and is then received by the photo diode receiver. As the force on the creping blade 106 causes deflection, the distance between the creping blade 106 and the emitter-receiver pair changes. This will present a measurable change in signal, which is proportional, but not linear, to the deflection.

As is now apparent, there are several ways this can be monitored. A Hall Effect sensor, to measure changes in magnetic field, could be used. Creating a magnetic field above and below the Blades assembly will initiate measurable disturbances in that field as blade deflection occurs. This assumes an iron component to the metallurgy of the blades.

Load cells could be installed which, as deflection occurs, will cause a proportional force to be applied on the load cell device. Placing load cells every few inches along the blade planes should give accurate description of the blade pressures at any point.

Capacitive change type of detection can be used which works on the principle of changing the distance of the gap between two or more plates will change the microfarad value. If the creping blade 106 acts as one plate while another plate mounted above the blade 106 acts as a charged reference, and as the blade 106 deflects due to a changing pressure, the capacitor value of these plates will change proportionally, but not linear. This change can be measured and amplified.

Finally, a changing light intensity can be employed, which will measure the changing distance between the creping blade 106 and the emitter-receiver pair. This changing distance is proportional to the force on the blade assembly. This change in signal is also not linear.

In some embodiments, a system for creping paper may include the creping cylinder 102 and the creping blade assembly operable to position the creping edge of the creping blade 106 proximate the outer surface 104 of the creping cylinder 102. The creping blade assembly may include a sensor block 800 comprising a blade pressure sensor 802 operable to measure a pressure exerted on the creping blade 106 by the adhesive coating on the outer surface 104 of the creping cylinder 102 and a vibration sensor 804 operable to measure vibrations in the creping blade 106. In some embodiments, the sensor block 800 may include a temperature sensor. In some embodiments, the blade pressure sensor 802 may include at least one of a Hall effect sensor, a capacitive load cell sensor, a load cell sensor, a capacitive plate sensor, or an LED sensor.

Roll Up Inspection Station

Figure 25:
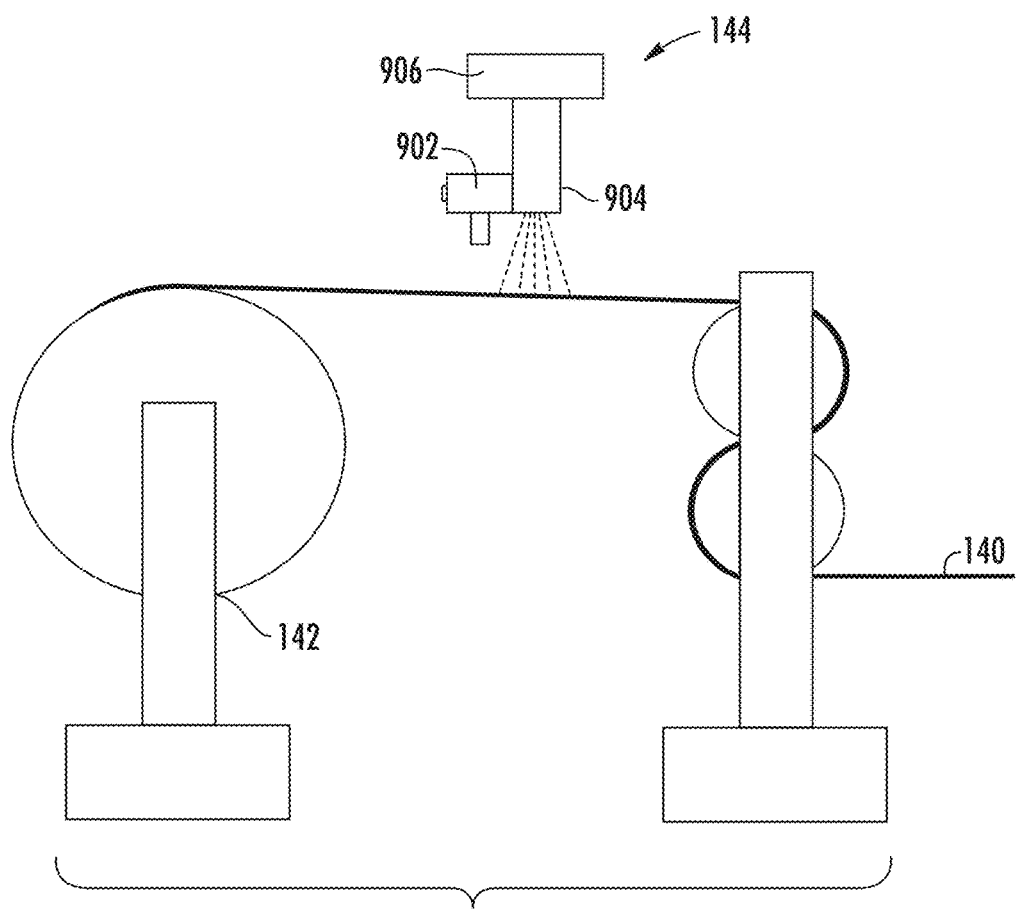
FIG. 25 schematically depicts a creped paper inspection system positioned at the final roll-up station of the creping process, the creped paper inspection system configured to move back and forth across the width of the web of creped paper and including a near infrared sensor for measuring moisture content in the creped paper and a temperature sensor, according to one or more embodiments as shown and described herein.

Referring to FIG. 25, a roll up inspection station 144 comprising a moisture detecting spectrometer 904 is depicted. This station will consist of an x axis linear ball guide 906 to transverse a moisture detecting spectrometer 904 as descried earlier and an IR temperature sensor 902 across the web to record the final product moisture and the temperature as the product is being rolled up. Both of these devices have been described earlier in the Yankee dryer instrument array and are of the same type. They are both used in the same mode as described previously. This station includes an encoder to keep track of the linear feet contained in each roll. As the rolls are ended and a new roll is started quality reports, as well as a moisture profile of that roll, will be stored permanently on the system hard drive with a date and time stamp as well as a identifying number so that these permanent records will be available per each roll at any time thereafter. A printable version can be printed if desired by the customer.

In evaluating the residual Coating for Thickness, Topography, its Rheology, its Moisture content and chemical properties, then correlating this data to linear movement across the Yankee Dryer surface, we will be able to develop a complete profile of the Yankee Dryer Coated surface in real time. Minute changes in the coating Absorbance Response, Topography, Temperature, Rheology, and Moisture content as well as Chemical property changes, will be reflective of the quality of the residual coating and to the quality of the tissue being made. It will enable us to vary the original recipe component concentrations in order to effect quality enhancements in the manufacturing of the tissue product in real time, while dynamically maintaining the desired quality of the coating as well. By passing a plurality of Instruments in a Scanning Array back and forth along the Yankee Dryer surface, we will be able to develop an applied coating profile. This Profile will pin point problems in manufacturing process such as correcting deficient areas of Coating by adjusting the recipe, changing flow rates, sending out a repair wand to fix an area and warning the operator of problems elsewhere in the process that could affect quality or downtime. An example of the latter would be a wet spot cause by a vacuum problem on the felt or a dry spot caused by insufficient fiber content in the stock being fed at a location in the head box as well as a multitude of other process problems. In any case, correcting the issues mentioned will lead to better overall quality, decreased down time, an increase in profits, and a propensity toward longer Blade life.

Unless otherwise defined, all technical and scientific terms used herein have the same meaning as commonly understood by one of ordinary skill in the art to which the subject matter of this disclosure belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present disclosure. Notwithstanding that the numerical ranges and parameters setting forth the broad scope of the disclosure are approximations, the numerical values set forth in the specific examples are reported as precisely as possible. One of ordinary skill in the art will understand that any numerical values inherently contain certain errors attributable to the measurement techniques used to ascertain the values.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A coating inspection system for determining a quality of an adhesive coating on a creping cylinder, the system comprising:
a topography instrument operable to measure one or more properties of the adhesive coating on an outer surface of the creping cylinder, the topography instrument comprising:
a light source system operable to direct a beam of light towards the adhesive coating at an angle and measure an initial intensity of the beam of light, wherein the angle is a non-zero angle of the beam of light relative to a direction normal to the outer surface of the creping cylinder;
an imaging system operable to capture an image of a cross-section of the beam after the beam is reflected from the outer surface of the creping cylinder and passed back through the adhesive coating; and
a beam intensity measuring system operable to measure a final intensity of the beam after the beam passes through the adhesive coating and is reflected from the outer surface of the creping cylinder; and
a control system communicatively coupled to the topography instrument, the control system comprising at least one processor, at least one memory module communicatively coupled to the at least one processor, and machine readable instructions stored on the at least one memory module, the machine readable instructions, when executed by the at least one processor, may cause the control system to automatically:
determine a distance from the imaging system and the beam intensity measuring system to the outer surface of the creping cylinder from the image captured by the imaging system;
determine an absorbance of the adhesive coating from the initial intensity of the beam measured by the light source system and the final intensity of the beam measured by the beam intensity measuring system; and
calculate one or more properties of the adhesive coating from the distance and the absorbance, where the one or more properties are indicative of a quality of the adhesive coating.

2. The coating inspection system of claim 1, wherein the one or more properties of the adhesive coating comprises a thickness of the adhesive coating, a topography of the adhesive coating, a rheology of an adhesive of the adhesive coating, or combinations of these.

3. The coating inspection system of claim 2, wherein the one or more properties of the adhesive coating comprises the thickness of the adhesive coating and the machine readable and executable instructions, when executed by the at least one processor, causes the control system to automatically calculate the thickness of the adhesive coating from the absorbance of the beam by the adhesive coating and the distance from the imaging system and the beam intensity measuring system to the outer surface of the creping cylinder using trigonometry and Beer's Law.

4. The coating inspection system of claim 2, wherein the one or more properties of the adhesive coating comprises the topography of the adhesive coating and the machine readable and executable instructions, when executed by the at least one processor, causes the control system to automatically: calculate the thickness of the adhesive coating from the absorbance of the beam by the adhesive coating and the distance from the imaging system and the beam intensity measuring system to the outer surface of the creping cylinder using trigonometry and Beer's Law for a plurality of data cells arranged in linear groupings across the outer surface of the adhesive coating; and
comparing the thicknesses of the adhesive coating from one linear grouping of data cells to the thicknesses of the adhesive coating from another linear grouping of data cells to determine the topography of the adhesive coating.

5. The coating inspection system of claim 1, further comprising an instrument housing coupled to a first instrument positioner, wherein:
the topography instrument is disposed within the housing; and
the first instrument positioner is operable to translate the instrument housing laterally back and forth along a width of the creping cylinder.

6. The coating inspection system of claim 1, further comprising a second instrument positioner operatively coupled to the topography instrument, the second instrument positioner operable to translate the topography instrument along a direction normal to the outer surface of the creping cylinder to move the topography instrument closer to or farther away from the outer surface of the creping cylinder.

7. The coating inspection system of claim 6, wherein the machine readable and executable instructions, when executed by the one or more processors, cause the system controller to automatically position the topography instrument relative to the outer surface of the creping cylinder to maintain the beam in a center of an image area of the imaging system.

8. The coating inspection system of claim 1, further comprising a first spectrometer operable to determine one or more of a concentration of an adhesive polymer in the adhesive coating, a degree of cross-linking of the adhesive polymer, the concentration of one or more other constituents of the adhesive coating, or combinations of these.

9. The coating inspection system of claim 8, wherein:
the first spectrometer operable to pass light having wavelengths in a range of from 200 nm to 1000 nm through the adhesive coating and measure wavelengths and intensities of the light passed through the adhesive coating and reflected from the outer surface of the creping cylinder or fluoresced by the adhesive coating;
the first spectrometer is communicatively coupled to the control system; and
the machine readable and executable instructions, when executed by the at least one processor, may cause the control system to automatically:
determine an absorbance spectrum, a fluorescence spectrum, or both of the adhesive coating from the wavelengths and intensities of the light passed through the adhesive coating or fluoresced by the adhesive coating; and
determine at least one of a concentration of an adhesive polymer in the adhesive coating, a degree of cross-linking of the adhesive polymer, the concentration of one or more other constituents of the adhesive coating, or combinations of these from the absorbance spectrum, fluorescence spectrum, or both.

10. The coating inspection system of claim 1, further comprising a second spectrometer operable to determine a concentration water in the adhesive coating, an ash content in the adhesive coating, or both.

11. The coating inspection system of claim 10, wherein:
the second spectrometer operable to pass near infrared light having wavelengths in a range of from 750 nm to 2500 nm through the adhesive coating and measure wavelengths and intensities of the near infrared light reflected from the adhesive coating and the outer surface of the creping cylinder;
the second spectrometer is communicatively coupled to the control system; and
the machine readable and executable instructions, when executed by the at least one processor, may cause the control system to automatically:
determine an absorbance spectrum of near infrared light for the adhesive coating from the wavelengths and intensities of the near infrared light reflected from the adhesive coating and the outer surface of the creping cylinder; and
determine a concentration water in the adhesive coating, an ash content in the adhesive coating, or both the absorbance spectrum of near infrared light for the adhesive coating.

12. The coating inspection system of claim 1, further comprising an infrared temperature sensor operable to measure a temperature of the adhesive coating, a temperature of the outer surface of the creping cylinder, or both.

13. The coating inspection system of claim 1, wherein the light source system comprises at least one light source operable to produce the beam of light and at least one output intensity detector operable to measure an output intensity of the beam of light.

14. The coating inspection system of claim 1, wherein the light source system comprises:
a first light source operable to produce a first beam of light having a first wavelength;
a first output intensity detector operable to measure an output intensity of the first beam;
a second light source operable to produce a second beam of light having a second wavelength;
a second output intensity detector operable to measure an output intensity of the second beam; and
optics that are operable to combine at least a portion of the first beam and at least a portion of the second beam to produce the beam of light, where the beam of light comprises a dual wavelength beam.

15. The coating inspection system of claim 1, wherein the beam comprises a dual wavelength beam and the beam intensity measuring system comprises a first beam intensity detector operable to measure an intensity of a first wavelength of light in the beam and a second beam intensity detector operable to determine an intensity of a second wavelength of light in the beam.

16. A coating system for applying an adhesive coating to an outer surface of a creping cylinder, the system comprising:
an adhesive system operable to prepare an adhesive composition;
an adhesive applicator positioned to apply the adhesive composition to the outer surface of the creping cylinder to form the adhesive coating;
a coating inspection system comprising a topography instrument, wherein:
the coating inspection system is positioned downstream of the adhesive applicator relative to a direction of rotation of the creping cylinder and between the adhesive applicator and contact of a paper web with the adhesive coating;
the coating inspection system is oriented to direct the topography instrument towards the adhesive coating on the outer surface of the creping cylinder; and
a control system communicatively coupled to the adhesive system, the adhesive applicator, and the coating inspection system, the control system comprising at least one processor, at least one memory module communicatively coupled to the at least one processor, and machine readable instructions stored on the at least one memory module, wherein the machine readable instructions, when executed by the at least one processor, may cause the control system to automatically:
determine one or more than one of a thickness, a topography, or a rheology of the adhesive coating using the topography instrument, and
adjust application of the adhesive composition to the outer surface of the creping cylinder in response to the thickness, topography, or rheology of the adhesive coating.

17. The coating system of claim 16, further comprising at least one spectrometer, wherein the machine readable instructions, when executed by the at least one processor, may cause the control system to automatically:
determine at least one of a concentration of adhesive polymers in the adhesive coating, a degree of cross-linking of the adhesive polymers in the adhesive coating, a concentration of water in the adhesive coating, an ash content of the adhesive coating, or combinations of these using the at least one spectometer; and
adjusting one or more operating parameters of the adhesive system, the adhesive applicator, or both in response to measured values of the concentration of adhesive polymers, the degree of cross-linking of the adhesive polymers, the concentration of water, the ash content, or combinations of these.

18. The coating system of claim 16, further comprising a repair wand positioned downstream of the coating inspection system relative to a direction of rotation of the creping cylinder, wherein:
the repair wand comprises one or more repair nozzles; and
the machine readable instructions, when executed by the at least one processor, may cause the control system to automatically:
identify a defect in the adhesive coating from the thickness, topography, or rheology of the adhesive coating determined form the topography instrument; and
transmit a control signal to the repair want to adjust the application rate of the adhesive composition to the outer surface of the creping cylinder in one or more regions of the creping cylinder comprising the defects.

19. The coating system of claim 18, wherein the repair wand further comprises a positioning rail parallel to the outer surface of the creping cylinder and operable to translate the one or more repair nozzles.

20. The coating system of claim 16, wherein:
the topography instrument comprises a light source configured to direct a beam of light towards the adhesive coating at an angle, an imaging system configured to capture an image of a cross-section of the beam after passing through the adhesive coating, and a beam intensity measuring system;
the coating inspection system comprises an instrument positioner coupled to the topography instrument; and the instrument positioner is configured to translate the topography instrument laterally back and forth along a width of the creping cylinder.

\* \* \* \* \*